United States Patent
Ko et al.

(10) Patent No.: US 11,218,194 B2
(45) Date of Patent: *Jan. 4, 2022

(54) METHOD AND APPARATUS FOR TRANSMITTING REFERENCE SIGNAL IN MULTI-ANTENNA SYSTEM

(71) Applicant: LG ELECTRONICS INC., Seoul (KR)

(72) Inventors: Hyun Soo Ko, Anyang-si (KR); Seung Hee Han, Anyang-si (KR); Ja Ho Koo, Anyang-si (KR); Jae Hoon Chung, Anyang-si (KR); Bin Chul Ihm, Anyang-si (KR); Moon Il Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 157 days.

This patent is subject to a terminal disclaimer.

(21) Appl. No.: 16/774,993

(22) Filed: Jan. 28, 2020

(65) Prior Publication Data

US 2020/0169302 A1   May 28, 2020

Related U.S. Application Data

(63) Continuation of application No. 16/034,311, filed on Jul. 12, 2018, now Pat. No. 10,587,314, which is a
(Continued)

(30) Foreign Application Priority Data

Mar. 23, 2010   (KR) .................. 10-2010-0025968

(51) Int. Cl.
*H04W 4/00* (2018.01)
*H04B 7/0413* (2017.01)
(Continued)

(52) U.S. Cl.
CPC ......... *H04B 7/0413* (2013.01); *H04B 7/0613* (2013.01); *H04B 7/0632* (2013.01);
(Continued)

(58) Field of Classification Search
USPC ....... 370/203, 229, 230, 236, 252, 328, 330, 370/334, 339
See application file for complete search history.

(56) References Cited

U.S. PATENT DOCUMENTS 7,929,415 B2   4/2011   Kwak et al.
8,059,554 B2   11/2011   Lee et al.
(Continued)

FOREIGN PATENT DOCUMENTS

CN   101036320   9/2007
CN   101340228   1/2009
(Continued)

OTHER PUBLICATIONS

United States Patent and Trademark Office U.S. Appl. No. 16/034,311, Office Action dated Aug. 27, 2019, 65 pages.
(Continued)

*Primary Examiner* — Nguyen H Ngo
(74) *Attorney, Agent, or Firm* — Fish & Richardson P.C.

(57) ABSTRACT

A method for transmitting a reference signal in a multi-antenna system is provided. The method includes: selecting at least one orthogonal frequency division multiplexing (OFDM) symbol in a subframe containing a plurality of OFDM symbols; allocating a channel quality indication reference signal (CQI RS) capable of measuring a channel state for each of a plurality of antennas to the selected at least one OFDM symbol; and transmitting the CQI RS, wherein the CQI RS is allocated to an OFDM symbol which does not overlap with an OFDM symbol to which a common reference signal to be transmitted to all user equipments in a cell
(Continued)

or a dedicated reference signal to be transmitted to a specific user equipment in the cell is allocated.

20 Claims, 65 Drawing Sheets

Related U.S. Application Data continuation of application No. 14/983,131, filed on Dec. 29, 2015, now Pat. No. 10,038,478, which is a continuation of application No. 14/165,162, filed on Jan. 27, 2014, now Pat. No. 9,258,038, which is a continuation of application No. 13/259,142, filed as application No. PCT/KR2010/001789 on Mar. 23, 2010, now Pat. No. 8,675,481.

(60) Provisional application No. 61/163,874, filed on Mar. 27, 2009, provisional application No. 61/162,684, filed on Mar. 24, 2009, provisional application No. 61/162,344, filed on Mar. 23, 2009.

(51) Int. Cl.
| | |
|---|---|
| *H04B 7/06* | (2006.01) |
| *H04L 5/00* | (2006.01) |
| *H04L 27/26* | (2006.01) |
| *H04L 25/02* | (2006.01) |
| *H04L 25/03* | (2006.01) |

(52) U.S. Cl.
CPC .......... *H04L 5/0007* (2013.01); *H04L 5/0026* (2013.01); *H04L 5/0048* (2013.01); *H04L 5/0057* (2013.01); *H04L 25/0226* (2013.01); *H04L 27/2611* (2013.01); *H04L 5/0039* (2013.01); *H04L 5/0073* (2013.01); *H04L 5/0085* (2013.01); *H04L 2025/03426* (2013.01); *H04L 2025/03802* (2013.01)

(56) References Cited

U.S. PATENT DOCUMENTS

| | | | |
|---|---|---|---|
| 8,369,206 | B2 | 2/2013 | Nam et al. |
| 8,391,233 | B2 | 3/2013 | Jiang et al. |
| 8,675,481 | B2 | 3/2014 | Ko et al. |
| 9,258,038 | B2 | 2/2016 | Ko et al. |
| 10,038,478 | B2 | 7/2018 | Ko et al. |
| 2008/0253279 | A1 | 10/2008 | Ma et al. |
| 2008/0267165 | A1 | 10/2008 | Bertrand et al. |
| 2008/0298224 | A1 | 12/2008 | Pi et al. |
| 2009/0011767 | A1 | 1/2009 | Malladi et al. |
| 2009/0176463 | A1 | 7/2009 | Raaf et al. |
| 2009/0252077 | A1 | 10/2009 | Khandekar et al. |
| 2010/0039970 | A1 | 2/2010 | Papasakellariou et al. |
| 2010/0046412 | A1 | 2/2010 | Varadarajan et al. |
| 2010/0075706 | A1 | 3/2010 | Montojo et al. |
| 2010/0085925 | A1 | 4/2010 | Kishiyama et al. |
| 2010/0172311 | A1 | 7/2010 | Agrawal et al. |
| 2010/0195566 | A1* | 8/2010 | Krishnamurthy ..... H04L 5/0007 370/328 |
| 2010/0195748 | A1 | 8/2010 | Nam et al. |
| 2010/0226326 | A1 | 9/2010 | Ahn et al. |
| 2010/0238877 | A1* | 9/2010 | Nam ................. H04W 72/1289 370/329 |
| 2011/0003567 | A1* | 1/2011 | Lee ...................... H04W 52/16 455/127.1 |
| 2011/0188438 | A1 | 8/2011 | Lee et al. |
| 2011/0200003 | A1 | 8/2011 | Pi et al. |
| 2011/0235730 | A1 | 9/2011 | Noh et al. |
| 2011/0292903 | A1 | 12/2011 | Jongren et al. |
| 2012/0014477 | A1 | 1/2012 | Ko et al. |
| 2013/0230123 | A1 | 9/2013 | Noh et al. |
| 2016/0149620 | A1 | 5/2016 | Ko et al. |
| 2018/0337712 | A1 | 11/2018 | Ko et al. |

FOREIGN PATENT DOCUMENTS

| | | |
|---|---|---|
| EP | 1916778 | 4/2008 |
| JP | 2008-193440 | 8/2008 |
| JP | 2008193440 | 8/2008 |
| JP | 2010-219817 | 9/2010 |
| JP | 2010219817 | 9/2010 |
| KR | 1020070046976 | 5/2007 |
| KR | 1020080033060 | 4/2008 |
| KR | 1020080036939 | 4/2008 |
| KR | 1020080042521 | 5/2008 |
| WO | 2007/117127 | 10/2007 |
| WO | 2007117127 | 10/2007 |
| WO | 2009035246 | 3/2009 |

OTHER PUBLICATIONS

Samsung, "DL RS Designs for Higher Order MIMO," 3GPP TSG RAN WG1 #56, R1-090619, Feb. 2009, 8 pages.
Nokia, et al., "CSI-RS design for LTE-Advanced downlink," 3GPP TSG RAN WG1 Meeting #56-bis, R1-091351, 8 pages.
European Patent Office Application Serial No. 10756343.9, Search Report dated Jun. 20, 2014, 8 pages.
State Intellectual Property Office of the People's Republic of China Application Serial No. 201510552017.2, Office Action dated Jun. 4, 2018, 5 pages.
The State Intellectual Property Office of the People's Republic of China Application Serial No. 201080013694.2, Office Action dated Dec. 22, 2014, 5 pages.
Korean Intellectual Property Office Application No. 10-2010-0025968, Notice of Allowance dated Dec. 23, 2016, 6 pages.
Japan Patent Office Application Serial No. 2012-501934, Notice of Allowance dated Apr. 9, 2014, 3 pages.
Samsung, "DL RS Designs for LTE-Advanced," 3GPP TSG RAN WG1 #56bis, R1-091231, Mar. 2009, 5 pages.
ZTE, "Discussion of CQI-RS design for LTE-A CoMP," 3GPP TSG-RAN Working Group 1 Meeting #56, R1-090632, Feb. 2009, 4 pages.
Qualcomm Europe, "Further Considerations and Link Simulations on Reference Signals in LTE-A," 3GPP TSG-RAN WG1 #56, R1-090875, Feb. 2009, 6 pages.
CATT, "Considerations on CQI-RS design for LTE-Advanced," 3GPP TSG RAN WG1 meeting #56bis, R1-091518, Mar. 2009, 6 pages.
NTT DOCOMO, "DL RS Design for LTE-Advanced," 3GPP TSG RAN WG1 Meeting #56bis, R1-091483, Mar. 2009, 6 pages.
Japan Patent Office Application Serial No. 2014-096247, Final Office Action dated Apr. 21, 2015, 6 pages.
Samsung, "DL RS Designs for LTE-Advanced", R1-091231, 3GPP TSG RAN WG1 #56bis, Mar. 2009, 5 pages.
ZTE, "Discussion of CQI-RS design for LTE-A CoMP", R1-090632, 3GPP TSG-RAN Working Group 1 Meeting #56, Feb. 2009, 4 pages.
CATT, "Considerations on CQI-RS design for LTE-Advanced", R1-091518, 3GPP TSG RAN WG1 meeting #56bis, Mar. 2009, 6 pages.
Japan Patent Office Application Serial No. 2012-501934, Office Action dated Mar. 28, 2013, 5 pages.
Qualcomm Europe, "Further Considerations and Link Simulations on Reference Signals in LTE-A," 3GPP TSG-RAN WG1 #56, R1-090875, Feb. 2009, 7 pages.
Japan Patent Office Application Serial No. 2012-501934, Office Action dated Oct. 25, 2013, 3 pages.

\* cited by examiner (a) (b) (c) (d)

FIG. 25
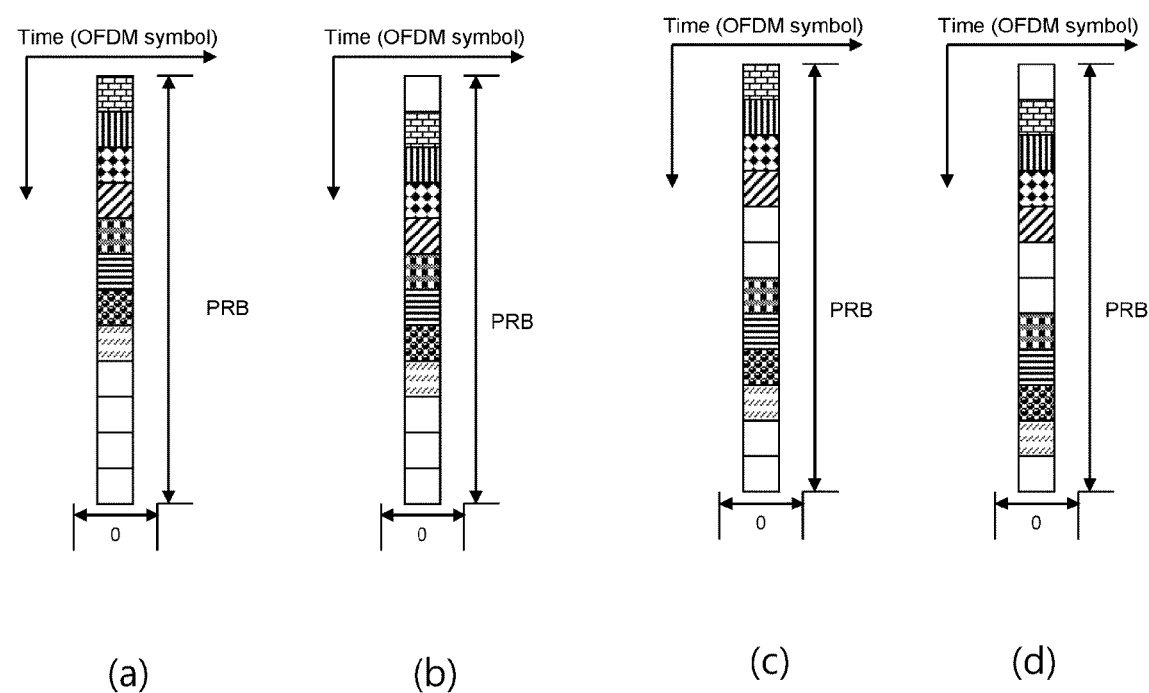
(a)  (b)  (c)  (d)
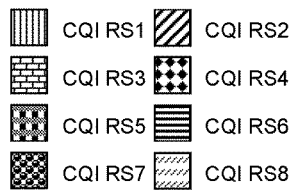

(a) (b) (c) (d)

(a) (b) (c) (d)

CQI RS

CQI RS 1
CQI RS 2

FIG. 50
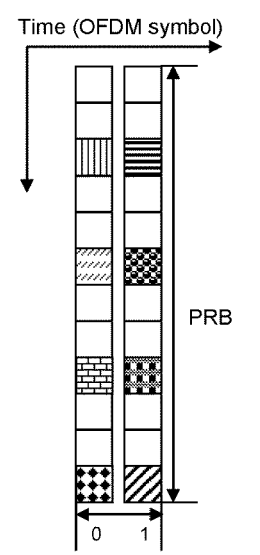
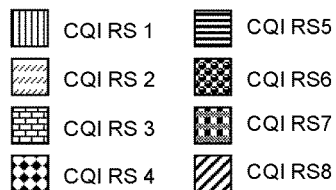

FIG. 71
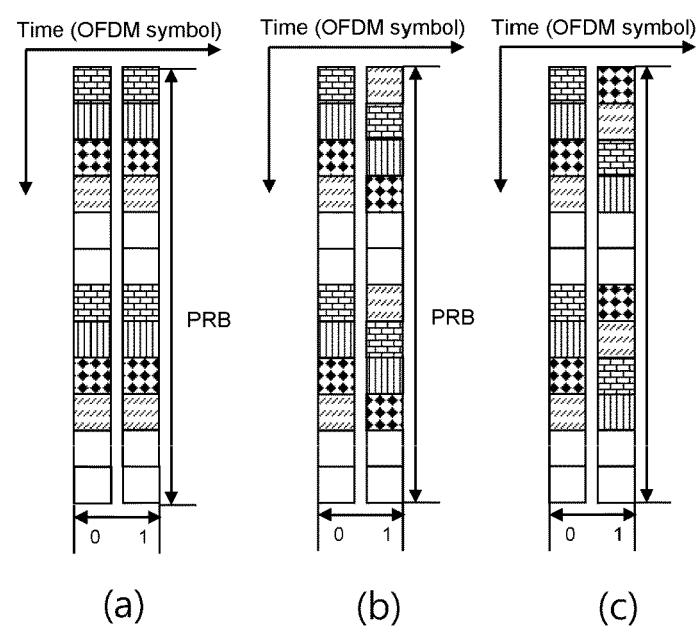
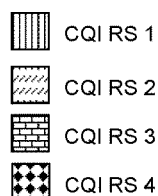

METHOD AND APPARATUS FOR TRANSMITTING REFERENCE SIGNAL IN MULTI-ANTENNA SYSTEM

CROSS-REFERENCE TO RELATED APPLICATIONS

This application is a continuation of U.S. application Ser. No. 16/034,311, filed on Jul. 12, 2018, which is a continuation of U.S. application Ser. No. 14/983,131, filed on Dec. 29, 2015, now U.S. Pat. No. 10,038,478, which is a continuation of U.S. application Ser. No. 14/165,162, filed on Jan. 27, 2014, now U.S. Pat. No. 9,258,038, which is a continuation of U.S. application Ser. No. 13/259,142, filed on Sep. 22, 2011, now U.S. Pat. No. 8,675,481, which is the National Stage filing under 35 U.S.C. 371 of International Application No. PCT/KR2010/001789, filed on Mar. 23, 2010, which claims the benefit of earlier filing date and right of priority to Korean Application No. 10-2010-0025968, filed on Mar. 23, 2010, and also claims the benefit of U.S. Provisional Application No. 61/299,354, filed on Jan. 29, 2010, 61/163,874, filed on Mar. 27, 2009, 61/162,684, filed on Mar. 24, 2009, and 61/162,344, filed on Mar. 23, 2009, the contents of which are all incorporated by reference herein in their entirety.

TECHNICAL FIELD

The present invention relates to wireless communications, and more particularly, to a method and apparatus for transmitting a reference signal in a multi-antenna system.

BACKGROUND ART

To maximize performance and communication capacity of a wireless communication system, a multiple input multiple output (MIMO) system has drawn attention in recent years. Being evolved from the conventional technique in which a single transmit (Tx) antenna and a single receive (Rx) antenna are used, a MIMO technique uses multiple Tx antennas and multiple Rx antennas to improve transfer efficiency of data to be transmitted or received. The MIMO system is also referred to as a multiple antenna system. In the MIMO technique, instead of receiving one whole message through a single antenna path, data segments are received through a plurality of antennas and are then collected as one piece of data. As a result, a data transfer rate can be improved in a specific range, or a system range can be increased with respect to a specific data transfer rate.

The MIMO technique includes transmit diversity, spatial multiplexing, and beamforming. The transmit diversity is a technique in which the multiple Tx antennas transmit the same data so that transmission reliability increases. The spatial multiplexing is a technique in which the multiple Tx antennas simultaneously transmit different data so that data can be transmitted at a high speed without increasing a system bandwidth. The beamforming is used to add a weight to multiple antennas according to a channel condition so as to increase a signal to interference plus noise ratio (SINR) of a signal. In this case, the weight can be expressed by a weight vector or a weight matrix, which is respectively referred to as a precoding vector or a precoding matrix.

The spatial multiplexing is classified into single-user spatial multiplexing and multi-user spatial multiplexing. The single-user spatial multiplexing is also referred to as a single user MIMO (SU-MIMO). The multi-user spatial multiplexing is also referred to as a spatial division multiple access (SDMA) or a multi user MIMO (MU-MIMO). A capacity of a MIMO channel increases in proportion to the number of antennas. The MIMO channel can be decomposed into independent channels. If the number of Tx antennas is Nt, and the number of Rx antennas is Nr, then the number of independent channels is Ni where Ni≤min{Nt, Mr}. Each independent channel can be referred to as a spatial layer. A rank represents the number of non-zero eigen-values of the MIMO channel and can be defined as the number of spatial streams that can be multiplexed.

For the purpose of data transmission/reception, system synchronization acquisition, channel information feedback, etc., there is a need to estimate an uplink channel or a downlink channel in the wireless communication system. Channel estimation is a process of recovering a transmission signal by compensating for signal distortion in an environment where a rapid change occurs due to fading. In general, channel estimation requires a reference signal or a pilot known to both the transmitter and the receiver.

In the multi-antenna system, each antenna may experience a different channel, and thus there is a need to design a deployment structure of a reference signal by considering each antenna. Conventionally, when a signal is transmitted from a base station to a user equipment, reference signals are deployed under the assumption that up to 4 antennas are used. However, a next generation wireless communication system can transmit a downlink signal by using a more number of antennas, i.e., up to 8 antennas. In this case, how to deploy and transmit the reference signals needs to be taken into account.

SUMMARY OF INVENTION

Technical Problem

The present invention provides a method and apparatus for transmitting a reference signal in a multi-antenna system.

Technical Solution

According to an aspect of the present invention, a method for transmitting a reference signal in a multi-antenna system. The method includes: selecting at least one orthogonal frequency division multiplexing (OFDM) symbol in a subframe containing a plurality of OFDM symbols; allocating a channel quality indication reference signal (CQI RS) capable of measuring a channel state for each of a plurality of antennas to the selected at least one OFDM symbol; and transmitting the CQI RS, wherein the CQI RS is allocated to an OFDM symbol which does not overlap with an OFDM symbol to which a common reference signal to be transmitted to all user equipments in a cell or a dedicated reference signal to be transmitted to a specific user equipment in the cell is allocated.

Advantageous Effects

Reference signals corresponding to a more number of antennas in comparison with the conventional antennas in a multi-antenna system can be transmitted by being deployed in various manners according to available radio resources. That is, the reference signals can be transmitted adaptively according to a situation of a wireless communication system.

DESCRIPTION OF DRAWINGS

FIG. 25 shows other examples in which a CQI RS is transmitted in one OFDM symbol in a subframe and in which 8 CQI RSs are deployed to 8 resource elements in a frequency band corresponding to one resource block.

FIG. 50 and FIG. 51 show examples in which a CQI RS is transmitted in two OFDM symbols in a subframe and in which 8 CQI RSs are deployed to 8 resource elements.

FIG. 70 and FIG. 71 show examples for deploying four CQI RSs to 16 resource elements in two OFDM symbols in a subframe.

MODE FOR INVENTION

Figure 1:
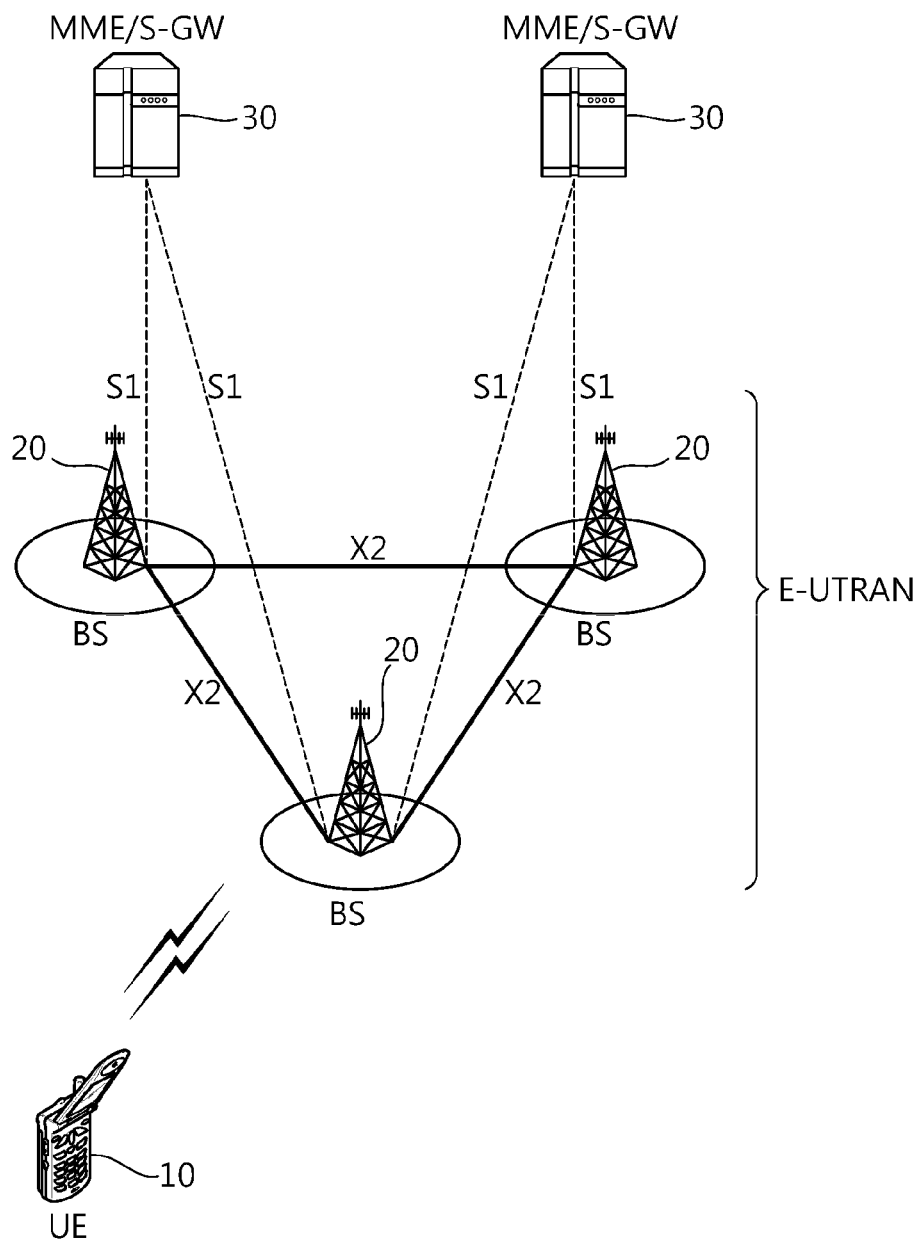
FIG. 1 shows a structure of a wireless communication system.

FIG. 1 shows a structure of a wireless communication system. The wireless communication system may have a network structure of an evolved-universal mobile telecommunications system (E-UMTS). An E-UMTS system may also be referred to as a long term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. The cell is an area in which the BS 20 provides a communication service. Interfaces for transmitting user traffic or control traffic may be used between the BSs 20. Hereinafter, a downlink is defined as a communication link from the BS 20 to the UE 10, and an uplink is defined as a communication link from the UE 10 to the BS 20.

The BSs 20 are interconnected by means of an X2 interface. The BSs 20 are also connected by means of an S1 interface to an evolved packet core (EPC), more specifically, to a mobility management entity (MME)/serving gateway (S-GW) 30. The S1 interface supports a many-to-many relation between the BS 20 and the MME/S-GW 30.

Layers of a radio interface protocol between the UE and the network can be classified into L1 layer (a first layer), L2 layer (a second layer), and L3 layer (a third layer) based on the lower three layers of the open system interconnection (OSI) model that is well-known in the communication system. The first layer is a physical (PHY) layer. The second layer can be classified into a medium access control (MAC) layer, a radio link control (RLC) layer, and a packet data convergence protocol (PDCP) layer. The third layer is a radio resource control (RRC) layer.

The wireless communication system may be a system based on orthogonal frequency division multiplexing (OFDM)/orthogonal frequency division multiple access (OFDMA). The OFDM uses a plurality of orthogonal subcarriers. Further, the OFDM uses an orthogonality between inverse fast Fourier transform (IFFT) and fast Fourier transform (FFT). A transmitter transmits data by performing IFFT on the data. A receiver restores original data by performing FFT on a received signal. The transmitter uses IFFT to combine the plurality of subcarriers, and the receiver uses FFT to split the plurality of subcarriers.

The wireless communication system may be a multiple antenna system. The multiple antenna system may be a multiple input multiple output (MIMO) system. The multiple antenna system may be a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

The multiple antenna system can use a scheme using multiple antennas. In case of a rank 1, the scheme may be space-time coding (STC) (e.g., space frequency block code (SFBC) and space time block code (STBC)), cyclic delay diversity (CDD), frequency switched Tx diversity (FSTD), time switched Tx diversity (TSTD), etc. In case of a rank 2 or higher ranks, the scheme may be spatial multiplexing (SM), generalized cyclic delay diversity (GCDD), selective virtual antenna permutation (S-VAP), etc. The SFBC is a scheme for effectively applying selectivity in a space domain and a frequency domain to ensure both a diversity gain and a multi-user scheduling gain in a corresponding dimension. The STBC is a scheme for applying selectivity in the space domain and a time domain. The FSTD is a scheme in which signals transmitted to multiple antennas are divided based on frequency, and the TSTD is a scheme in which the signals transmitted to the multiple antennas are divided based on time. The SM is a scheme for transmitting different data to each antenna to improve a transfer rate. The GCDD is a scheme for applying selectivity in the time domain and the frequency domain. The S-VAP is a scheme using a single precoding matrix, and includes a multi-codeword (MCW) S-VAP for mixing multi-codewords to antennas in spatial diversity or spatial multiplexing and a single codeword (SCW) S-VAP using a single codeword.

Figure 2:
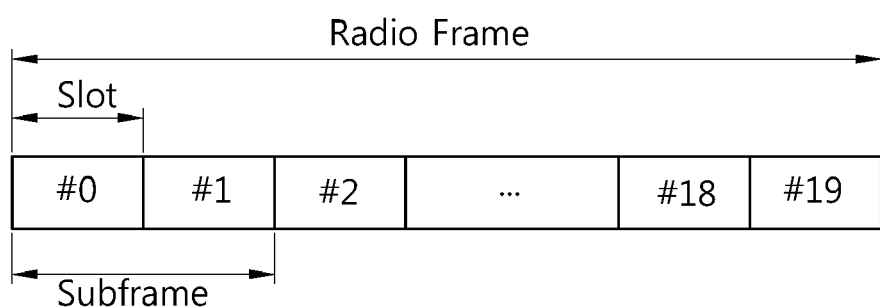
FIG. 2 shows a radio frame structure.

FIG. 2 shows a radio frame structure.

Referring to FIG. 2, a radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Figure 3:
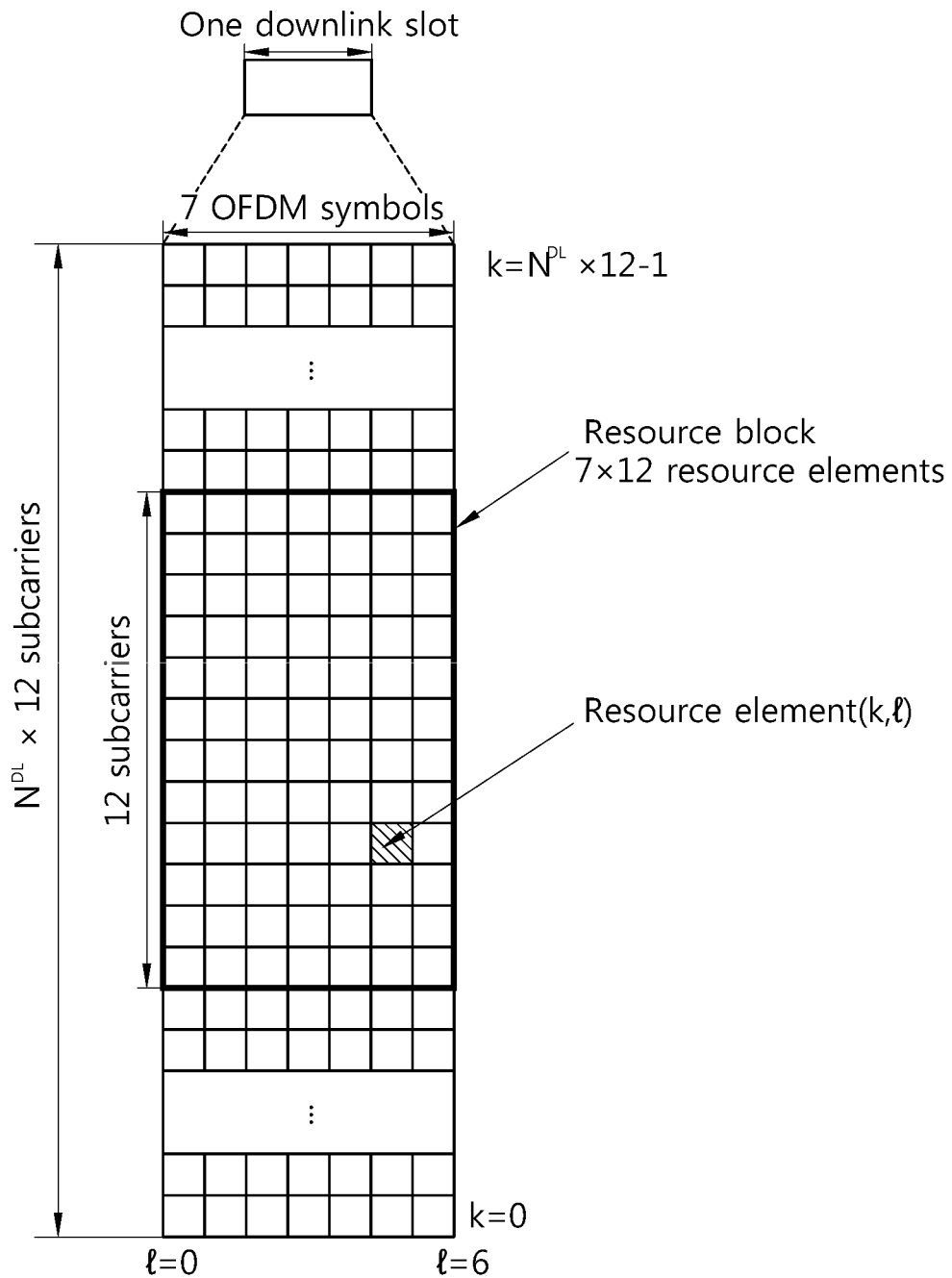
FIG. 3 shows an example of a resource grid for one downlink slot.

FIG. 3 shows an example of a resource grid for one downlink slot.

Referring to FIG. 3, the downlink slot includes a plurality of OFDM symbols in a time domain and $N^{DL}$ resource blocks (RBs) in a frequency domain. The number $N^{DL}$ of resource blocks included in the downlink slot depends on a downlink transmission bandwidth determined in a cell. For example, in an LTE system, $N^{DL}$ may be any one of values 60 to 110. One RB includes a plurality of subcarriers in the frequency domain.

Each element on the resource grid is referred to as a resource element. The resource element on the resource grid can be identified by an index pair (k, l) within the slot. Herein, $k(k=0, \ldots, N^{DL} \times 12 - 1)$ denotes a subcarrier index in the frequency domain, and l(l=0, . . . , 6) denotes an OFDM symbol index in the time domain.

Although it is described herein that one RB includes 7×12 resource elements consisting of 7 OFDM symbols in the time domain and 12 subcarriers in the frequency domain for example, the number of OFDM symbols and the number of subcarriers in the RB are not limited thereto. Thus, the number of OFDM symbols and the number of subcarriers may change variously depending on a cyclic prefix (CP) length, a frequency spacing, etc. For example, when using a normal CP, the number of OFDM symbols is 7, and when using an extended CP, the number of OFDM symbols is 6. In one OFDM symbol, the number of subcarriers may be selected from 128, 256, 512, 1024, 1536, and 2048.

Figure 4:
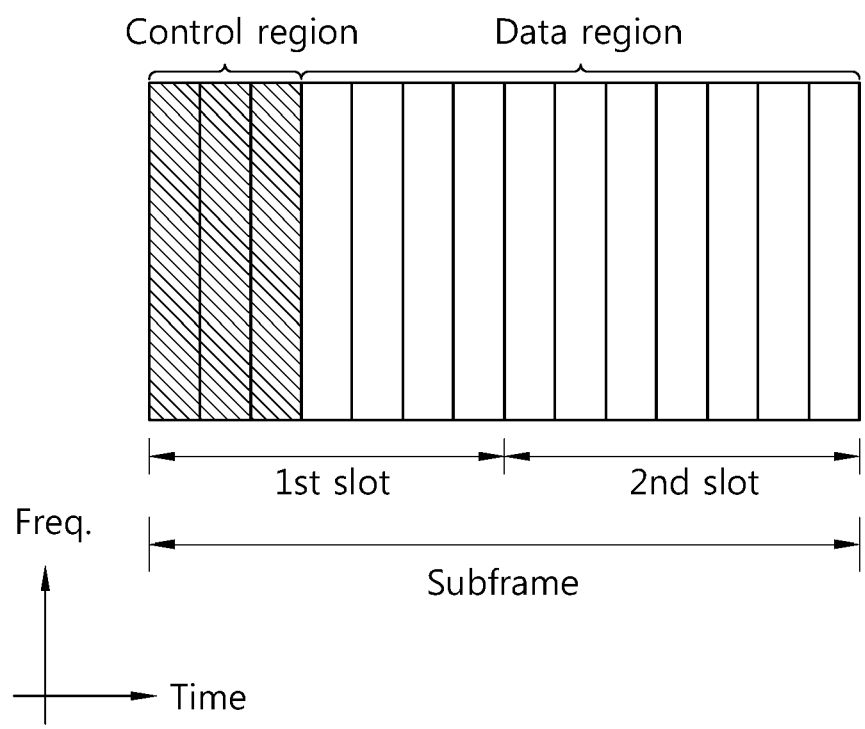
FIG. 4 shows a structure of a subframe.

FIG. 4 shows a structure of a subframe.

Referring to FIG. 4, the subframe includes two consecutive slots. A maximum of three OFDM symbols located in a front portion of a 1st slot within the subframe correspond to a control region to be assigned with a PDCCH. The remaining OFDM symbols correspond to a data region to be assigned with a PDSCH. The PDCCH informs a UE of resource assignment of the PCH and DL-SCH, and also informs the UE of HARQ information related to the DL-SCH. The PDCCH may carry an uplink (UL) scheduling grant which informs the UE of resource assignment for uplink transmission. In addition to the PDCCH, control channels such as a PCFICH, a PHICH, etc., can be assigned to the control region. The PCFICH informs the UE of the number of OFDM symbols used for transmission of the PDCCHs within a subframe. The PCFICH can be transmitted in every subframe. The PHICH carries HARQ acknowledgement (ACK)/negative-acknowledgement (NACK) signals in response to uplink transmission. The UE can read data information transmitted through the PDSCH by decoding control information transmitted through the PDCCH. Although the control region includes three OFDM symbols herein, this is for exemplary purposes only. Thus, two OFDM symbols or one OFDM symbol may be included in the control region The number of OFDM symbols included in the control region of the subframe can be known by using the PCFICH.

Hereinafter, a resource element used for reference signal (RS) transmission is referred to as a reference symbol. Resource elements other than the reference symbol can be used for data transmission. A resource element used for data transmission is referred to as a data symbol.

The RS may be multiplied by a predetermined RS sequence when transmitted. For example, the RS sequence may be a pseudo-random (PN) sequence, an m-sequence, etc. The RS sequence may be a binary sequence or a complex sequence. When a BS transmits the RS multiplied by the RS sequence, a UE can reduce interference of the RS received from a neighbor cell and thus can improve channel estimation performance.

The RS can be classified into a common RS and a dedicated RS. The common RS is an RS transmitted to all UEs in a cell. The dedicated RS is an RS transmitted to a specific UE group or a specific UE in the cell. The common RS may also be referred to as a cell-specific RS. The dedicated RS may also be referred to as a UE-specific RS. The common RS may be transmitted using all downlink subframes. The dedicated RS may be transmitted using a specific resource region allocated to the UE.

The UE may perform data demodulation and channel quality measurement by using channel information obtained from the RS. Since a radio channel has characteristics of delay spreading and frequency and time variations due to a Doppler effect, the RS has to be designed by considering a frequency and time selective channel change. Further, the RS has to be designed not to exceed a proper overhead so that data transmission is not affected by the overhead caused by RS transmission.

In an LTE system having 4 Tx antennas (i.e., 4Tx transmission), an RS defined for 4Tx is transmitted by using an SFBC-FSTD scheme for a control channel. A UE obtains channel information by using the RS and then performs demodulation. In the LTE system, first 2 or 3 OFDM symbols of a subframe consisting of 14 or 12 consecutive OFDM symbols are allocated as the control channel, and the remaining OFDM symbol of the subframe are allocated as a data channel. In particular, the control channel is transmitted using a transmit diversity scheme defined according to an antenna configuration of the BS.

First, a common RS will be described.

Figure 5:
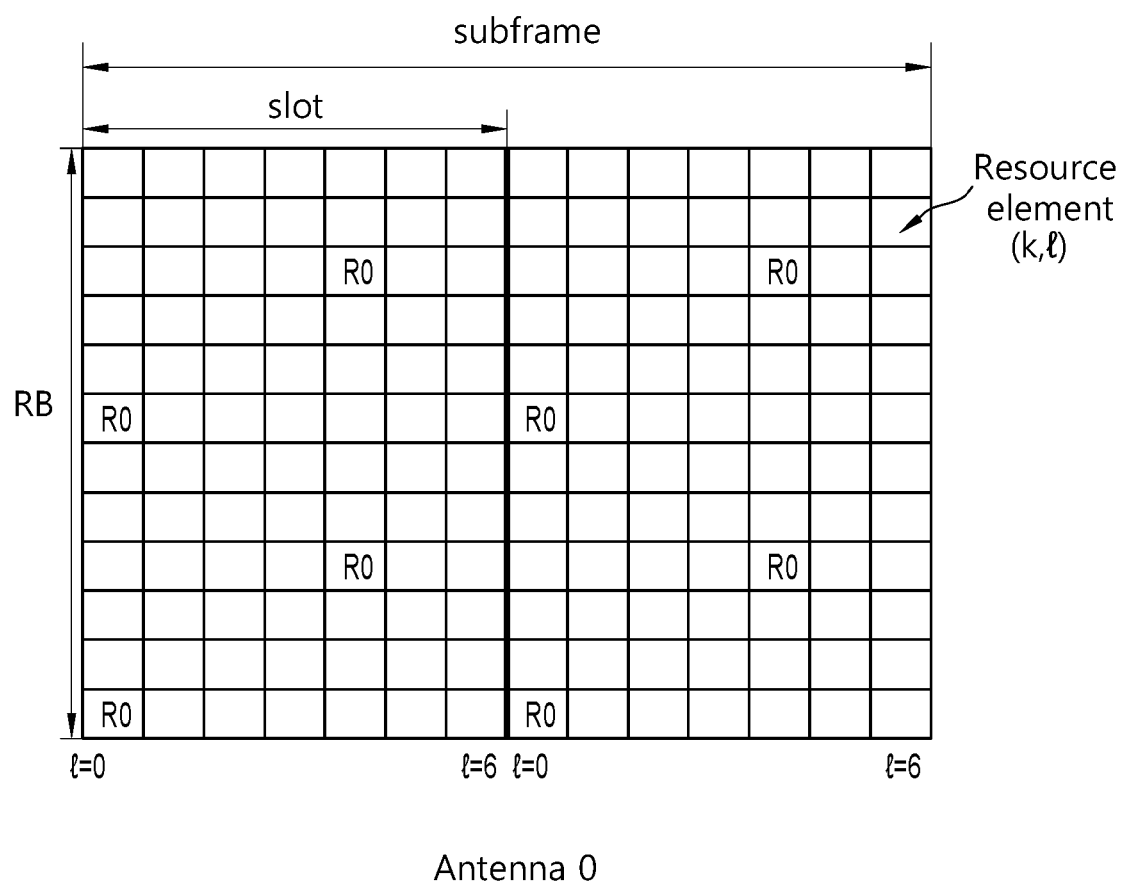
FIG. 5 shows an exemplary structure of a common reference signal (RS) for one antenna.
Figure 6:
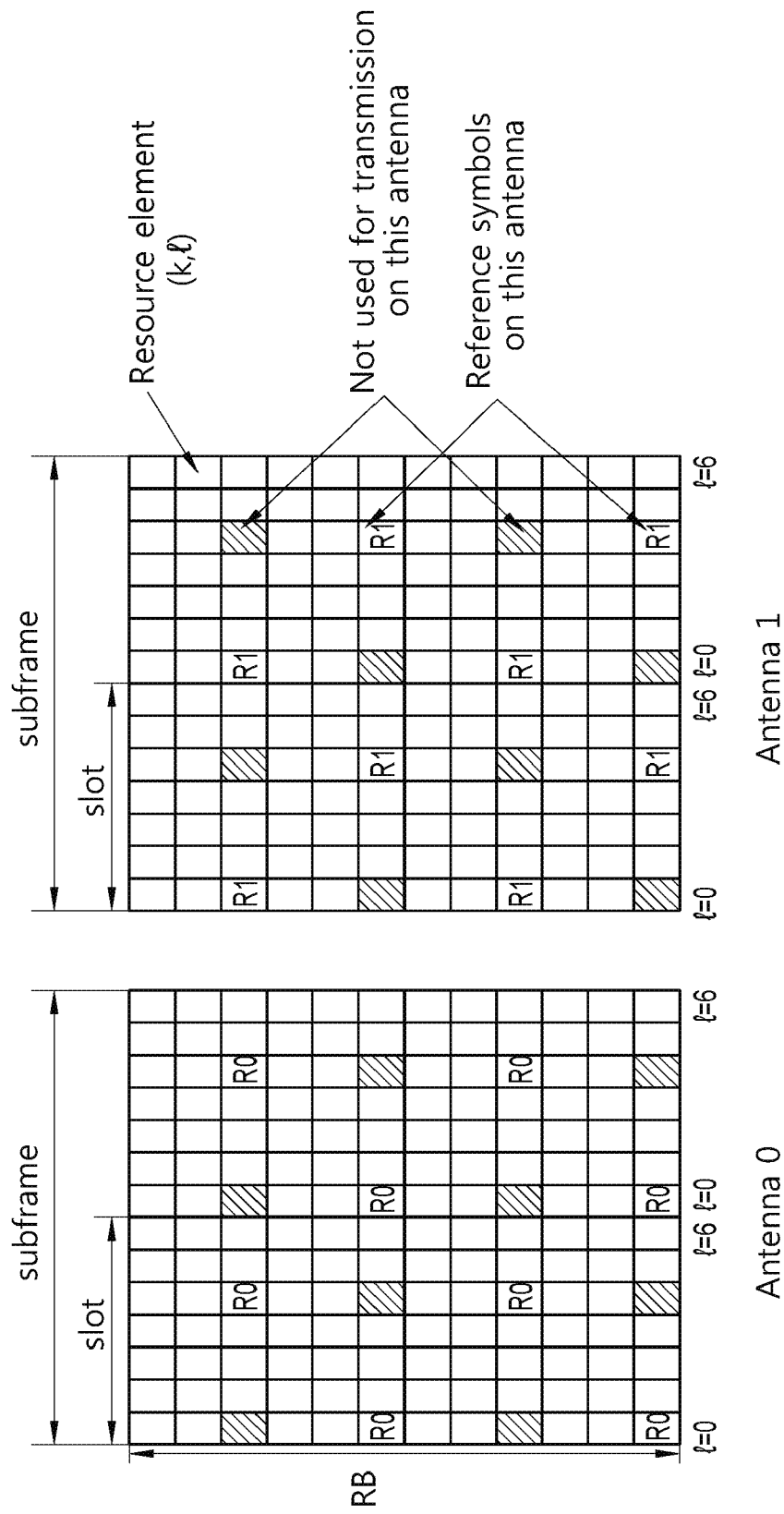
FIG. 6 shows an exemplary structure of a common RS for two antennas.
Figure 7:
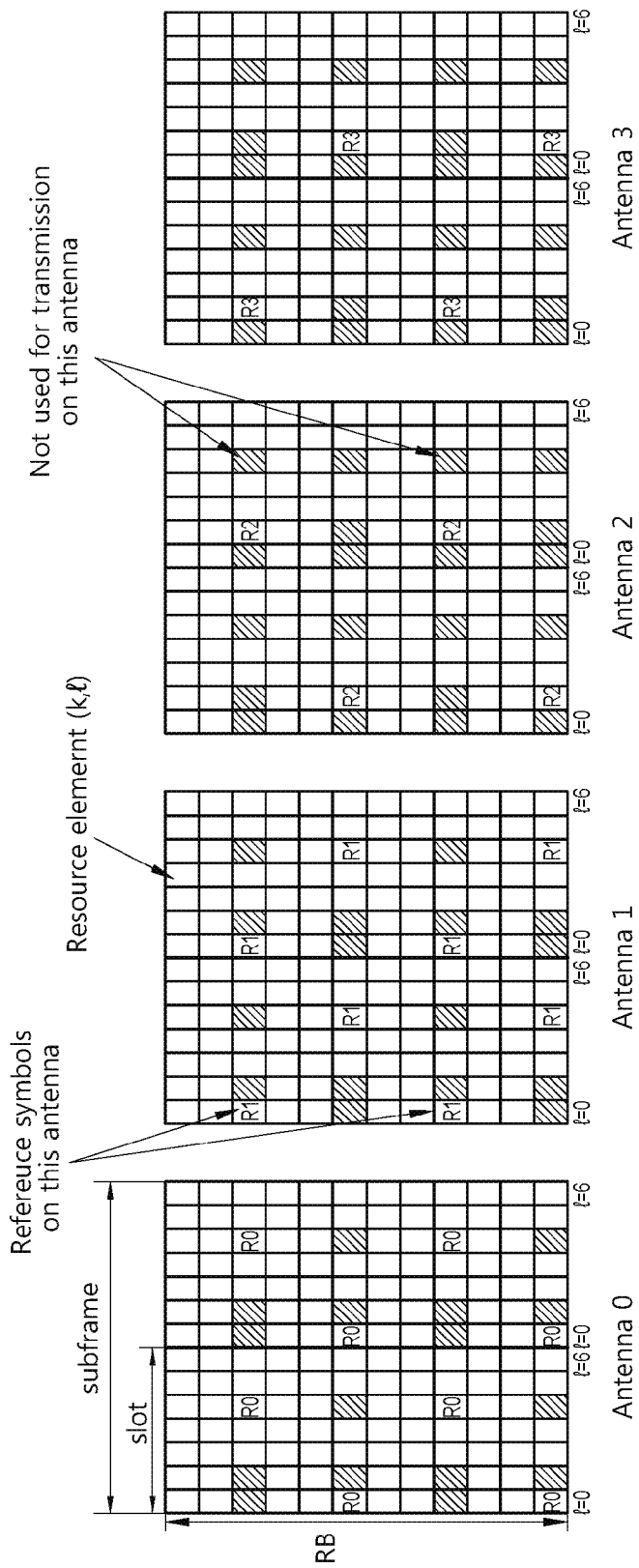
FIG. 7 shows an exemplary structure of a common RS for four antennas in a subframe when using a normal cyclic prefix (CP).
Figure 8:
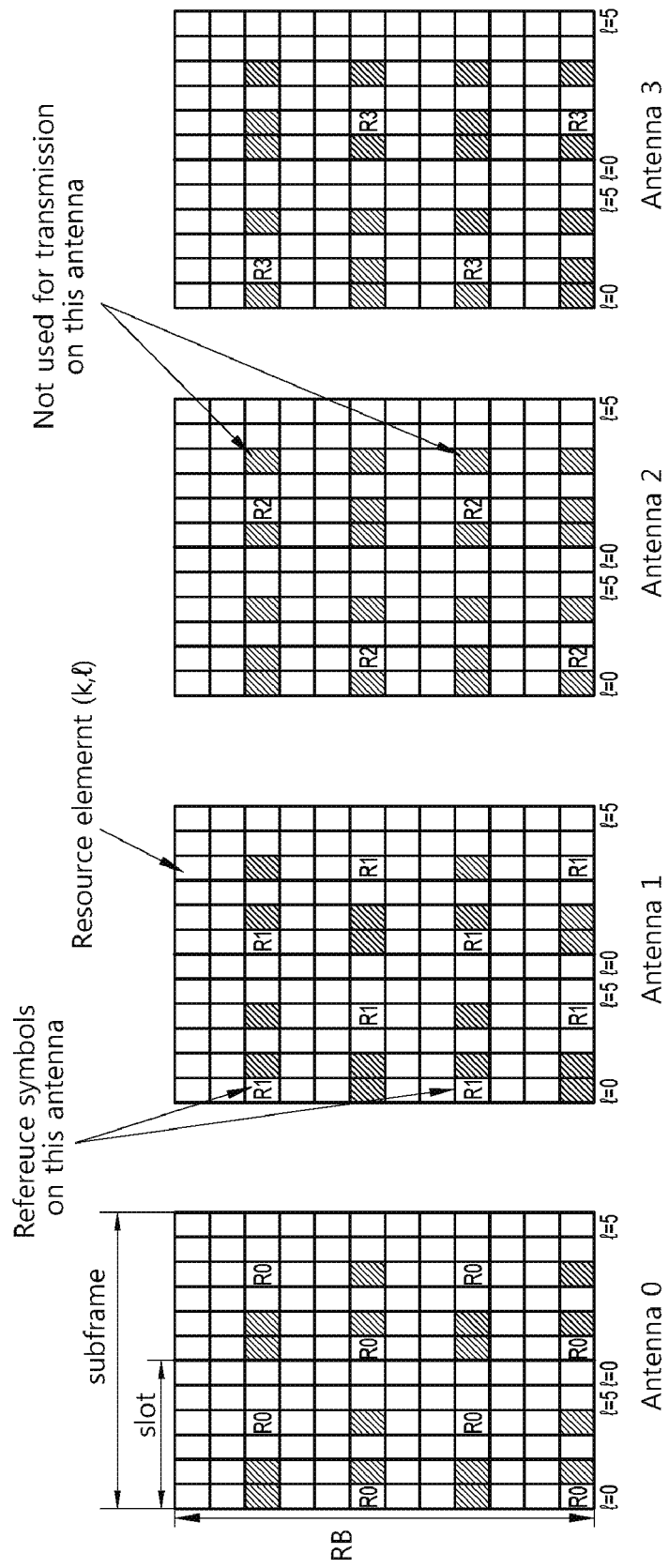
FIG. 8 shows an exemplary structure of a common RS for four antennas in a subframe when using an extended CP.

FIG. 5 shows an exemplary structure of a common RS for one antenna. FIG. 6 shows an exemplary structure of a common RS for two antennas. FIG. 7 shows an exemplary structure of a common RS for four antennas in a subframe when using a normal CP. FIG. 8 shows an exemplary structure of a common RS for four antennas in a subframe when using an extended CP. The section 6.10.1 of 3GPP TS 36.211 V8.4.0 (2008 September) Technical Specification Group Radio Access Network; Evolved Universal Terrestrial Radio Access (E-UTRA); Physical Channels and Modulation (Release 8) may be incorporated herein by reference.

Referring to FIGS. 5 to 8, in case of multiple antenna transmission using a plurality of antennas, a resource grid exists for each antenna, and at least one RS for each antenna may be mapped to the resource grid. The RS for each antenna consists of reference symbols. Rp denotes a reference symbol of an antenna #p (where $p \in \{0, 1, 2, 3\}$). R0 to R3 are not mapped to overlapping resource elements.

In one OFDM symbol, each Rp may be positioned with a spacing of 6 subcarriers. In a subframe, the number of R0s is equal to the number of R1s, and the number of R2s is equal to the number of R3s. In the subframe, the number of R2s and R3s is less than the number of R0s and R1s. Rp is not used in any transmission through antennas except for the antenna #p. This is to avoid inter-antenna interference. The number of transmitted common RSs is equal to the number of antennas irrespective of the number of streams. The common RS has an independent RS for each antenna. A frequency-domain position and a time-domain position of the common RS in the subframe are determined irrespective of the UEs. A common RS sequence to be multiplied by the common RS is generated also irrespective of the UEs. Therefore, all UEs within the cell can receive the common RS. However, a position of the common RS in the subframe and the common RS sequence may be determined according to a cell identifier (ID). Thus, the common RS is also referred to as a cell-specific RS.

More specifically, the time-domain position of the common RS in the subframe may be determined according to an antenna number and the number of OFDM symbols in a resource block. The frequency-domain position of the common RS in the subframe may be determined according to an antenna number, a cell ID, an OFDM symbol index l, a slot number in a radio frame, etc.

The common RS sequence may be used in one subframe on an OFDM symbol basis. The common RS sequence may vary according to a cell ID, a slot number in one radio frame, an OFDM symbol index in a slot, a CP type, etc.

In an OFDM symbol including reference symbols, the number of reference symbols for each antenna is 2. Since a subframe includes $N^{DL}$ resource blocks in the frequency domain, the number of reference symbols for each antenna is $2 \times N^{DL}$ in one OFDM symbol. Thus, a common RS sequence has a length of $2 \times N^{DL}$.

When r(m) denotes a common RS sequence, Equation 1 shows an example of a complex sequences used as r(m).

$$r_{l,n_s}(m) = \frac{1}{\sqrt{2}}(1 - 2 \cdot c(2m)) + j\frac{1}{\sqrt{2}}(1 - 2 \cdot c(2m+1)),\quad\text{[Equation 1]}$$

Herein, $n_s$ denotes a slot number in a radio frame, and l denotes an OFDM symbol number in a slot. m is 0,1, ..., $2N^{max,DL}-1$. $N^{max,DL}$ denotes the number of resource blocks corresponding to a maximum bandwidth. For example, in the LTE system, $N^{max,DL}$ may be 110. c(i) denotes a PN sequence, and may be defined by a gold sequence having a length of 31. Equation 2 shows an example of the sequence c(i) having a length of $2 \times N^{max,DL}$.

$$c(n)=(x_1(n+N_c)+x_2(n+N_c))\bmod 2$$

$$x_1(n+31)=(x_1(n+3)+x_1(n))\bmod 2$$

$$x_2(n+31)=(x_2(n+3)+x_2(n+2)+x_1(n+1)+x_1(n))\bmod 2 \quad\text{[Equation 2]}$$

Herein, $N_C$ is 1600, $x_1(i)$ denotes a $1^{st}$ m-sequence, and $x_2(i)$ denotes a $2^{nd}$ m-sequence. For example, the $1^{st}$ m-sequence or the $2^{nd}$ m-sequence can be initialized according to a cell ID for each OFDM symbol, a slot number in one radio frame, an OFDM symbol index in a slot, a CP type, etc. Equation 3 shows an example of an initialized PN sequence $c_{init}$.

$$c_{init} = 2^{10} \cdot (7 \cdot (n_s+1)+l+1) \cdot (2 \cdot N_{ID}^{cell}+1)+2 \cdot N_{ID}^{cell}+N_{CP} \quad\text{[Equation 3]}$$

Herein, $N_{CP}$ is 1 in case of a normal CP, and is 0 in case of an extended CP.

The generated common RS sequence is mapped to a resource element. Equation 4 shows an example of mapping the common RS sequence to the resource element. The common RS sequence may be mapped to complex-valued modulation symbols $a_{k,l}^{(p)}$ for an antenna p in the slot $n_s$.

$$a_{k,l}^{(p)} = r_{l,n_s}(m') \quad\text{[Equation 4]}$$

$$k = 6m + (v + v_{shift})\bmod 6$$

$$l = \begin{cases} 0, N_{symb}^{DL}-3 & \text{if } p \in \{0,1\} \\ 1 & \text{if } p \in \{2,3\} \end{cases}$$

$$m = 0, 1, \ldots, 2 \cdot N_{RB}^{DL}-1$$

$$m' = m + N_{RB}^{max,DL} - N_{RB}^{DL}$$

Herein, v and $v_{shift}$ are defined by frequency-domain positions for different RSs. v may be given as shown in Equation 5.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s\bmod 2) & \text{if } p = 2 \\ 3 + 3(n_s\bmod 2) & \text{if } p = 3 \end{cases} \quad\text{[Equation 5]}$$

A cell-specific frequency shift $v_{shift}$ can be defined as shown in Equation 6.

$$v_{shift} = N_{ID}^{cell} \bmod 6 \quad\text{[Equation 6]}$$

Meanwhile, in a system having a smaller bandwidth than $N^{max,DL}$, only a certain part of the RS sequence generated in a length of $2 \times N^{max,DL}$ may be selected and used.

Now, a dedicated RS will be described.

Figure 9:
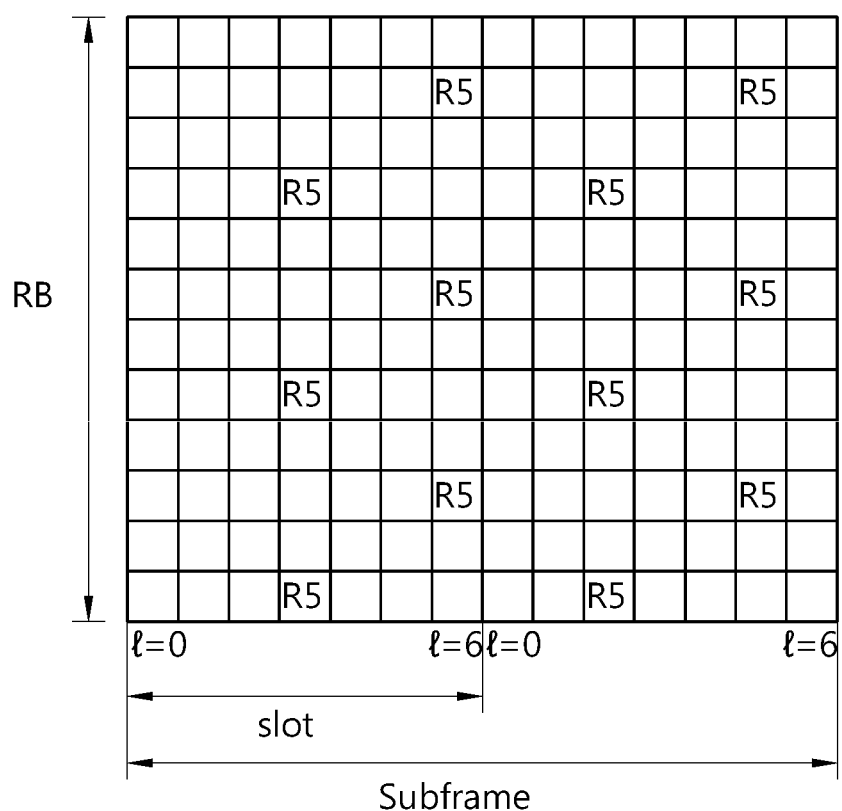
FIG. 9 shows an exemplary structure of a dedicated RS in a subframe when using a normal CP.
Figure 10:
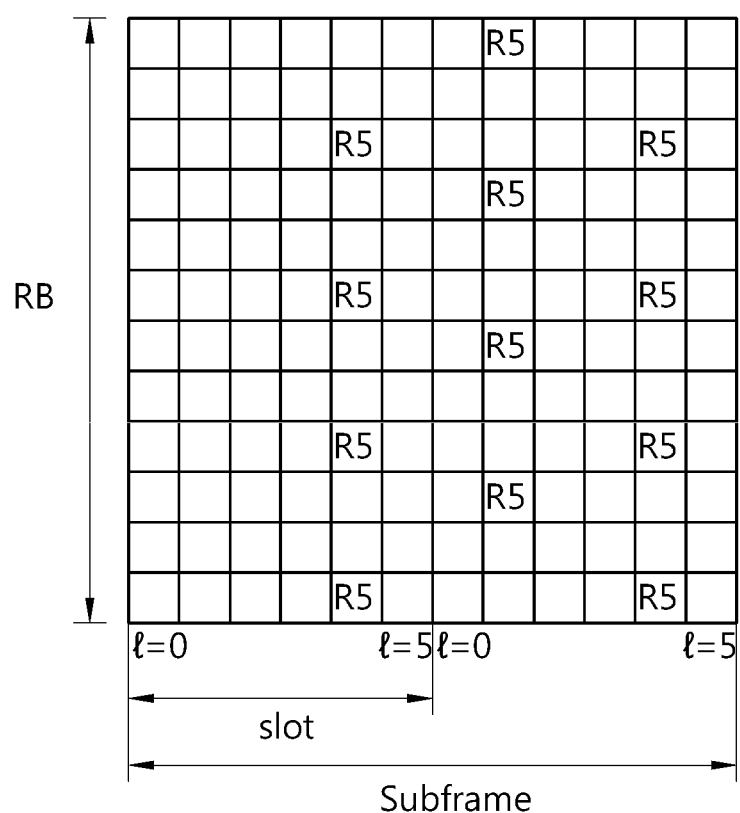
FIG. 10 shows an exemplary structure of a dedicated RS in a subframe when using an extended CP.

FIG. 9 shows an exemplary structure of a dedicated RS in a subframe when using a normal CP. FIG. 10 shows an exemplary structure of a dedicated RS in a subframe when using an extended CP.

Referring to FIGS. 9 and 10, when using the normal CP, one TTI includes 14 OFDM symbols. When using the extended CP, one TTI includes 12 OFDM symbols. Herein, R5 denotes a reference symbol of an antenna #5 transmitting the dedicated RS. When using the normal CP, the reference symbol is positioned with a spacing of 4 subcarriers in one OFDM symbol including the reference symbol. When using the extended CP, the reference symbol is positioned with a spacing of 3 subcarriers in one OFDM symbol including the reference symbol.

The number of transmitted dedicated RSs is equal to the number of streams. The dedicated RS may be used when a BS transmits downlink information to a specific UE by performing beamforming on the downlink information. The dedicated RS may be included in a data region instead of a control region. The dedicated RS may be transmitted using a resource block to which a PDSCH is mapped. That is, a dedicated RS for a specific UE may be transmitted through a PDSCH allocated to the specific UE.

A frequency-domain position and a time-domain position of the dedicated RS in a subframe may be determined according to a resource block allocated for PDSCH transmission. A dedicated RS sequence to be multiplied by the dedicated RS may be determined according to a UE ID. In this case, only the specific UE corresponding to the UE ID in a cell may receive the dedicated RS. Therefore, the dedicated RS is also referred to as a UE-specific RS.

More specifically, the time-domain position of the dedicated RS in the subframe may be determined according to a slot number in a radio frame and a CP type. The frequency-domain position of the dedicated RS in the subframe may be determined according to a resource block allocated for PDSCH transmission, a cell ID, an OFDM symbol index l, a CP type, etc.

The common RS and the dedicated RS may be simultaneously used. For example, it is assumed that control information is transmitted on 3 OFDM symbols (l=0,1,2) of a $1^{st}$ slot in a subframe. OFDM symbols indexed with 0, 1, and 2 (l=0,1,2) may use the common RS. The remaining OFDM symbols other than the 3 OFDM symbols may use the dedicated RS.

In the multiple antenna system in which the antenna configuration increases, there is a need to design an RS structure and a transmission scheme depending on the increased antenna configuration. For example, if the antenna configuration increases from the existing 4Tx system to an 8Tx system, an RS of each antenna may be transmitted by being multiplexed in a time domain or a frequency domain or a code domain to identify channels of eight Tx antennas. An RS for each antenna may be an RS for channel measurement for each Tx antenna. Hereinafter, the RS for channel measurement for each Tx antenna is referred to as a channel quality measurement reference signal (or simply, CQI RS).

Figure 11:
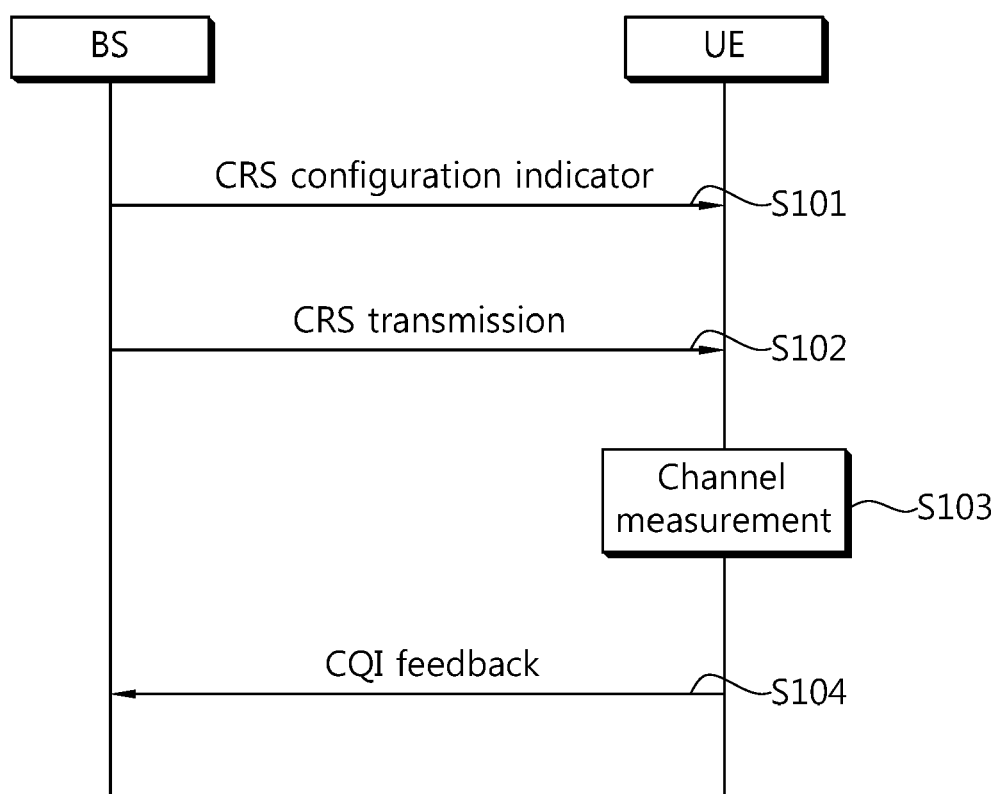
FIG. 11 shows a method of transmitting a reference signal in a multi-antenna system according to an embodiment of the present invention.

FIG. 11 shows a method of transmitting a reference signal in a multi-antenna system according to an embodiment of the present invention.

Referring to FIG. 11, a BS transmits a CQI RS (CRS) configuration indicator to a UE (step S101). The CRS configuration indicator may indicate the entirety or part of radio resource information capable of transmitting a CQI RS (or CRS), for example, a subframe in which the CQI RS is transmitted, period information, a time offset, an OFDM symbol in the subframe and/or CRS configuration information such as a resource element, a resource element pattern in the subframe, antenna information, etc.

The subframe in which the CQI RS is transmitted may be a subframe which is not a subframe in which a primary synchronization channel (P-SCH), a secondary synchronization channel (S-SCH), or a physical-broadcast channel (BCH) is transmitted. The P-SCH is used to acquire OFDM symbol synchronization or slot synchronization. The P-SCH is located in a last OFDM symbol of a slot 0 and a slot 10. That is, the P-SCH is transmitted in a subframe 0 and a subframe 5. The S-SCH is used to acquire frame synchronization. The S-SCH is located in an OFDM symbol immediately before the last OFDM symbol of the slot 0 and the slot 10. That is, the S-SCH is transmitted in the subframe 0 and the subframe 5. The number of OFDM symbols to which the P-SCH and the S-SCH are deployed on a slot or locations thereof are for exemplary purposes only, and can change variously depending on a system. The P-BCH is located in the subframe 0 in a radio frame. The P-BCH is used to acquire basic system configuration information of the BS. The P-BCH can be transmitted periodically. For example, the P-BCH can have a period of 40 ms.

The CQI RS can be transmitted periodically, and period information indicates a period thereof. For example, the CQI RS can be transmitted repetitively with a period corresponding to 5, 10, 20, and 50 subframes. The time offset indicates offset information for a subframe scheduled to transmit the CQI RS. For example, a CQI RS which is scheduled to be transmitted in a subframe n can be transmitted in any one of subframes n+0, n+1, n+2, n+3, and n+4 if the time offset is given.

The antenna information indicates information on an antenna which additionally requires a CQI RS according to whether a cell-specific RS (i.e., a common RS) used in the conventional system is utilized as the CQI RS. For example, the common RS used in the conventional system that uses 4 antennas can be used as a CQI RS in a new system that uses 8 antennas. In this case, the number of antennas that additionally require the CQI RS may differ depending on the number of antennas to which the common RS used in the conventional system is applied among the 8 antennas. If the conventional common RS is used only for one of the 8 antennas, the CQI RS is necessary only for 7 antennas. Alternatively, if the conventional common RS is used for two or four antennas, the CQI RS is necessary for six or four antennas. Alternatively, without having to use the common RS used in the conventional system, the CQI RS can be defined for the 8 antennas. Although an example of defining the CQI RS for the 8 antennas will be described hereinafter, the present invention is not limited thereto. Thus, the present invention can also apply to a case where the conventional common RS is re-utilized as the CQI RS.

The CQI RS configuration indicator that indicates any one of the aforementioned information may be broadcast to all UEs in a cell, and may be transmitted through an L1/L2 signal to a specific UE or UE group.

The BS transmits a CQI RS (i.e., CRS) to the UE (step S102). A radio resource to which the CQI RS is deployed in a subframe, that is, an OFDM symbol and/or a resource element in a subframe in which the CQI RS is deployed, a resource element pattern in the subframe, or the like when the BS transmits the CQI RS will be described below in detail.

The UE receives the CQI RS and measures a channel for each Tx antenna (step S103). After channel measurement, the UE feeds back downlink channel measurement information such as a channel quality indicator (CQI) to the BS (step S104).

Now, a resource element pattern and a resource element capable of deploying a CQI RS in a subframe will be described.

The CQI RS can be deployed to a radio resource other than a radio resource to which a common RS or a dedicated RS is deployed. In case of a normal CP, the common RS can be transmitted in OFDM symbols 0, 4, 7, and 11 in transmission using two antennas, and can be additionally transmitted in OFDM symbols 1 and 8 in transmission using four antennas. The dedicated RS can be transmitted in OFDM symbols 3, 6, 9, and 12 in a time domain (this is for exemplary purposes only, and thus the dedicated RS can also be transmitted in other OFDM symbols, and the same is true hereinafter). Therefore, the CQI RS can be deployed to any one of OFDM symbols 5, 10, and 13 other than OFDM symbols to which the common RS and the dedicated RS are deployed, and can be optionally deployed to the OFDM symbol 8.

In case of an extended CP, the common RS can be transmitted in OFDM symbols 0, 3, 6, and 9 in the time domain in transmission using two antennas, and can be additionally transmitted in OFDM symbols 1 and 7 in transmission using four antennas. The dedicated RS can be transmitted in OFDM symbols 4, 7, and 10 in the time domain. Therefore, the CQI RS can be deployed to symbols 5, 8, and 11 other than OFDM symbols to which the common RS and the dedicated RS are deployed.

Unlike the aforementioned example, the location of the dedicated RS can vary depending on a system. For example, the dedicated RS can be deployed to OFDM symbols 5, 6, 12, and 13 when using the normal CP in a system such as an LTE-A system, and can be deployed to OFDM symbols 4, 5, 10, and 11 when using the extended CP. In this case, the CQI RS can be deployed to a radio resource other than a radio resource to which the aforementioned common RS and dedicated RS (for the LTE-A) are deployed.

The CQI RS can be transmitted by being deployed to at least one OFDM symbol among OFDM symbols in a subframe. Among these OFDM symbol(s), the CQI RS can be deployed to 4, 6, 8, 12, or 16 resource elements. In case of a multi-antenna system, there is a need to identify CQI RSs per antenna. This is to avoid interference between the CQI RSs per antenna. To identify the CQI RSs per antenna, frequency division multiplexing (FDM), time division multiplexing (TDM), or code division multiplexing (CDM) can be used. In the FDM, the CQI RSs per antenna are transmitted by being divided in a frequency domain. In the TDM, the CQI RSs per antenna are transmitted by being divided in a time domain. In the CDM, the CQI RSs per antenna are transmitted by using different sequences. When transmitting RSs through multiple antennas by using the FDM and the TDM, resource elements to which the CQI RS per antenna are deployed do not overlap. When using the CDM, the resource elements to which the CQI RSs per antenna are deployed may overlap.

Now, examples of deploying a CQI RS to 4, 6, or 8 resource elements in one OFDM symbol in a subframe will be sequentially described. In case of the normal CP, any one of OFDM symbols 5, 8, 10, and 13 can be selected as the CQI RS. In case of the extended CP, any one of OFDM symbols 5, 8, and 11 can be selected. In addition, according to a location of a dedicated RS, any one of OFDM symbols 3, 5, 6, 8, 9, 10, 12, and 13 can be selected in case of the normal CP, and any one of OFDM symbols 4, 5, 7, 8, 10, and 11 can be selected in case of the extended CP.

When the dedicated RS is deployed similarly to the LTE-A, the CQI RS can be selected from any one of OFDM symbols 3, 8, 9, and 10 in case of the normal CP, and can be selected from any one of OFDM symbols 2, 7, and 8 in case of the extended CP.

Figure 12:
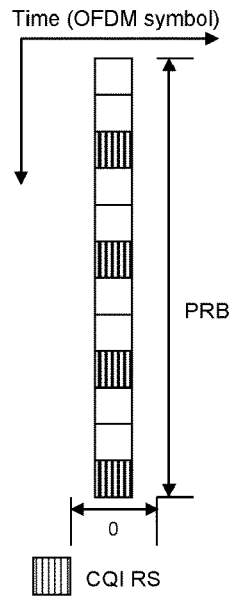
FIG. 12 shows an example of deploying a channel quality indicator (CQI) RS to four resource elements in one orthogonal frequency division multiplexing (OFDM) symbol.

FIG. 12 shows an example of deploying a CQI RS to four resource elements in one OFDM symbol.

Referring to FIG. 12, the CQI RS is deployed to four resource elements in a resource region which includes one OFDM symbol in a time domain and includes 12 subcarriers in a frequency domain. The resource elements to which the CQI RS is deployed can be deployed by being spaced apart from each other by the same distance. For example, the resource elements can be deployed by being spaced apart from each other by a distance corresponding to three resource elements. The CQI RS can be deployed by identifying 8 antennas according to CDM or {CDM, TDM}.

For example, the CQI RS deployed to four resource elements can be subjected to CDM to be able to identify 8 antennas. That is, four identical resource elements are subjected to CDM with different codes to be able to identify the 8 antennas. Then, the CQI RS for all of the 8 antennas can be transmitted in one subframe. In this case, a duty cycle may be 1.

Alternatively, the CQI RS can be subjected to CDM to be able to identify four antennas in one subframe, and can be transmitted by identifying 8 antennas by the use of two subframes configured in this manner. For example, a CQI RS for antennas 0, 1, 2, and 3 can be transmitted by performing CDM in a subframe n (where n is an integer), and a CQI RS for antennas 4, 5, 6, and 7 can be transmitted by performing CDM in a subframe n+k (where k is a natural number greater than or equal to 1). That is, the CQI RS can be transmitted by performing CDM and TDM. In this case, a duty cycle may be 2.

Alternatively, the CQI RS can be subjected to CDM to be able to identify two antennas in one subframe, and can be transmitted by identifying 8 antennas by the use of four subframes configured in this manner. For example, a CQI RS for antennas 0 and 1 can be transmitted by performing CDM in a subframe n, and likewise, a CQI RS for antennas 2 and 3, a CQI RS for antennas 4 and 5, and a CQI RS for antennas 6 and 7 can be transmitted by performing CDM respectively in subframes n+1, n+2, and n+3. In this case, a duty cycle may be 4. Although consecutive subframes are shown for example in the example above, the present invention is not limited thereto.

Alternatively, a CQI RS for one antenna can be transmitted in one subframe such that the CQI RS is transmitted by identifying 8 antennas by the use of 8 subframes. In this case, a duty cycle may be 8.

If it is assumed that OFDM symbols of the subframe are indexed from 0 to 13 (in case of a normal CP), an OFDM symbol to which the CQI RS can be deployed in the subframe may be any one of OFDM symbols 5, 8, 10, and 13 in case of the normal CP. In case of an extended CP, the OFDM symbol may be any one of OFDM symbols 5, 8, and 11. If a dedicated RS is deployed similarly to LTE-A, a CQI RS may be selected from any one of OFDM symbols 3, 8, 9, and 10 in case of the normal CP, and may be selected from any one of OFDM symbols 2, 7, and 8 in case of the extended CP. That is, the CQI RS can be deployed to an OFDM symbol other than OFDM symbols to which a common RS and a dedicated RS are deployed in the subframe. According to which OFDM symbol the dedicated RS is deployed, an OFDM symbol to which the CQI RS can be deployed can change variously.

Although a case of identifying a CQI RS with respect to 8 antennas is exemplified in the above example, the present invention is not limited thereto. The conventionally defined legacy RS can apply to at least one of a plurality of antennas, and the CQI RS according to the present invention can apply to the remaining antennas. For example, among antennas 0 to 8, the legacy RS can be used for the antenna 0, and the CQI RS according to the present invention can be used for antennas 1 to 7.

The CQI RS can be applied in such a manner that a position of a resource element in an OFDM symbol per cell is shifted. Alternatively, the location of the resource element in which the CQI RS is deployed may be fixed in all cells.

Figure 13:
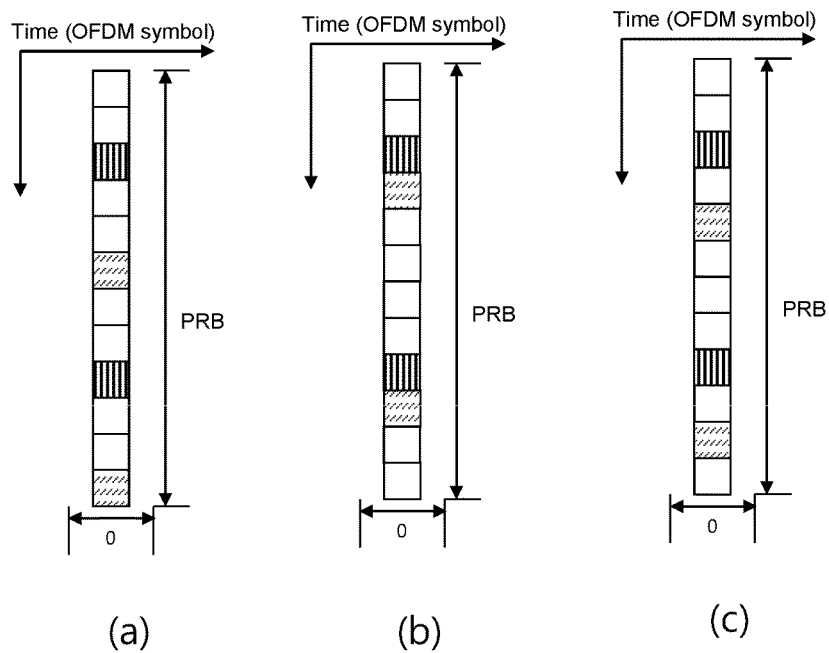
FIG. 13 shows examples of deploying two CQI RSs to four resource elements in one OFDM symbol.

FIG. 13 shows examples of deploying two CQI RSs to four resource elements in one OFDM symbol.

Unlike FIG. 12, two CQI RSs are deployed to four resource elements in FIG. 13. That is, a CQI RS 1 can be deployed to two resource elements, and a CQI RS 2 can be deployed to the remaining two resource elements. The CQI RS can be deployed to the resource elements in such a pattern that the resource elements are spaced apart from each other by the same resource element distance as shown in FIG. 13(a), and in such a pattern that the CQI RS is deployed to two consecutive resource element pairs and the resource element pairs are spaced apart from each other by a specific resource element distance as shown in FIG. 13(b). Alternatively, as shown in FIG. 13(c), a resource element to which the CQI RS 1 is deployed and a resource element to which the CQI RS 2 is deployed may have a different resource element distance. The CQI RS 1 and the CQI RS 2 can be identified by using different basic sequences.

The CQI RS 1 and the CQI RS 2 can be deployed by identifying 8 antennas by the use of {CDM, FDM} or {CDM, FDM, TDM} or {FDM, TDM}.

In case of using {CDM, FDM}, the CQI RS 1 deployed to two resource elements among four resource elements can be subjected to CDM to be able to identify four antennas (e.g., antennas 0 to 3), and the CQI RS 2 deployed to the remaining two resource elements can also be subjected to CDM to be able to identify four antennas (i.e., antennas 4 to 7). Then, the CQI RS for all of 8 antennas can be transmitted in one subframe.

In case of using {CDM, FDM, TDM}, the CQI RS can be subjected to {CDM, FDM} to be able to identify four antennas in one subframe, and can be transmitted by identifying 8 antennas by the use of two subframes configured in this manner. For example, the CQI RS 1 can be subjected to CDM to be able to identify antennas 0 and 1 in a subframe n (where n is an integer), and the CQI RS 2 can be subjected to CDM to be able to identify antennas 2 and 3. As described above, the CQI RS 1 and the CQI RS 2 are subjected to FDM since they are allocated to different resource elements. In a subframe n+k (where k is a natural number greater than or equal to 1), the CQI RS 1 is subjected to CDM to be able to identify antennas 4 and 5, and the CQI RS 2 can be subjected to CDM to be able to identify antennas 6 and 7. In this case, a duty cycle may be 2.

In case of using {FDM, TDM}, the CQI RS 1 and the CQI RS 2 can identify two antennas in one subframe, and can be transmitted by identifying 8 antennas by the use of four subframes configured in this manner. For example, the CQI RS 1 and the CQI RS 2 can be used respectively for an antenna 0 and an antenna 1 in a subframe n, for an antenna 2 and an antenna 3 in a subframe n+1, for an antenna 4 and an antenna 5 in a subframe n+2, and for an antenna 6 and an antenna 7 in a subframe n+3. In this case, a duty cycle may be 4. Although consecutive subframes are exampled in the above example, the present invention is not limited thereto.

Figure 14:
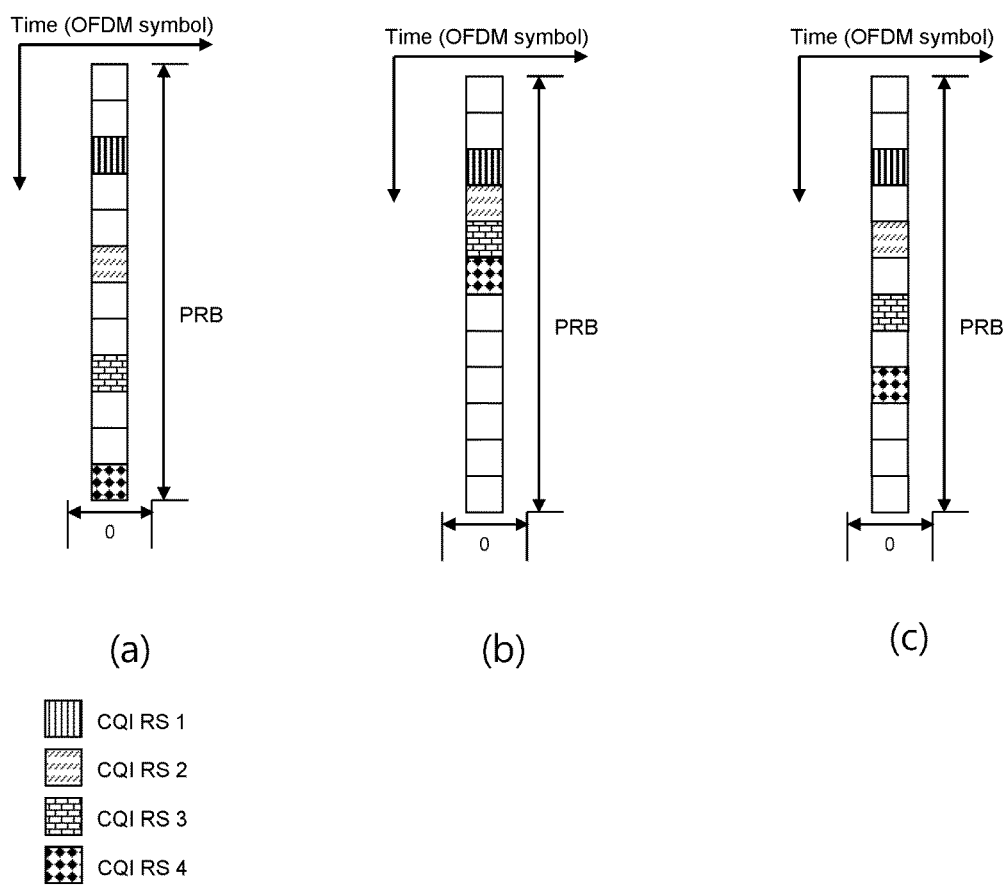
FIG. 14 shows examples of deploying four CQI RSs to four resource elements in one OFDM symbol.

FIG. 14 shows examples of deploying four CQI RSs to four resource elements in one OFDM symbol.

Unlike FIG. 13, four CQI RSs are deployed to four resource elements in FIG. 14. That is, a CQI RS 1 to a CQI RS 4 are deployed one by one to every one resource element among the four resource elements. The CQI RS can be deployed to the resource elements in such a pattern that the resource elements are spaced apart from each other by the same resource element distance as shown in FIG. 14(*a*) and FIG. 14(*c*) (i.e., a distance of 3 resource elements in FIG. 14(*a*) and a distance of 2 resource elements in FIG. 14(*c*)), and the CQI RS 1 to the CQI RS 4 can be deployed to four consecutive resource elements as shown in FIG. 14(*b*). The CQI RS 1 to the CQI RS 4 can be identified by using different basic sequences.

The CQI RS 1 to the CQI RS 4 can be deployed by identifying 8 antennas by the use of {CDM, FDM} or {FDM, TDM}.

In case of using {CDM, FDM}, each of the CQI RS 1 to the CQI RS 4 can be subjected to CDM to be able to identify 8 antennas by identifying two antennas in one subframe.

In case of using {FDM, TDM}, 8 antennas can be identified in such a manner that the CQI RS 1 to the CQI RS 4, which are identified by FDM, identify four antennas (e.g., antennas 0 to 3) in one subframe and the CQI RS 1 to the CQI RS 4, which are identified by FDM, identify four antennas (i.e., antennas 4 to 7) in another subframe.

Figure 15:
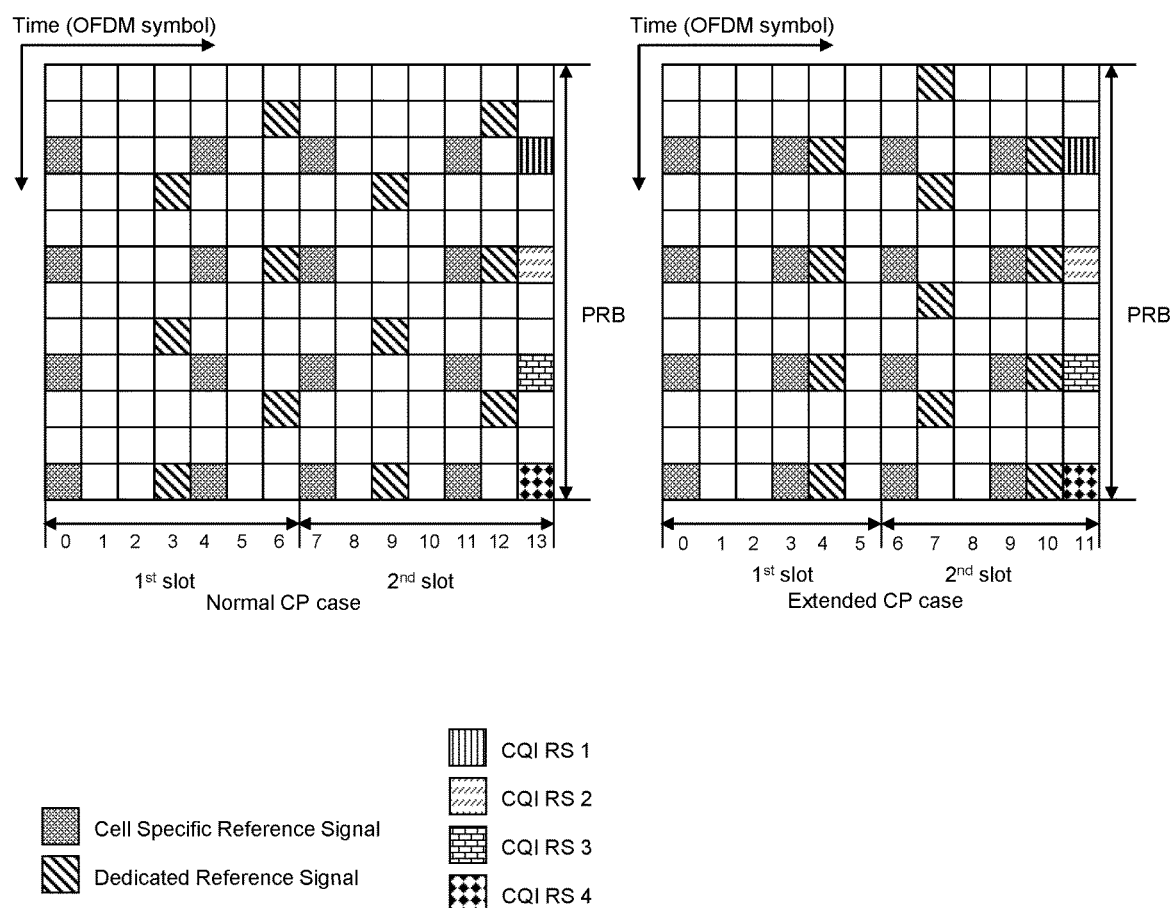
FIG. 15 shows an example of applying a CQI RS deployment method described in FIG. 14 to a subframe.

FIG. 15 shows an example of applying a CQI RS deployment method described in FIG. 14 to a subframe.

Referring to FIG. 15, in case of a normal CP, CQI RSs 1 to 4 are deployed to an OFDM symbol 13 of a second slot. In case of an extended CP, the CQI RS 1 to the CQI RS 4 are deployed to an OFDM symbol 11 of the second slot. That is, this is an example of applying a resource element pattern in which the CQI RS is deployed as described in FIG. 14(*a*). Although not shown in FIG. 15, the same can also apply to the resource element pattern of FIG. 14(*b*) and FIG. 14(*c*). In addition, although an example of applying the CQI RS 1 to the CQI RS 4 to a last OFDM symbol of a subframe is described in FIG. 15, it is apparent that the present invention is also applicable to any one of OFDM symbols except for an OFDM symbol to which a common RS (or cell specific RS) or a dedicated RS are deployed.

Figure 16:
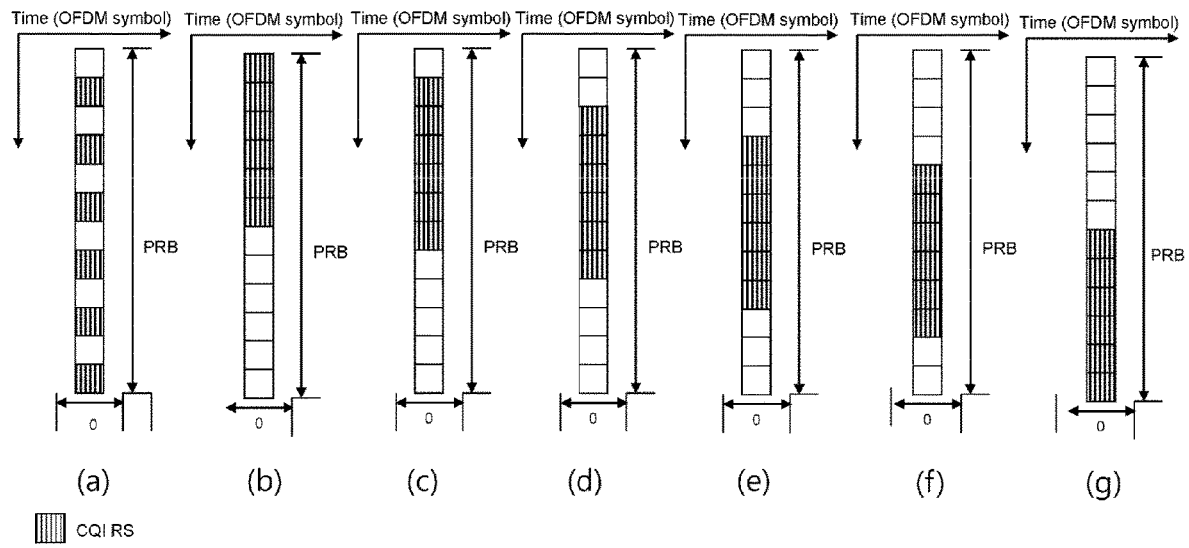
FIG. 16 shows examples of deploying a CQI RS to 6 resource elements in one OFDM symbol.

FIG. 16 shows examples of deploying a CQI RS to 6 resource elements in one OFDM symbol.

Referring to FIG. 16(*a*), the CQI RS is deployed to the 6 resource elements in a resource region including one OFDM symbol in a time domain and 12 subcarriers in a frequency domain. The resource element to which the CQI RS is deployed can be deployed by being spaced apart from each other by the same resource element distance (i.e., a distance of two resource elements). The CQI RS can be deployed by identifying 8 antennas by the use of CDM or {CDM, TDM} or {FDM, TDM}.

For example, the CQI RS deployed to the 6 resource elements in one subframe can be subjected to CDM to be able to identify 8 antennas. Alternatively, the CQI RS can be subjected to CDM to be able to identify 4 antennas in one subframe, and can be transmitted by identifying 8 antennas by the use of 2 subframes configured in this manner. For example, a CQI RS for antennas 0, 1, 2, and 3 can be transmitted by performing CDM in a subframe n (where n is an integer), and a CQI RS for antennas 4, 5, 6, and 7 can be transmitted by performing CDM in a subframe n+k (where k is a natural number greater than or equal to 1). That is, the CQI RS can be transmitted by performing CDM and TDM.

In case of FIG. 16(*a*), a position at which the CQI RS can be deployed can be shifted for each cell. For example, a position of a resource element to which a CQI RS is deployed can be determined by a modular-2 operation. In case of FIG. 16(*b*) to FIG. 16(*g*), a position of a resource element to which a CQI RS is deployed for each cell can be fixed to the same position, and can change depending on offset information. The offset information may provide a offset value in a unit of resource elements with respect to a start position which is used as a reference point, and may indicate the start position by using an index. For example, if FIG. 16(*b*) shows the start position used as the reference position, the offset value may be set to 1 in FIG. 16(*c*), 2 in FIG. 16(*d*), and 3 in FIG. 16(*e*). The offset value can be set to a different value in a unit of cell or cell group to the offset value. Alternatively, a position of a resource element to which a CQI RS is deployed can be determined by a modular-6 operation.

Figure 17:
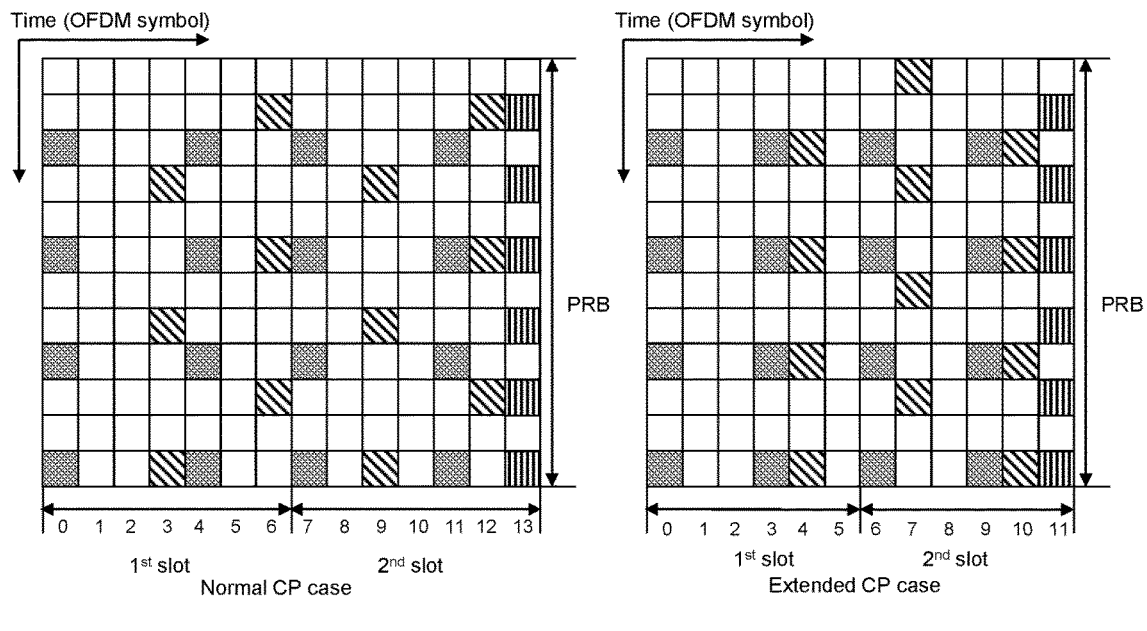
FIG. 17 shows an example of applying a CQI RS deployment method described in FIG. 16.

FIG. 17 shows an example of applying a CQI RS deployment method described in FIG. 16. In this example, the CQI RS deployment method described in FIG. 16(*a*) is applied to a last OFDM symbol. Unlike FIG. 17, if a dedicated RS is deployed similarly to LTE-A, any one of OFDM symbols 3, 8, 9, and 10 can be selected as the CQI RS in case of a normal CP, and any one of OFDM symbols 2, 7, and 8 can be selected as the CQI RS in case of an extended CP.

Now, examples in which a CQI RS is transmitted in one OFDM symbol in a subframe and in which a CQI RS is deployed to 8 resource elements in a frequency band corresponding to one resource block will be described.

Figure 18:
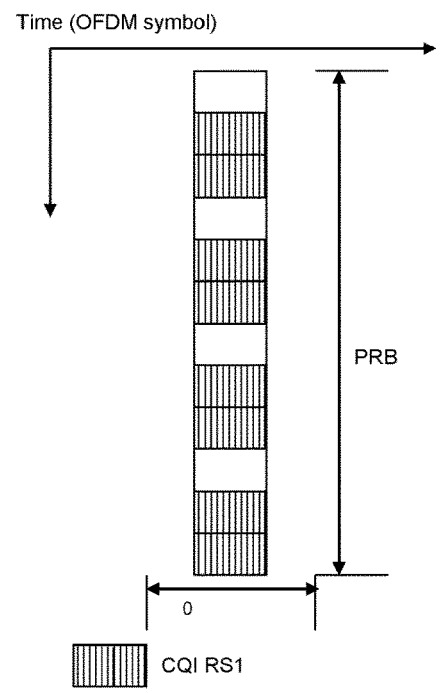
FIG. 18 shows an example in which a CQI RS is transmitted in one OFDM symbol in a subframe and in which a CQI RS is deployed to 8 resource element in a frequency band corresponding to one resource block.

FIG. 18 shows an example in which a CQI RS is transmitted in one OFDM symbol in a subframe and in which a CQI RS is deployed to 8 resource element in a frequency band corresponding to one resource block.

Referring to FIG. 18, a CQI RS 1 is deployed to 8 resource elements in a resource region including one OFDM symbol in a time domain and 12 subcarriers in a frequency domain. Each of resource elements to which the CQI RS 1 is deployed can be deployed in pair, and can be deployed by being spaced apart by the same distance. Herein, the CQI RS 1 may be a CQI RS that uses one basic sequence. The CQI RS 1 can be deployed by identifying 8 antennas by the use of CDM or {CDM,TDM}.

For example, 8 resource elements to which the CQI RS 1 is deployed can be subjected to CDM to be able to identify 8 antennas. That is, 8 identical resource elements are subjected to CDM with different codes to be able to identify the 8 antennas. In this case, the CQI RS for all of the 8 antennas can be transmitted in one subframe. A duty cycle may be one subframe.

Alternatively, the CQI RS 1 can be subjected to CDM to be able to identify 4 antennas in 8 resource elements in one subframe, and can be transmitted by identifying 8 antennas by the use of 2 subframes configured in this manner. For example, a CQI RS for antennas 0, 1, 2, and 3 can be transmitted by performing CDM in a subframe n, and a CQI RS for antennas 4, 5, 6, and 7 can be transmitted by performing CDM in a subframe n+1. That is, the CQI RS can be transmitted by performing CDM and TDM. In this case, a duty cycle may be two subframes.

Alternatively, the CQI RS 1 can be subjected to CDM to be able to identify two antennas in 8 resource elements in one subframe, and can be transmitted by identifying 8 antennas by the use of two subframes configured in this manner. For example, a CQI RS for antennas 0 and 1 can be transmitted by performing CDM in a subframe n, and likewise, a CQI RS for antennas 2 and 3, a CQI RS for antennas 4 and 5, and a CQI RS for antennas 6 and 7 can be transmitted by performing CDM respectively in subframes n+1, n+2, and n+3. In this case, a duty cycle may be 4 subframes.

Alternatively, the CQI RS 1 for one antenna can be transmitted in 8 resource elements in one subframe such that it is transmitted by identifying 8 antennas by the use of the 8 subframes. In this case, a duty cycle may be 8 subframes.

If it is assumed that OFDM symbols of the subframe are indexed from 0 to 13 (in case of a normal CP), an OFDM symbol to which the CQI RS 1 can be deployed in the subframe may be any one of OFDM symbols 5, 8, 10, and 13 in case of the normal CP. In case of an extended CP, the OFDM symbol may be any one of OFDM symbols 5, 8, and 11. If a dedicated RS is deployed similarly to LTE-A, a CQI RS may be selected from any one of OFDM symbols 3, 8, 9, and 10 in case of the normal CP, and may be selected from any one of OFDM symbols 2, 7, and 8 in case of the extended CP. That is, the CQI RS can be deployed to an OFDM symbol to which a common RS and a dedicated RS are not deployed in the subframe. In addition, according to a position at which the dedicated RS is deployed, an OFDM symbol to which the CQI RS 1 can be deployed can change variously.

Figure 19:
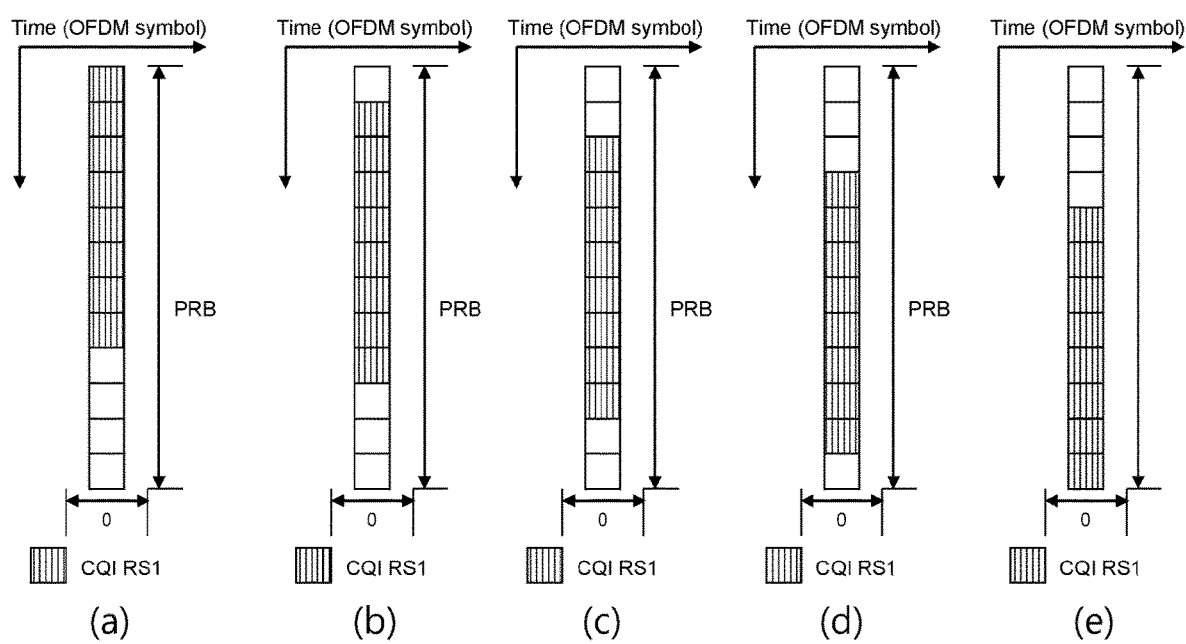
FIG. 19 shows another example in which a CQI RS is transmitted in one OFDM symbol in a subframe and in which a CQI RS is deployed to 8 resource element in a frequency band corresponding to one resource block.

FIG. 19 shows another example in which a CQI RS is transmitted in one OFDM symbol in a subframe and in which a CQI RS is deployed to 8 resource element in a frequency band corresponding to one resource block.

Referring to FIGS. 19(a) to 19(e), the CQI RS can be deployed to 8 consecutive resource elements in a frequency domain. A start position of resource elements to which the CQI RS is deployed can be fixed, and can change depending on offset information. The offset information may provide a offset value in a unit of resource elements with respect to a start position which is used as a reference point, and may indicate the start position by using an index. For example, if FIG. 19(a) shows the start position used as the reference position, the offset value may be set to 1 in FIG. 19(b), 2 in FIG. 19(c), 3 in FIG. 19(d), and 4 in FIG. 19(e). The offset value may be set to a different value in a unit of cell or cell group to the offset value.

Figure 20:
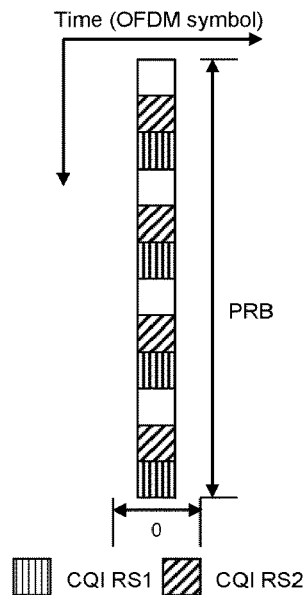
FIG. 20 shows an example in which a CQI RS is transmitted in one OFDM symbol in a subframe and in which two CQI RSs are deployed to 8 resource elements in a frequency band corresponding to one resource block.

FIG. 20 shows an example in which a CQI RS is transmitted in one OFDM symbol in a subframe and in which two CQI RSs are deployed to 8 resource elements in a frequency band corresponding to one resource block.

Referring to FIG. 20, a CQI RS 1 is deployed to four resource elements, and a CQI RS 2 is deployed to another four resource elements. The CQI RS 1 and the CQI RS 2 can use different basic sequences. The CQI RS 1 and the CQI RS 2 can be deployed by identifying 8 antennas by the use of {CDM and FDM} or {CDM, FDM, and TDM}.

For example, four resource elements to which the CQI RS 1 is deployed can be subjected to CDM to be able to identify four antennas (e.g., antennas 0, 1, 2, and 3), and four resource elements to which the CQI RS 2 is deployed can be subjected to CDM to be able to identify four antennas (e.g., antennas 4, 5, 6, and 7). That is, the CQI RS 1 and the CQI RS 2 can be subjected to FDM, and the CQI RS 1 and the CQI RS 2 can be subjected to CDM. In this case, a CQI RS for all 8 antennas can be transmitted in one subframe. A duty cycle may be one subframe.

Alternatively, the CQI RS 1 can be subjected to CDM to be able to identify two antennas (e.g., antennas 0 and 1) in four resource elements in one subframe, and the CQI RS 2 can be subjected to CDM to be able to identify two antennas (e.g., antennas 2 and 3) in another four resource elements in the same subframe. The CQI RS can be transmitted by identifying 8 antennas by the use of two subframes configured in this manner. For example, in a subframe n, the CQI RS 1 is transmitted by performing CDM for antennas 0 and 1 and the CQI RS 2 is transmitted by performing CDM for antennas 2 and 3. In addition, in a subframe n+1, the CQI RS 1 can be transmitted by performing CDM for antennas 4 and 5, and can be transmitted by performing CDM for antennas 6 and 7. That is, the CQI RS can be transmitted by performing CDM, TDM, and FDM. In this case, a duty cycle may be two subframes.

Alternatively, the CQI RS 1 can be deployed to be able to identify one antenna in four resource elements in one subframe, and the CQI RS 2 can be deployed to identify another antenna in another four resource elements in the same subframe. The CQI RS can be transmitted by identifying 8 antennas by the use of four subframes configured in this manner. For example, in a subframe n, the CQI RS 1 and the CRI RS 2 can be transmitted by performing FDM for an antenna 0 and an antenna 1, respectively. In a subframe n+1, the CQI RS 1 and the CQI RS 2 can be transmitted by performing FDM for an antenna 2 and an antenna 3, respectively. In a subframe n+2, the CQI RS 1 and the CQI RS 2 can be transmitted by performing FDM for an antenna 4 and an antenna 5, respectively. In a subframe n+3, the CQI RS 1 and the CQI RS 2 can be transmitted by performing FDM for an antenna 6 and an antenna 7, respectively. In this case, a duty cycle may be 4 subframes.

Figure 21:
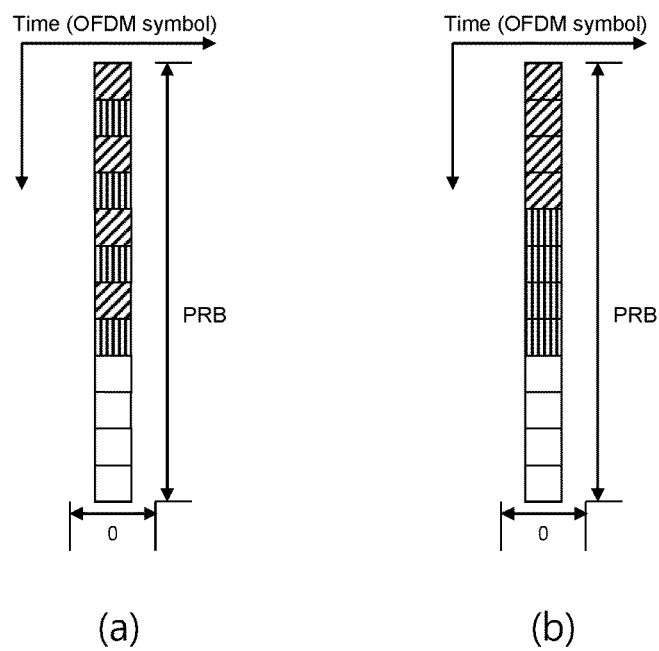
FIG. 21 shows other examples in which a CQI RS is transmitted in one OFDM symbol in a subframe and in which two CQI RSs are deployed to 8 resource elements in a frequency band corresponding to one resource block.

FIG. 21 shows other examples in which a CQI RS is transmitted in one OFDM symbol in a subframe and in which two CQI RSs are deployed to 8 resource elements in a frequency band corresponding to one resource block.

Referring to FIG. 21(a), the 8 resource elements are consecutive repetitively in the order of a resource element to which a CQI RS 2 is deployed and a resource element to which a CQI RS 1 is deployed. Referring to FIG. 21(b), there are four consecutive resource elements to which a CQI RS 2 is deployed, and subsequently, there are four consecutive resource elements to which a CQI RS 1 is deployed. A start position of resource elements to which the CQI RS is deployed can be fixed, and can change depending on offset information. The offset information may provide a offset value in a unit of resource elements with respect to a start position which is used as a reference point, and may indicate the start position by using an index. Although not shown, the offset value may be set to any one of values 1 to 4. The offset value may be determined in a unit of cell or cell group.

Figure 22:
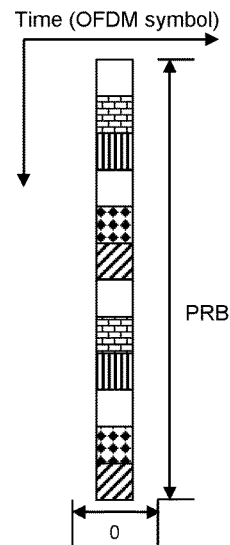
FIG. 22 shows another example in which a CQI RS is transmitted in one OFDM symbol in a subframe and in which four CQI RSs are deployed to 8 resource elements in a frequency band corresponding to one resource block.

FIG. 22 shows another example in which a CQI RS is transmitted in one OFDM symbol in a subframe and in which four CQI RSs are deployed to 8 resource elements in a frequency band corresponding to one resource block.

Referring to FIG. 22, each of a CQI RS 1 to a CQI RS 4 is deployed to two resource elements in a resource region including one OFDM symbol in a time domain and 12 subcarriers in a frequency domain. The CQI RS 1 to the CQI RS 4 can use different basic sequences. The CQI RS 1 to the CQI RS 4 can be deployed by identifying 8 antennas by the use of {CDM and FDM} or {FDM and TDM}.

For example, two resource elements to which the CQI RS 1 is deployed can be subjected to CDM to be able to identify two antennas (e.g., antennas 0 and 1), and two resource elements to which the CQI RS 2 is deployed can be subjected to CDM to be able to identify two antennas (e.g., antennas 3 and 4). Likewise, each of the CQI RS 3 and the CQI RS 4 can also be subjected to CDM to be able to identify two antennas. That is, the CQI RS 1 to the CQI RS 4 can be subjected to FDM, and each of the CQI RS 1 to the CQI RS 4 can be subjected to CDM. In this case, the CQI RS for all of the 8 antennas can be transmitted in one subframe. A duty cycle may be one subframe.

Alternatively, each of the CQI RS 1 to the CQI RS 4 is subjected to FDM so that the CQI RSs can be transmitted for one antenna in two resources in one subframe, and can be transmitted by identifying the 8 antennas by the use of two subframes configured in this manner. For example, in a subframe n, the CQI RS 1 to the CQI RS 4 can be subjected to FDM so that the CQI RSs are identified for antennas 0 to 3, respectively. In a subframe n+1, the CQI RS 1 to the CQI RS 4 can be subjected to FDM so that the CQI RSs can be identified for antennas 4 to 7, respectively. That is, the CQI RSs can be transmitted by performing FDM and TDM. In this case, a duty cycle may be two subframes.

Figure 23:
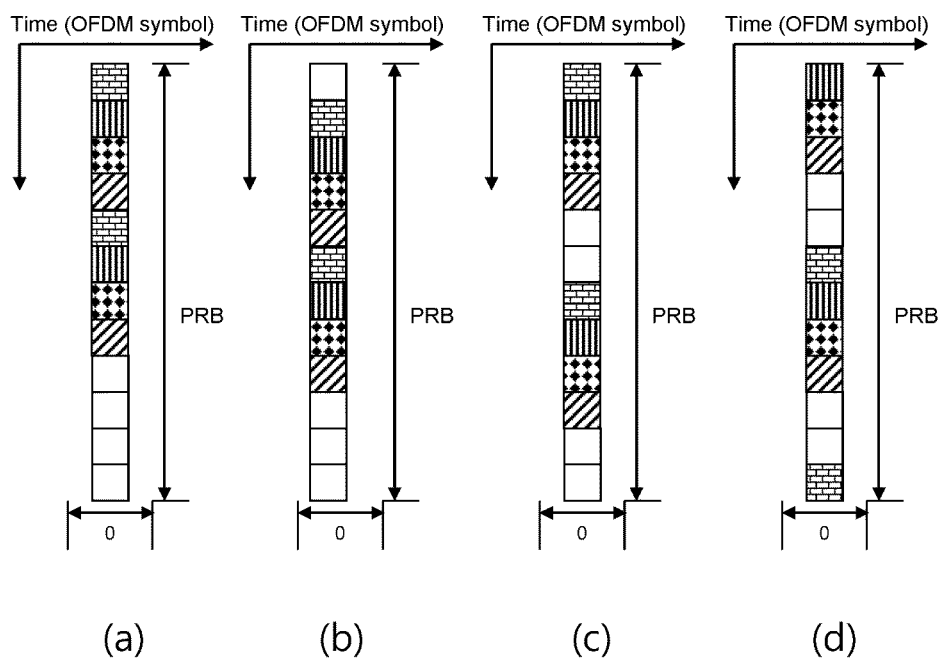
FIG. 23 shows other examples in which a CQI RS is transmitted in one OFDM symbol in a subframe and in which four CQI RSs are deployed to 8 resource elements in a frequency band corresponding to one resource block.

FIG. 23 shows other examples in which a CQI RS is transmitted in one OFDM symbol in a subframe and in which four CQI RSs are deployed to 8 resource elements in a frequency band corresponding to one resource block.

Referring to FIG. 23(*a*), four resource elements to which any one of a CQI RS 1 to a CQI RS 4 is deployed are deployed twice consecutively. Referring to FIG. 23(*b*), a start position at which the CQI RS is deployed is different from FIG. 23(*a*). A start position of resource elements to which the CQI RS is deployed can be fixed, and can change depending on offset information. The offset information may provide a offset value in a unit of resource elements with respect to a start position which is used as a reference point, and may indicate the start position by using an index. Although it is shown herein that the offset value is 1 as illustrated in FIG. 23(*b*), the offset value may be set to any one of values 1 to 4. The offset value may be determined in a unit of cell or cell group. Referring to FIG. 23(*c*), four resource elements to which any one of a CQI RS 1 to a CQI RS 4 is deployed are consecutively deployed, whereas four resource elements to which the CQI RS is deployed are deployed by being spaced apart from each other. FIG. 23(*c*) shows an example in which four resource elements to which a CQI RS is deployed are deployed by being spaced apart from each other by a distance of two resource elements. Alternatively, it can also be expressed that resource elements to which each CQI RS is deployed are deployed by being spaced apart from each other by a distance of 6 resource elements. FIG. 23(*d*) shows a different start position of a resource element to which a CQI RS is deployed in comparison with FIG. 23(*c*).

Figure 24:
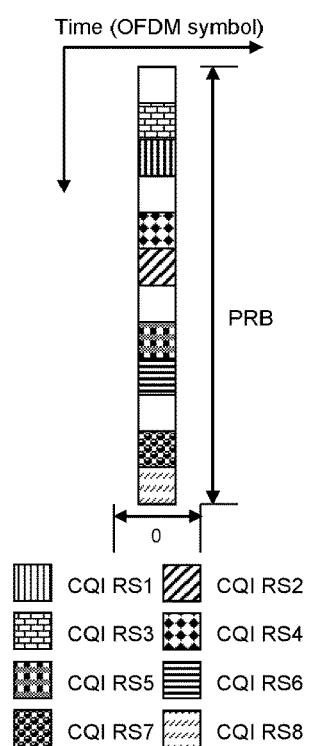
FIG. 24 shows another example in which a CQI RS is transmitted in one OFDM symbol in a subframe and in which 8 CQI RSs are deployed to 8 resource elements in a frequency band corresponding to one resource block.

FIG. 24 shows another example in which a CQI RS is transmitted in one OFDM symbol in a subframe and in which 8 CQI RSs are deployed to 8 resource elements in a frequency band corresponding to one resource block.

Referring to FIG. 24, each of a CQI RS 1 to a CQI RS 7 is deployed to one resource element in a resource region including one OFDM symbol in a time domain and 12 subcarriers in a frequency domain. The CQI RS 1 to the CQI RS 7 can use different basic sequences. The CQI RS 1 to the CQI RS 7 can be deployed by identifying 8 antennas by the use of FDM. CQI RSs for two antennas are deployed to consecutive resource elements. Consecutive two resource elements are deployed by being spaced apart from each other by a distance of one resource element.

FIG. 25 shows other examples in which a CQI RS is transmitted in one OFDM symbol in a subframe and in which 8 CQI RSs are deployed to 8 resource elements in a frequency band corresponding to one resource block.

FIG. 25(*a*) and FIG. 25(*b*) show a case in which there are consecutive resource elements to which any one of a CQI RS 1 to a CQI RS 7 is deployed for example. FIG. 25(*b*) shows an example in which a start position of a resource element to which a CQI RS is shifted by an offset value 1 in comparison with FIG. 25(*a*). Although it is shown herein that the offset value is 1 as illustrated in FIG. 25(*b*), the offset value may be set to any one of values 1 to 4. Alternatively, as shown in FIG. 25(*c*) and FIG. 25(*d*), four resource elements allocated for four CQI RSs are consecutive, and the two resource elements can be deployed by being spaced apart from each other.

Figure 26:
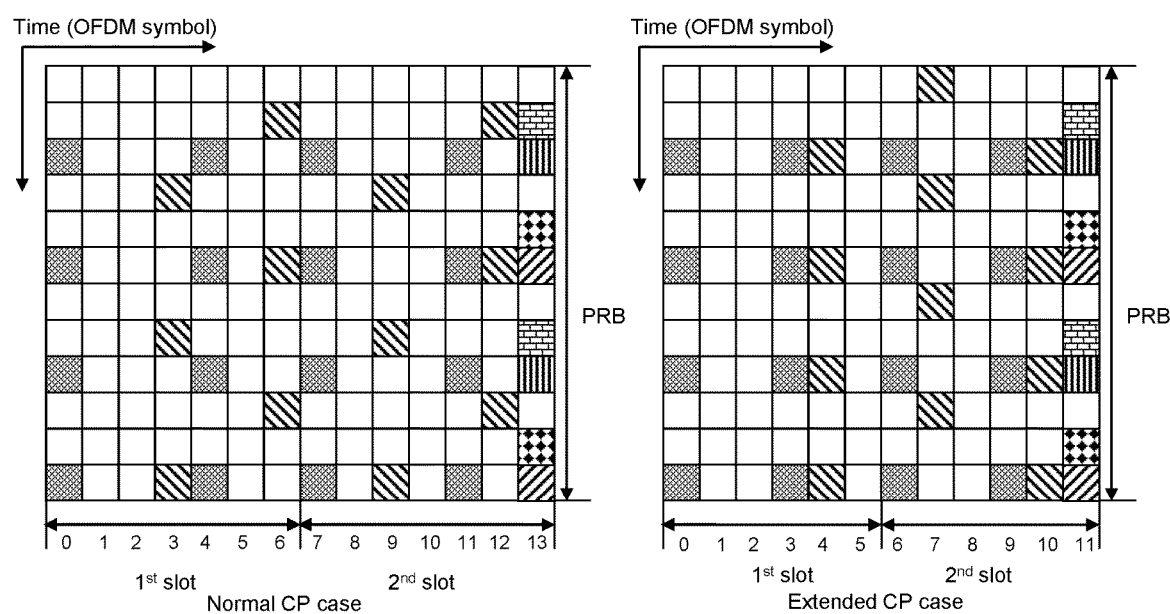
FIG. 26 shows an example of applying a CQI RS deployment method described in FIG. 22 to a subframe.

FIG. 26 shows an example of applying a CQI RS deployment method described in FIG. 22 to a subframe.

Referring to FIG. 26, a CQI RS can be transmitted in a last OFDM symbol of the subframe, that is, in an OFDM symbol 13 in case of a normal CP and in an OFDM symbol 11 in case of an extended CP. Four CQI RSs (i.e., a CQI RS 1 to a CQI RS 4) can be transmitted by performing FDM in the last OFDM symbol of the subframe.

Figure 27:
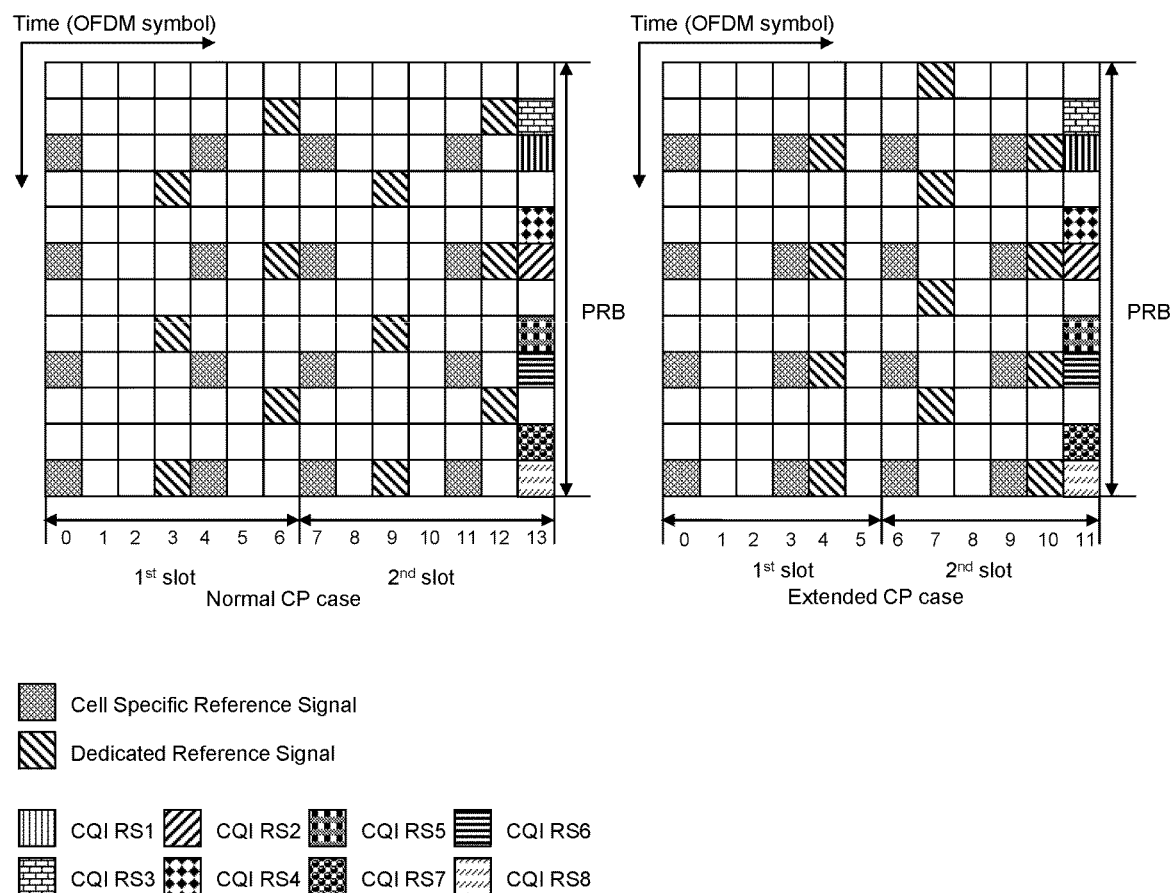
FIG. 27 shows an example of applying a CQI RS deployment method described in FIG. 24 to a subframe.

FIG. 27 shows an example of applying a CQI RS deployment method described in FIG. 24 to a subframe.

Referring to FIG. 27, a CQI RS can be transmitted in a last OFDM symbol of the subframe, that is, in an OFDM symbol 13 in case of a normal CP and in an OFDM symbol 11 in case of an extended CP. 8 CQI RSs (i.e., a CQI RS 1 to a CQI RS 8) can be transmitted by performing FDM in the last OFDM symbol of the subframe.

FIG. 28 to FIG. 33 show examples of deploying 8 CQI RSs to 8 resource elements in a subframe.

Referring to FIG. 28 to FIG. 33, a dedicated RS can be transmitted in OFDM symbols 5, 6, 12, and 13 in case of a normal CP, and can be transmitted in OFDM symbols 4, 5, 10, and 11 in case of an extended CP. In addition, a common RS can be transmitted in OFDM symbols 0, 4, 7, and 11 in case of the normal CP, and can be transmitted in OFDM symbols 0, 3, 6, and 9 in case of the extended CP. In this case, a CQI RS can be transmitted in any one of OFDM symbols 3, 8, 9, and 10 in case of the normal CP, and can be transmitted in any one of OFDM symbols 7 and 8 in case of the extended CP.

Figure 28:
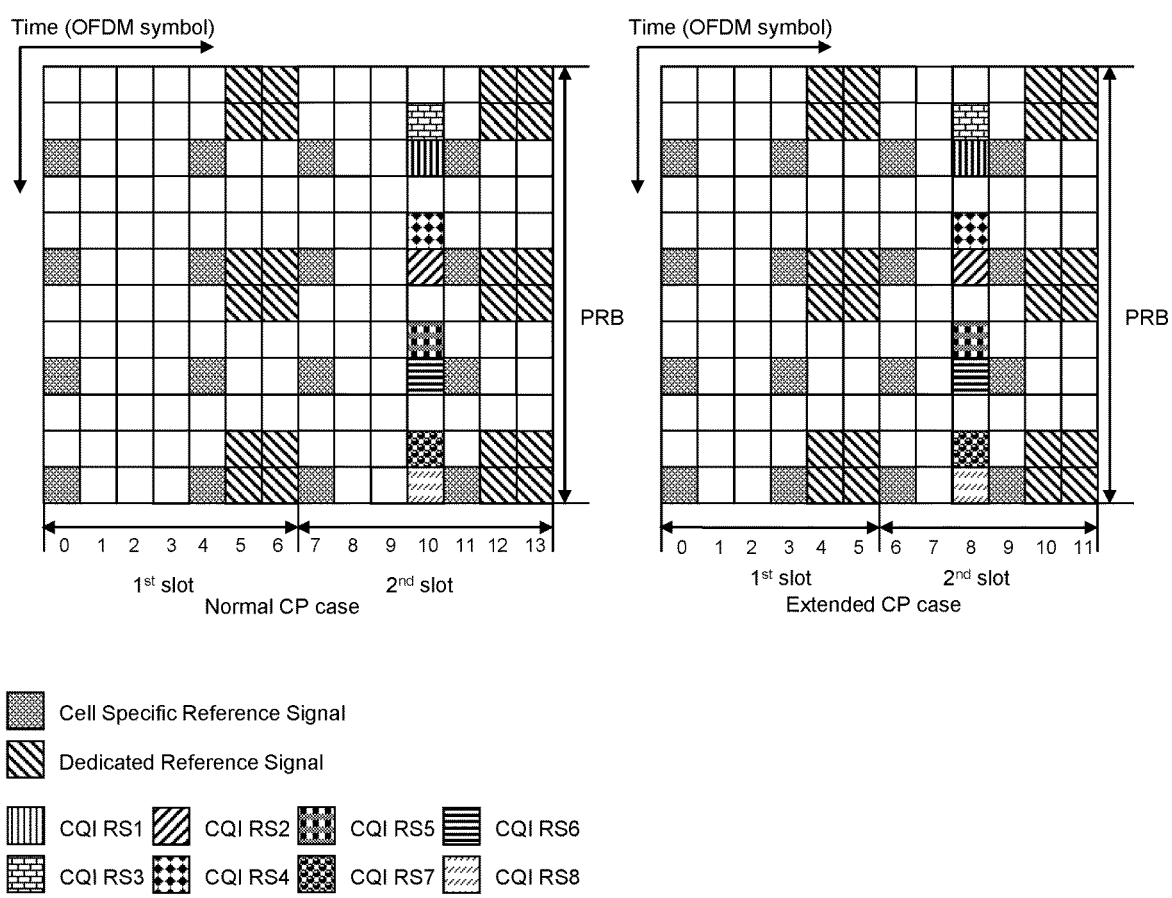
FIG. 28 to FIG. 33 show examples of deploying 8 CQI RSs to 8 resource elements in a subframe.
Figure 29:
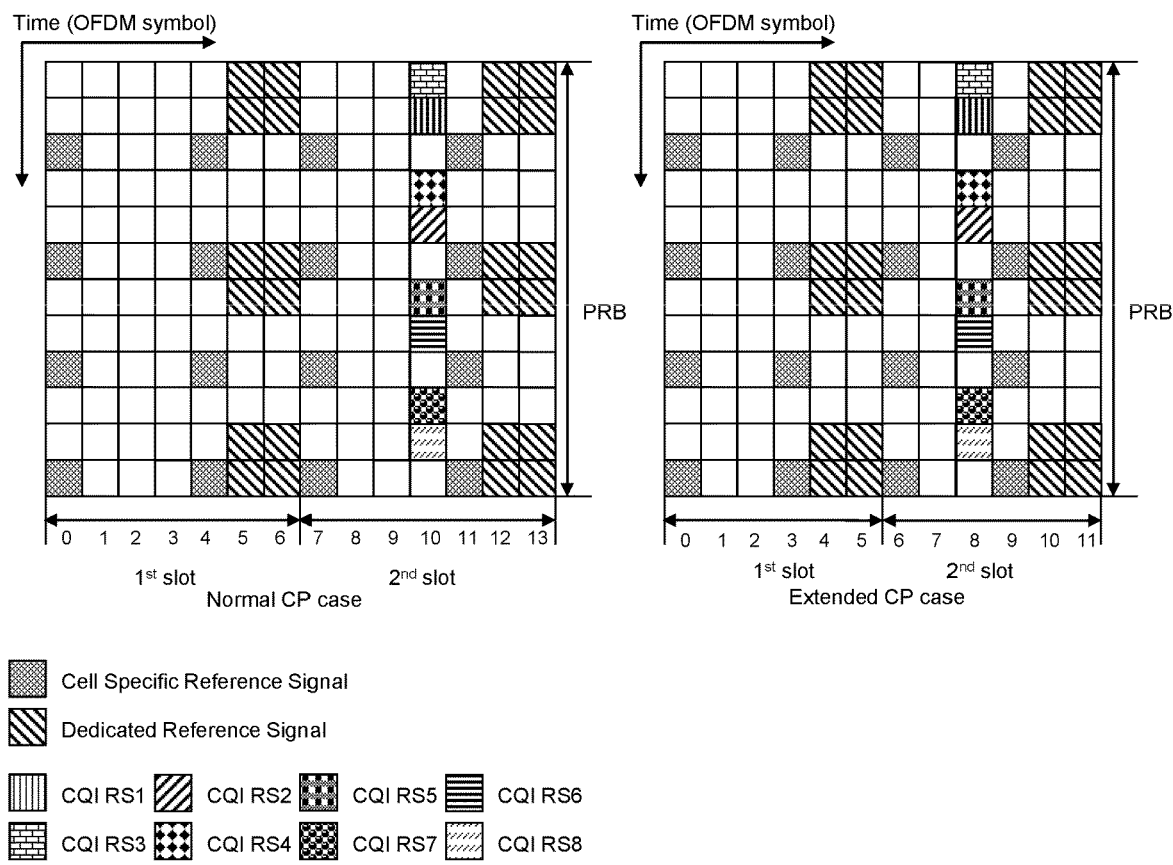
Figure 30:
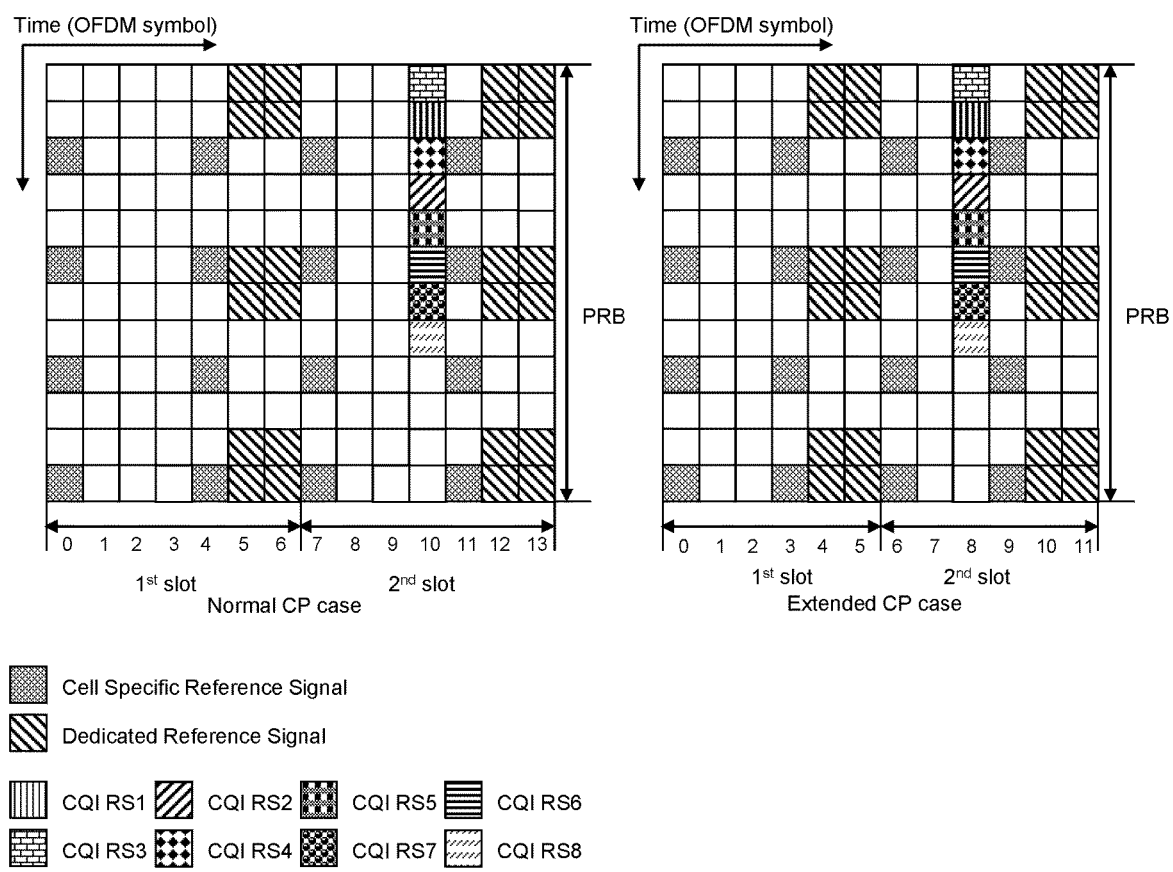

FIG. 28 and FIG. 30 show a case where a CQI RS is transmitted in an OFDM symbol 10 in case of a normal CP and in an OFDM symbol 8 in case of an extended CP for example. FIG. 28 and FIG. 29 are common in a sense that a CQI RS 1 to a CQI RS 8 have the same pattern in an OFDM symbol to which the CQI RS is transmitted (i.e., a pattern in which there are two consecutive resource elements to which the CQI RS is deployed, and the two resource elements are spaced apart from each other by a distance of one resource element), but are different from each other in a sense that a start position of a resource element to which the CQI RS is deployed is different.

Figure 31:
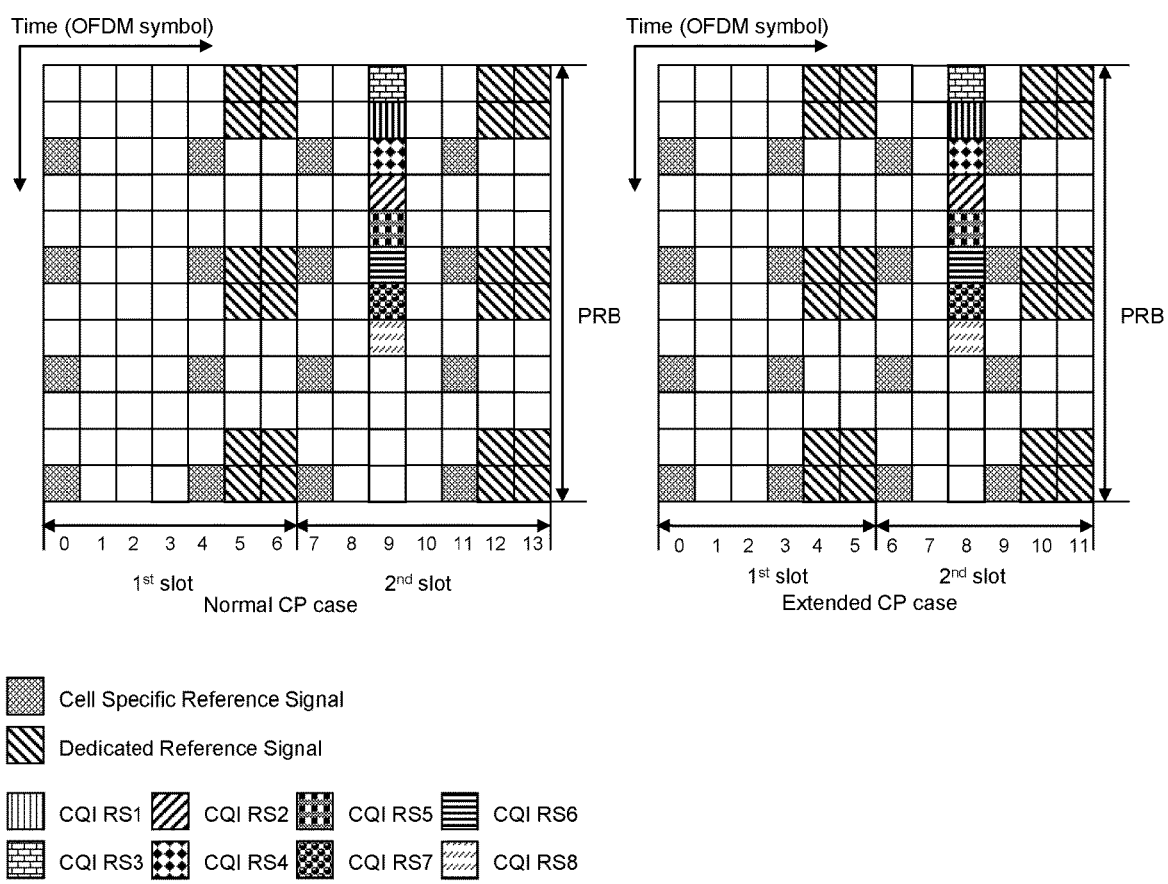
Figure 32:
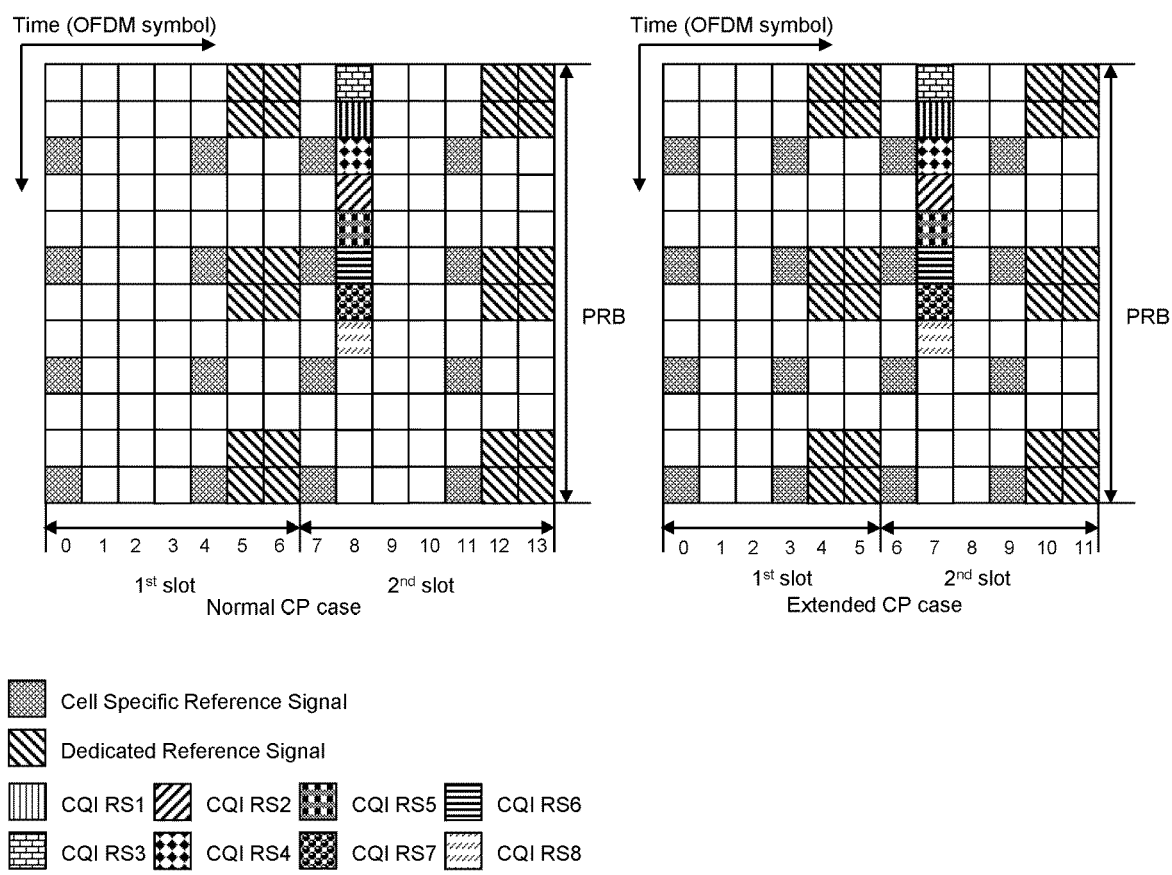
Figure 33:
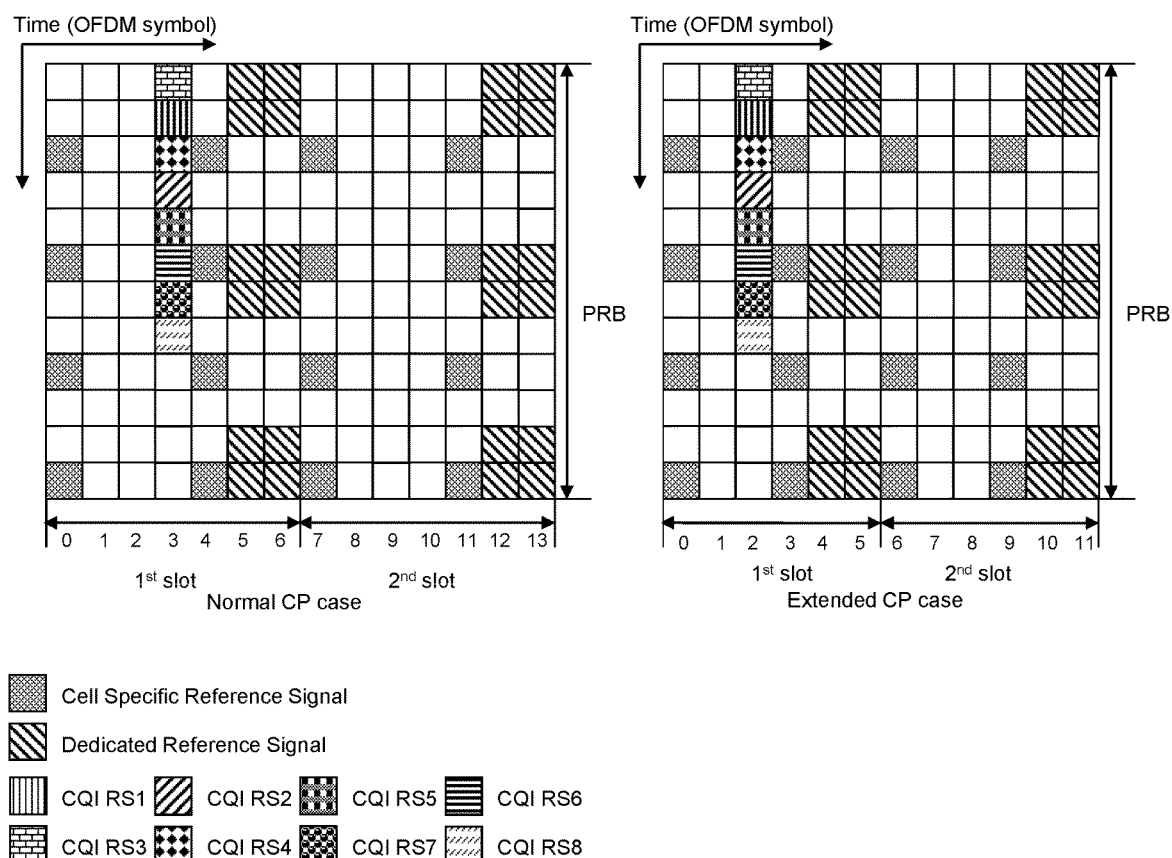

FIG. 30 to FIG. 33 are common in a sense that a CQI RS 1 to a CQI RS 8 have the same pattern in an OFDM symbol to which the CQI RS is transmitted (i.e., a pattern in which there are eight consecutive resource elements to which the CQI RS is deployed), but are different from each other in a sense that an OFDM symbol to which the CQI RS is transmitted is different. That is, FIG. 30 shows a case where a CQI RS is transmitted in an OFDM symbol 10 in case of a normal CP, and is transmitted in an OFDM symbol 8 in case of an extended CP for example. FIG. 31 shows a case where a CQI RS is transmitted in an OFDM symbol 9 in case of the normal CP, and is transmitted in an OFDM symbol 8 in case of the extended CP for example. FIG. 32 shows a case where a CQI is transmitted in an OFDM symbol 8 in case of the normal CP, and is transmitted in an OFDM symbol 7 in case of the extended CP for example. FIG. 33 shows a case where a CQI is transmitted in an OFDM symbol 3 in case of the normal CP, and is transmitted in an OFDM symbol 2 in case of the extended CP for example. In FIG. 28 to FIG. 33, a CQI RS 1 to a CQI RS 8 can be transmitted by performing FDM in an OFDM symbol to which the CQI RS is transmitted.

An example of deploying a CQI RS to 4, 6, or 8 resource elements in one OFDM symbol in a subframe is described above. Now, an example of deploying a CQI RS to 4, 8, 12, or 16 resource elements in two OFDM symbols in a subframe will be described.

For the CQI RS, two OFDM symbols can be selected from OFDM symbols 5, 8, 10, and 13 in case of the normal CP. If the selected two OFDM symbols are expressed such as an OFDM symbol index pair (x,y), then it can be any one of (5, 8), (5, 10), (5, 13), (8, 10), (8,13), and (10, 13). In case of the extended CP, two OFDM symbols can be selected from OFDM symbols 5, 8, and 11, and it can be any one of (5, 8), (5, 11), and (8, 11). In addition, according to a position of a dedicated RS, any two OFDM symbols can be selected from OFDM symbols 3, 5, 6, 8, 9, 10, 12, and 13 in case of the normal CP, and any two OFDM symbols can be selected from OFDM symbols 4, 5, 7, 8, 10, and 11 in case of the extended CP. If the dedicated RS is deployed similarly to LTE-A, for a CQI RS, any two OFDM symbols can be selected from OFDM symbols 3, 8, 9, and 10 in case of the normal CP, and any two OFDM symbols can be selected from OFDM symbols 2, 7, and 8 in case of the extended CP.

Figure 34:
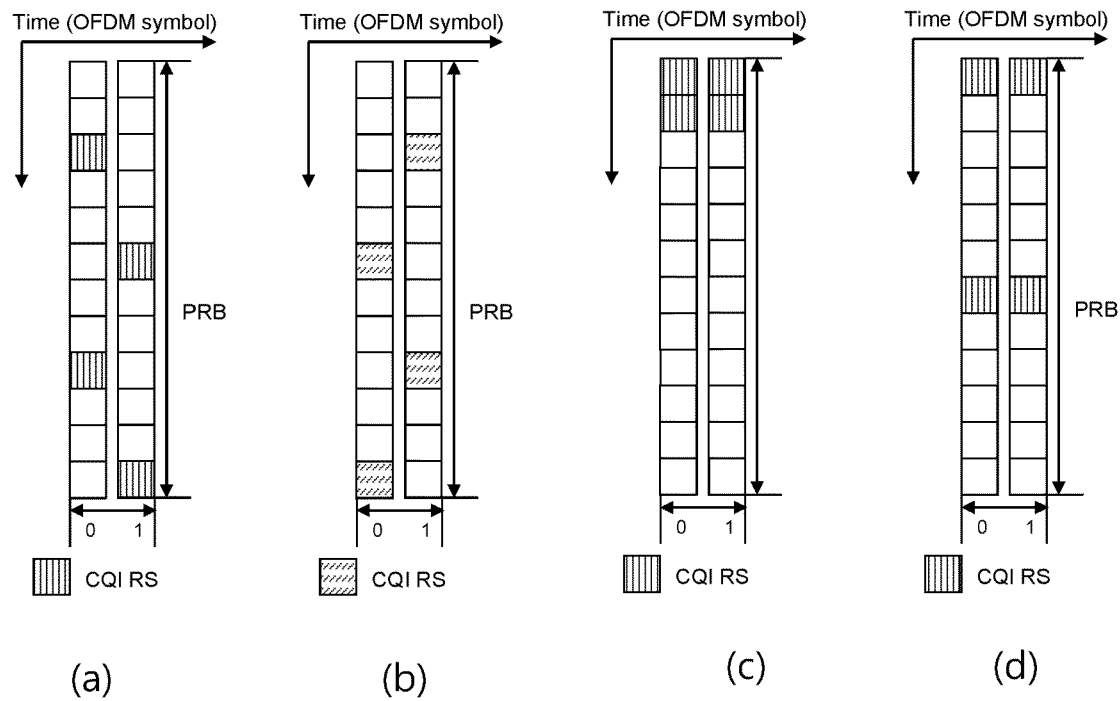
FIG. 34 shows examples in which a CQI RS is transmitted in two OFDM symbols in a subframe and in which a CQI RS is deployed to four resource elements in a frequency band corresponding to one resource block.

FIG. 34 shows examples in which a CQI RS is transmitted in two OFDM symbols in a subframe and in which a CQI RS is deployed to four resource elements in a frequency band corresponding to one resource block.

A CQI RS is deployed to four resource elements in a resource region including two OFDM symbols in a time domain (herein, each OFDM symbol may be included in different resource blocks) and 12 subcarriers in a frequency domain. As shown in FIG. 34(*a*), (*b*), or (*d*), resource elements to which the CQI RS is deployed can be deployed by being spaced apart from each other by the same resource element distance. For example, the resource elements can be deployed by being spaced apart from each other by a distance of 6 resource elements. Alternatively, a resource element to which a CQI RS is deployed as shown in FIG. 34(*c*) can be deployed to two consecutive resource elements in one OFDM symbol.

The CQI RS can be deployed by identifying 8 antennas by the use of CDM or {CDM, TDM}. For example, the CQI RS deployed to four resource elements can be subjected to CDM to be able to identify 8 antennas. Then, the CQI RS for all of the 8 antennas can be transmitted in one subframe. In this case, a duty cycle may be 1.

Alternatively, the CQI RS can be subjected to CDM to be able to identify four antennas in one subframe, and can be transmitted by identifying 8 antennas by the use of two subframes configured in this manner. For example, a CQI RS for antennas 0, 1, 2, and 3 can be transmitted by performing CDM in a subframe n (where n is an integer), and a CQI RS for antennas 4, 5, 6, and 7 can be transmitted by performing CDM in a subframe n+k (where k is a natural number greater than or equal to 1). That is, the CQI RS can be transmitted by performing CDM and TDM. In this case, a duty cycle may be 2.

Alternatively, the CQI RS can be subjected to CDM to be able to identify two antennas in one subframe, and can be transmitted by identifying 8 antennas by the use of four subframes configured in this manner. For example, a CQI RS for antennas 0 and 1 can be transmitted by performing CDM in a subframe n, and likewise, a CQI RS for antennas 2 and 3, a CQI RS for antennas 4 and 5, and a CQI RS for antennas 6 and 7 can be transmitted by performing CDM respectively in subframes n+1, n+2, and n+3. In this case, a duty cycle may be 4. Although consecutive subframes are shown in the example above, the present invention is not limited thereto. A position at which the CQI RS can be deployed for each cell can be shifted. For example, a start position of a resource element to which the CQI RS is deployed can be determined by a modular-3 or 6 operation. Alternatively, it can be deployed to a resource element of the same frequency domain as a common RS.

Figure 35:
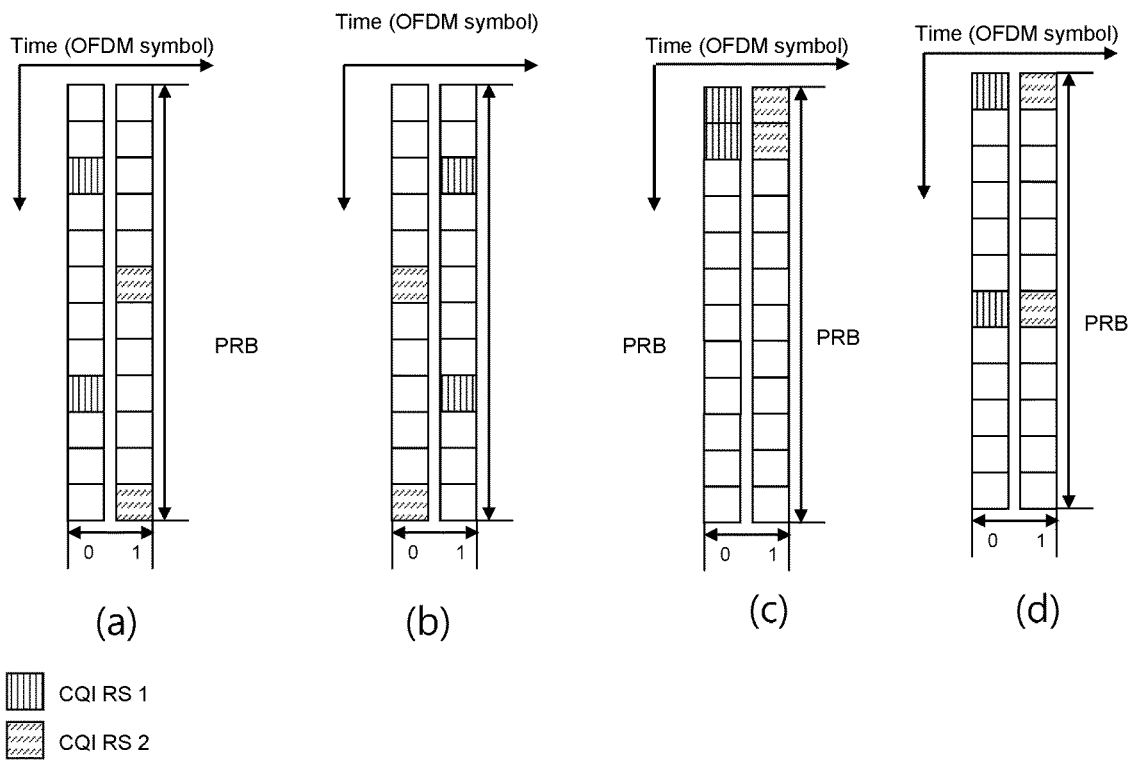
FIG. 35 shows examples of deploying two CQI RSs to four resource elements in two OFDM symbols.

FIG. 35 shows examples of deploying two CQI RSs to four resource elements in two OFDM symbols.

Unlike FIG. 34, two CQI RSs are deployed to four resource elements in FIG. 35. That is, a CQI RS 1 can be deployed to two resource elements included in one OFDM symbol, and a CQI RS 2 can be deployed to two resource elements included in the remaining OFDM symbol. The CQI RSs may be deployed to the resource elements in such a pattern that the resource elements are spaced apart from each other by the same resource element distance as shown in FIGS. 35(*a*), (*b*), and (*d*), and in such a pattern that the CQI RSs are deployed to two consecutive resource elements as shown in FIG. 35(*c*). FIG. 35(*d*) is different from FIGS. 35(*a*) and (*b*) in a sense that the CQI RS 1 and the CQI RS 2 are deployed to same resource elements of the frequency domain.

The CQI RS 1 and the CQI RS 2 can be deployed by identifying 8 antennas by the use of {CDM, TDM}.

In case of using {CDM, TDM}, the CQI RS 1 can be subjected to CDM to be able to identify four antennas (e.g., antennas 0 to 3), and the CQI RS 2 can also be subjected to CDM to be able to identify four antennas (i.e., antennas 4 to 7). Then, the CQI RS for all of 8 antennas can be transmitted in one subframe. In this case, a duty cycle may be 1.

Each of the CQI RS 1 and the CQI RS 2 can be subjected to CDM to be able to identify two antennas in one subframe, and can be transmitted by identifying 8 antennas by the use of two subframes configured in this manner. For example, the CQI RS 1 can be subjected to CDM to be able to identify antennas 0 and 1 in a subframe n (where n is an integer), and the CQI RS 2 can be subjected to CDM to be able to identify antennas 2 and 3. In a subframe n+k (where k is a natural number greater than or equal to 1), the CQI RS 1 is subjected to CDM to be able to identify antennas 4 and 5, and the CQI RS 2 can be subjected to CDM to be able to identify antennas 6 and 7. In this case, a duty cycle may be 2.

Alternatively, each of the CQI RS 1 and the CQI RS 2 can identify one separate antenna in one subframe, and can be transmitted by identifying 8 antennas by the use of four subframes configured in this manner. For example, the CQI RS 1 and the CQI RS 2 can be used respectively for an antenna 0 and an antenna 1 in a subframe n, for an antenna 2 and an antenna 3 in a subframe n+1, for an antenna 4 and an antenna 5 in a subframe n+2, and for an antenna 6 and an antenna 7 in a subframe n+3. In this case, a duty cycle may be 4. Although consecutive subframes are exampled in the above example, the present invention is not limited thereto.

Figure 36:
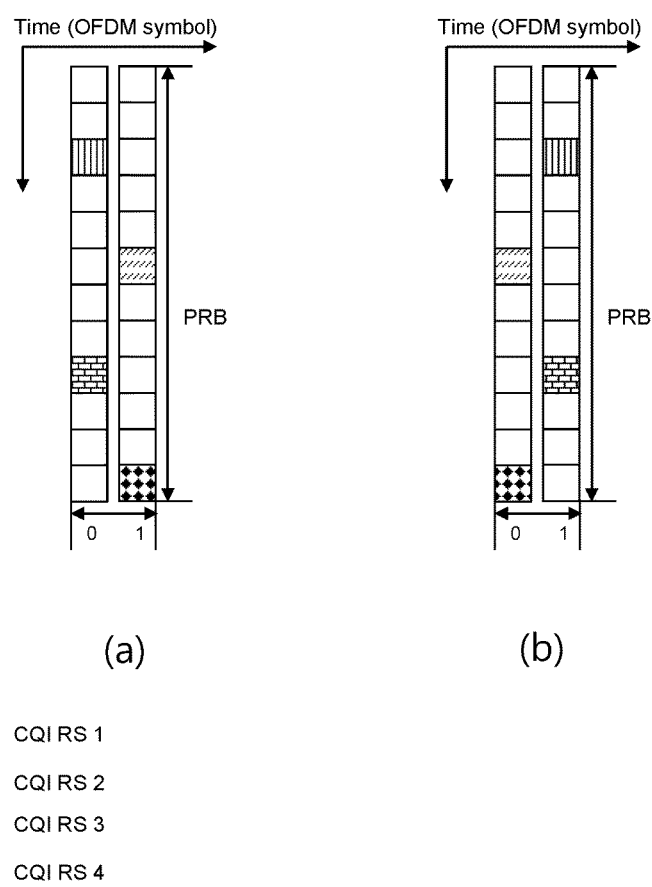
FIG. 36 shows examples of deploying four CQI RSs to four resource elements in two OFDM symbols.

FIG. 36 shows examples of deploying four CQI RSs to four resource elements in two OFDM symbols.

Four CQI RSs are deployed to four resource elements in FIG. 36. That is, a CQI RS 1 to a CQI RS 4 are deployed one by one to every one resource element among the four resource elements. The CQI RS 1 to the CQI RS 4 can be deployed by identifying 8 antennas by the use of {CDM, FDM, TDM}.

For example, each of the CQI RS 1 to the CQI RS 4 can be subjected to CDM in one subframe to be able to identify 8 antennas by identifying two antennas (duty cycle 1). Alternatively, 8 antennas can be identified (duty cycle 2) in such a manner that the CQI RS 1 to the CQI RS 4, which are identified by FDM, identify four antennas (e.g., antennas 0 to 3) in one subframe and identify another four antennas (i.e., antennas 4 to 7) in another subframe.

Figure 37:
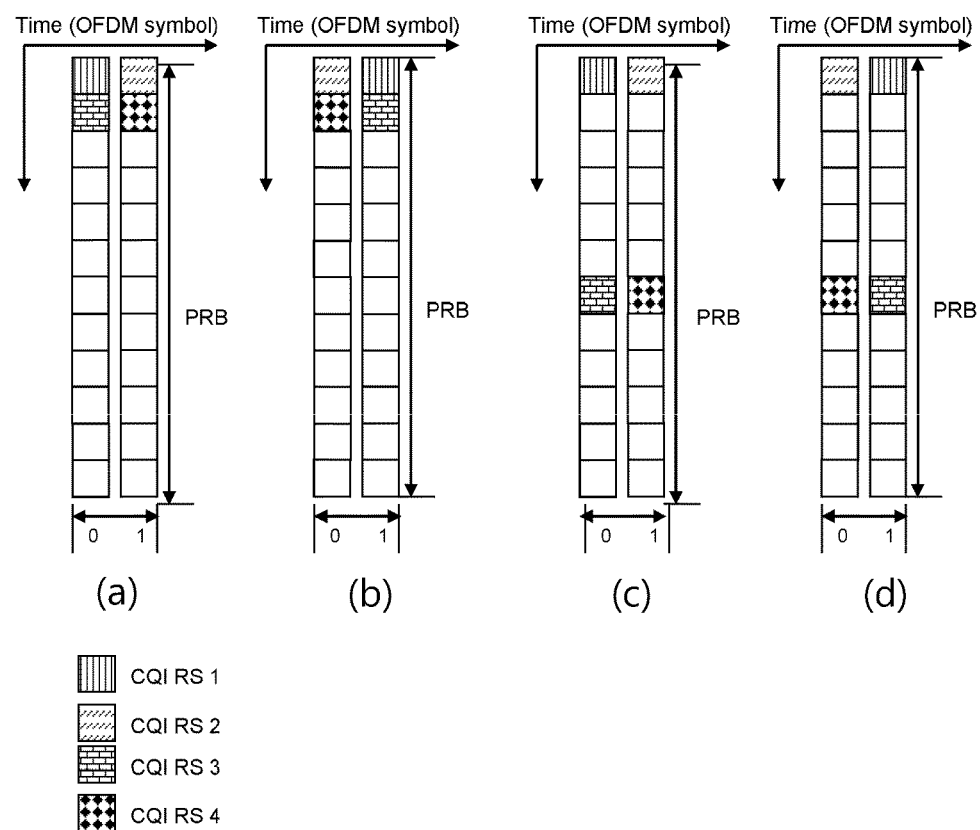
FIG. 37 shows an example of deploying four CQI RSs to four resource elements in two OFDM symbols in a subframe.

FIG. 37 shows an example of deploying four CQI RSs to four resource elements in two OFDM symbols in a subframe.

A CQI RS can be deployed to each of two consecutive resource elements in one OFDM symbol as shown in FIGS. 37(a) and (b). A CQI RS can be deployed to resource elements spaced apart from each other as shown in FIGS. 37(c) and (d).

Figure 38:
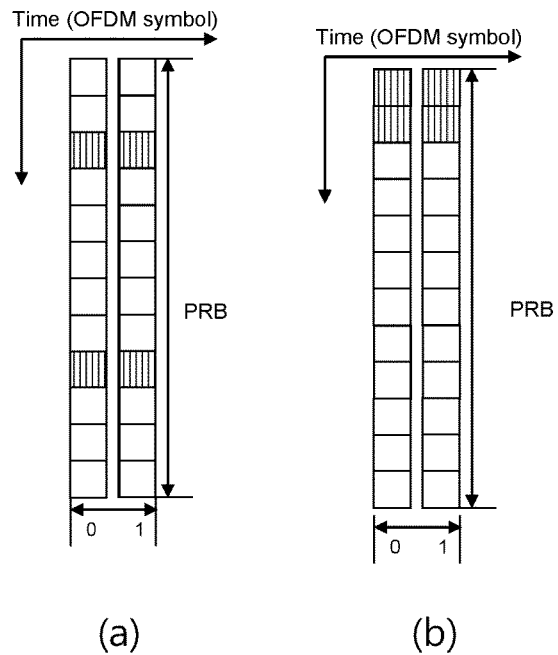
FIG. 38 shows an example in which a CQI RS is deployed to four resource elements in two OFDM symbols in a subframe wherein the resource elements to which the CQI RS is deployed to each OFDM symbol has the same pattern.

FIG. 38 shows an example in which a CQI RS is deployed to four resource elements in two OFDM symbols in a subframe wherein the resource elements to which the CQI RS is deployed to each OFDM symbol has the same pattern.

CDM can be used to allow a CQI RS deployed to four resource elements to be able to identify 8 antennas. Alternatively, {CDM, TDM} can be used such that antennas 0 to 3 can be identified in any one of two OFDM symbols, and antennas 4 to 7 can be identified in any one of the remaining OFDM symbol. Alternatively, the antennas 0 to 3 can be identified by using a CQI RS deployed to two OFDM symbols in a subframe n, and the antennas 4 to 7 can be identified by using a CQI RS deployed to two OFDM symbols in a subframe n+k.

Figure 39:
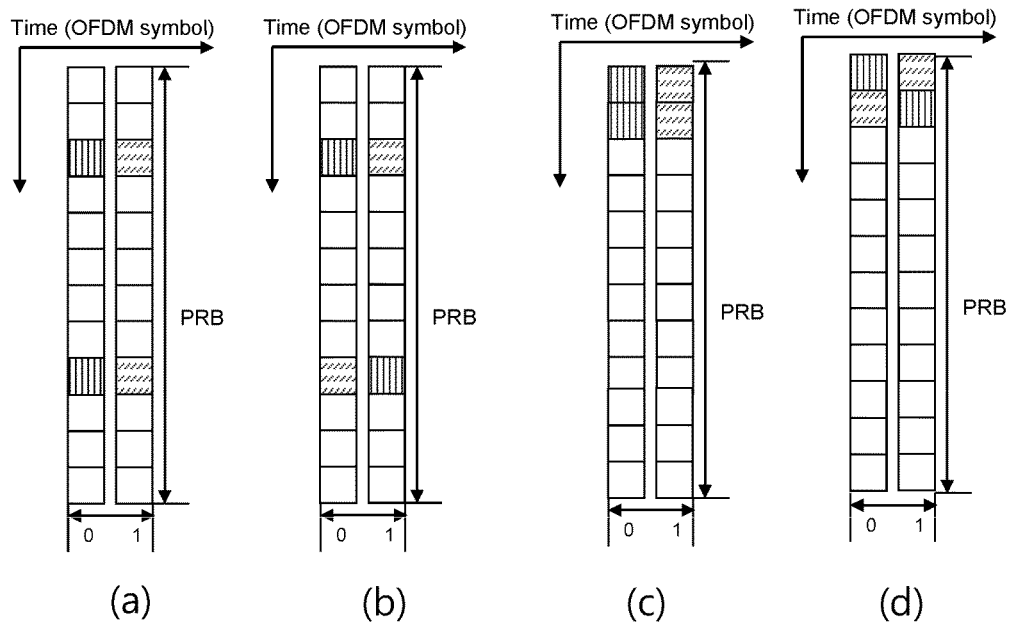
FIG. 39 shows an example in which two CQI RSs are deployed to four resource elements in two OFDM symbols in a subframe

FIG. 39 shows an example in which two CQI RSs are deployed to four resource elements in two OFDM symbols in a subframe Referring to FIG. 39, a CQI RS 1 is deployed to two resource elements in one OFDM symbol, and a CQI RS 2 is deployed to two resource elements in another OFDM symbol. The CQI RS 1 and the CQI RS 2 can use different basic sequences. The CQI RS 1 and the CQI RS 2 can be deployed by identifying 8 antennas by the use of TDM or {CDM, TDM}.

In case of TDM, each of the CQI RS 1 and the CQI RS 2 can identify one antenna in one subframe (i.e., two antennas in total), and can identify 8 antennas by using four subframes configured in this manner. In case of {CDM, TDM}, in one subframe, CDM can be performed such that the CQI RS 1 identifies antennas 0 and 1 and the CQI RS 2 identifies antennas 2 and 3, and in another subframe configured in a similar manner, CDM can be performed such that the CQI RS 1 identifies antennas 4 and 5 and the CQI RS 2 identifies antennas 6 and 7 (duty cycle 2). Alternatively, CDM can be performed such that the CQI RS 1 identifies antennas 0 to 3 and the CQI RS 2 identifies antennas 4 to 7 in one subframe (duty cycle 1). In order to avoid interference between CQI RSs in neighbor cells, a start position at which the CQI RS is deployed can be shifted for each cell. In this case, a start position at which the CQI RS is deployed (i.e., a position of a resource element) can be determined by a modular-3 or 6 operation.

Figure 40:
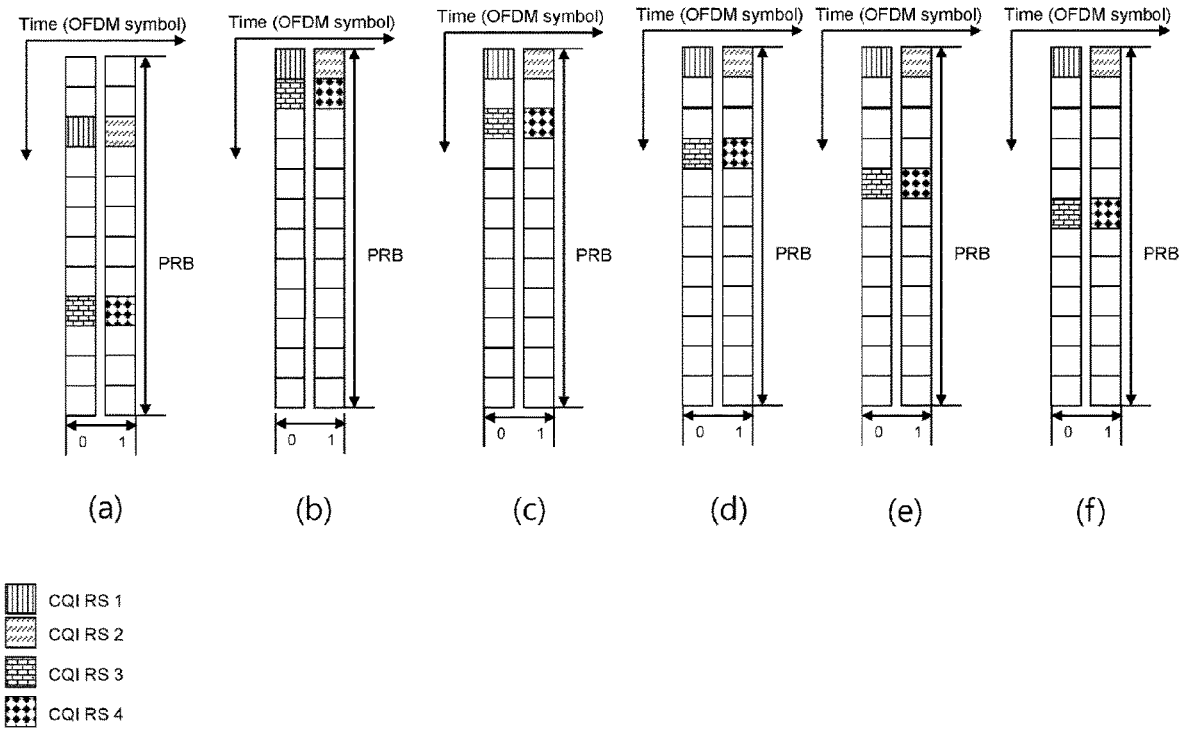
FIG. 40 shows examples for deploying four CQI RSs to four resource elements in two OFDM symbols in a subframe.

FIG. 40 shows examples for deploying four CQI RSs to four resource elements in two OFDM symbols in a subframe.

If each CQI RS is used only for one antenna in one subframe, four antennas can be identified. Therefore, a CQI RS for 8 antennas can be provided by using two subframes (duty cycle 2). Alternatively, if each CQI RS is used for two antennas by performing CDM in one subframe, all of the 8 antennas can be identified in one subframe (duty cycle 1).

Figure 41:
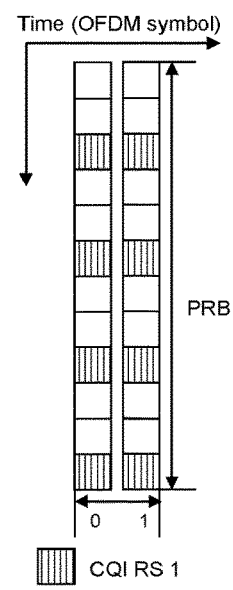
FIG. 41 shows an example in which a CQI RS is transmitted in two OFDM symbols in a subframe and in which a CQI RS is deployed to 8 resource elements in a frequency band corresponding to one resource block.

FIG. 41 shows an example in which a CQI RS is transmitted in two OFDM symbols in a subframe and in which a CQI RS is deployed to 8 resource elements in a frequency band corresponding to one resource block.

Referring to FIG. 41, a CQI RS 1 is deployed to 8 resource elements in a resource region including two OFDM symbols in a time domain and 12 subcarriers in a frequency domain. Each resource element to which the CQI RS 1 is deployed can be deployed by being spaced apart from each other by the same distance, for example, a distance of 3 resource elements.

The CQI RS 1 can be deployed by identifying 8 antennas by the use of CDM or {CDM and TDM}. For example, 8 resource elements to which the CQI RS 1 is deployed can identify 8 antennas by performing CDM. That is, 8 identical resource elements are subjected to CDM with different codes to be able to identify the 8 antennas. In this case, the CQI RS for all of the 8 antennas can be transmitted in one subframe (duty cycle 1).

Alternatively, the CQI RS 1 can be subjected to CDM to be able to identify four antennas in 8 resource elements in one subframe, and can be transmitted by identifying 8 antennas by the use of two subframes configured in this manner. For example, a CQI RS for antennas 0, 1, 2, and 3 can be transmitted by performing CDM in a subframe n, and a CQI RS for antennas 4, 5, 6, and 7 can be transmitted by performing CDM in a subframe n+1. That is, the CQI RS can be transmitted by performing CDM and TDM (duty cycle 2).

Alternatively, the CQI RS 1 can be subjected to CDM to be able to identify two antennas in 8 resource elements in one subframe, and can be transmitted by identifying 8 antennas by the use of four subframes configured in this manner. For example, a CQI RS for antennas 0 and 1 can be transmitted by performing CDM in a subframe n, and likewise, a CQI RS for antennas 2 and 3, a CQI RS for antennas 4 and 5, and a CQI RS for antennas 6 and 7 can be transmitted by performing CDM respectively in subframes n+1, n+2, and n+3 (duty cycle 4).

Figure 42:
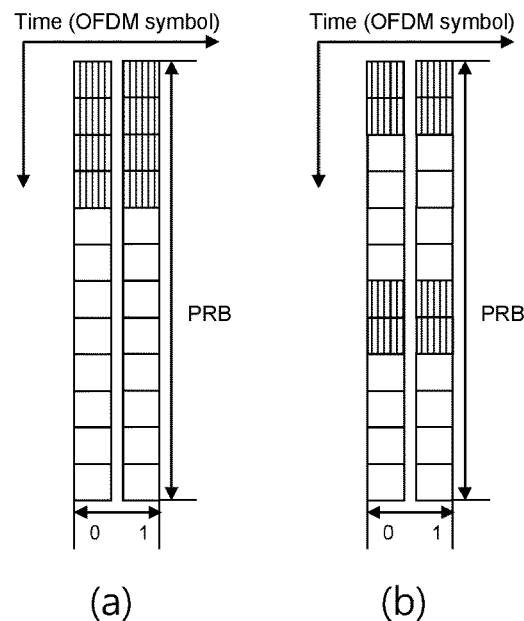
FIG. 42 shows other examples for deploying a CQI RS to 8 resource elements in two OFDM symbols in a subframe.

FIG. 42 shows other examples for deploying a CQI RS to 8 resource elements in two OFDM symbols in a subframe. A CQI RS can be deployed to consecutive resource elements as shown in FIG. 42(a). A CQI RS can be deployed in a pattern in which two consecutive resource element pairs are spaced apart from each other as shown in FIG. 42(b). A start position of a resource element to which the CQI RS is deployed may differ for each cell.

Figure 43:
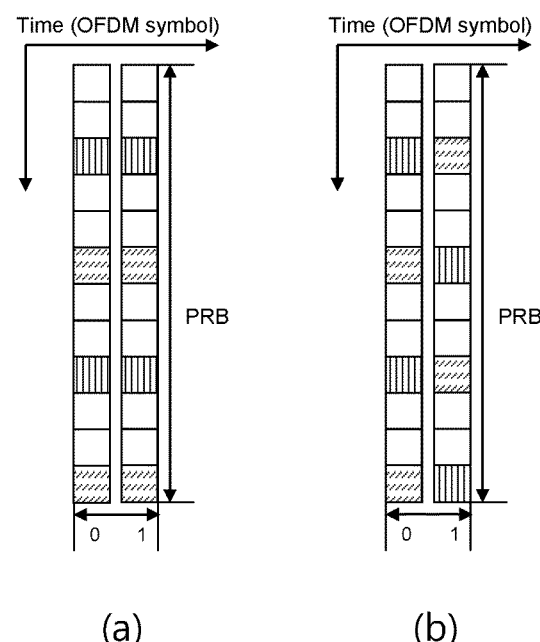
FIG. 43 shows examples of deploying two CQI RSs to 8 resource elements in two OFDM symbols in a subframe.

FIG. 43 shows examples of deploying two CQI RSs to 8 resource elements in two OFDM symbols in a subframe. Each CQI RS can be deployed to a resource element of the same frequency band in two OFDM symbols as shown in FIG. 43(a), and can be deployed to a resource element of different frequency bands as shown in FIG. 43(b).

If each of a CQI RS 1 and a CQI RS 2 are used in one antenna in one subframe, two antennas can be identified and used, and 8 antennas can be used by using four subframes configured in this manner (duty cycle 4). Alternatively, if each of the CQI RS 1 and the CQI can be subjected to CDM to be able to identify two antennas in one subframe, 4 antennas can be identified and used. If two subframes configured in this manner are used, 8 antennas can be identified (duty cycle 2). Alternatively, if each of the CQI RS 1 and the CQI RS 2 are subjected to CDM to be able to identify 4 antennas in one subframe, 8 antennas can be identified (duty cycle 1).

Figure 44:
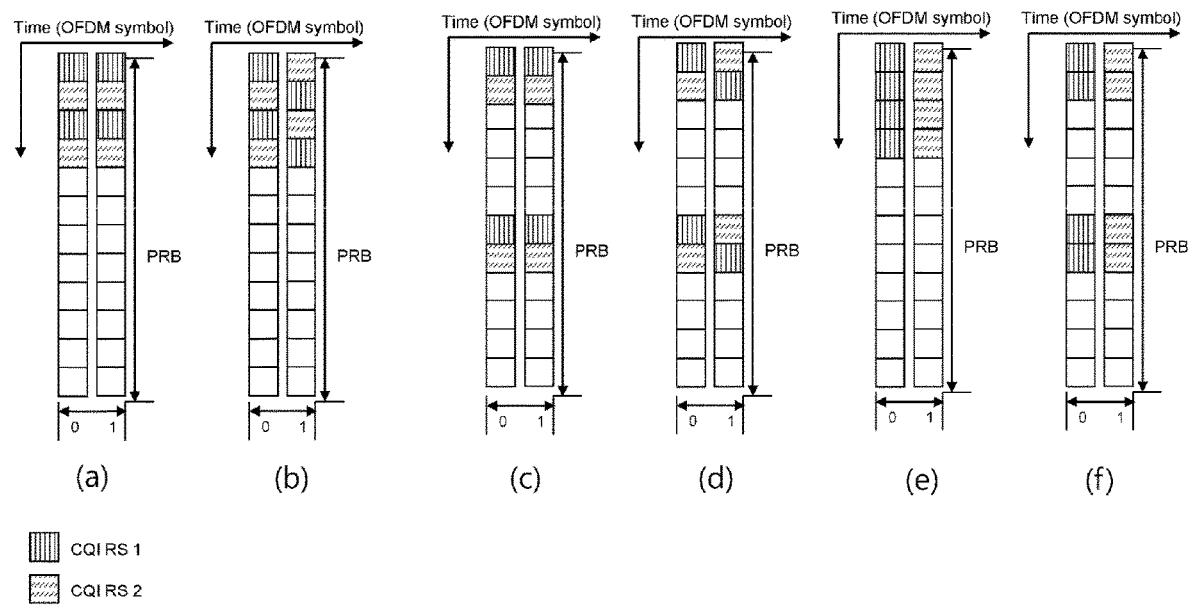
FIG. 44 shows examples of deploying two CQI RSs to 8 resource elements in two OFDM symbols in a subframe.

FIG. 44 shows examples of deploying two CQI RSs to 8 resource elements in two OFDM symbols in a subframe. FIG. 44(*a*) shows an example in which a CQI RS 1 and a CQI RS 2 are deployed to the same resource element (in frequency domain) in two OFDM symbols. FIG. 44(*b*) shows an example in which CQI RSs are deployed to different resource elements in a frequency domain. FIG. 44(*c*) shows an example in which a CRI RS 1 and a CQI RS 2 are deployed to the same resource element in a frequency domain, and each CQI RS is deployed to resource elements which are spaced apart from each other by a distance of 6 resource elements. FIG. 44(*d*) is different from FIG. 44(*b*) in a sense that each CQI RS is deployed to resource elements spaced apart from each other by a distance of 6 resource elements. FIGS. 44(*e*) and (*f*) are characterized in that only one CQI RS is deployed to one OFDM symbol. That is, an OFDM symbol to which a CQI RS 1 is deployed is different from an OFDM symbol to which a CQI RS 2 is deployed.

Figure 45:
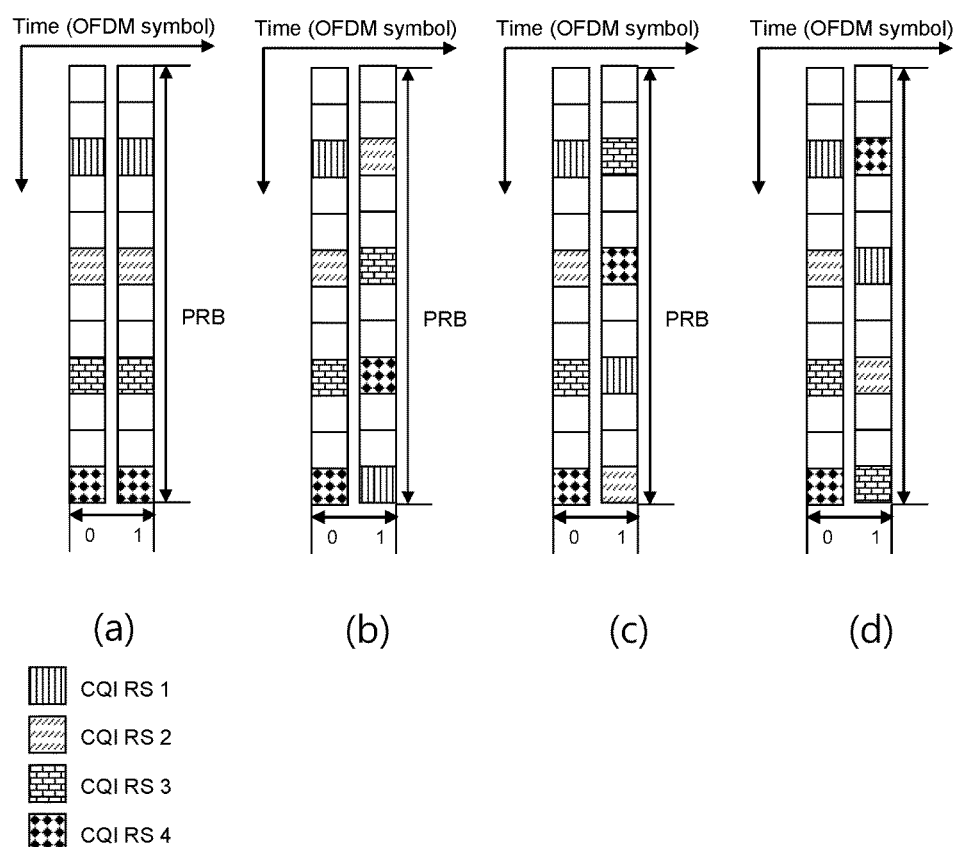
FIG. 45 to FIG. 47 show examples of deploying four CQI RSs to 8 resource elements in two OFDM symbols in a subframe.
Figure 46:
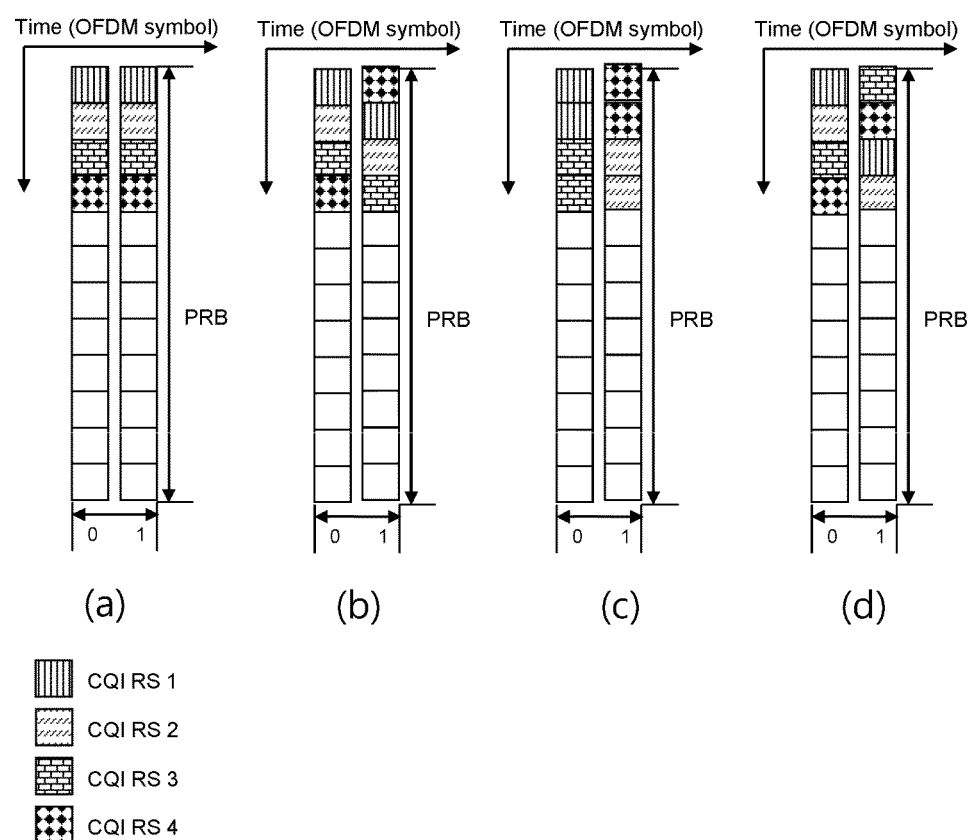
Figure 47:
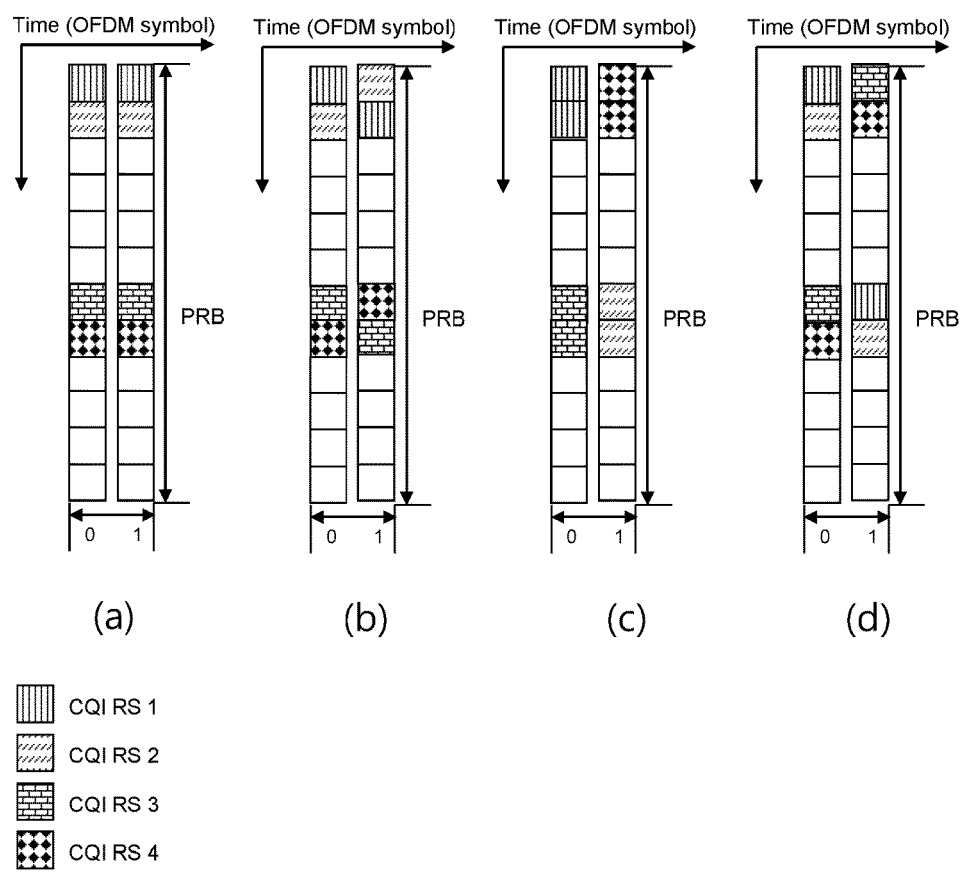

FIG. 45 to FIG. 47 show examples of deploying four CQI RSs to 8 resource elements in two OFDM symbols in a subframe.

The four CQI RSs deployed as shown in FIG. 45 to FIG. 47 can be identified by being allocated (based on FDM) respectively to different resource elements. A CQI RS 1 to a CQI RS 4 can use different basic sequences. The CQI RS 1 to the CQI RS 4 can be deployed by identifying 8 antennas by the use of {CDM and TDM}.

For example, two resource elements to which the CQI RS 1 is deployed can be subjected to CDM to be able to identify two antennas (e.g., antennas 0 and 1), and two resource elements to which the CQI RS 2 is deployed can also be subjected to CDM to be able to identify two antennas (e.g., antennas 2 and 3). Likewise, CDM can be performed such that the CQI RS 3 can identify antennas 4 and 5 and the CQI RS 4 can identify antennas 6 and 7, thereby being able to two antennas for each CQI RS. That is, the CQI RS 1 to the CQI RS 4 are subjected to FDM, and each of the CQI RS 1 to the CQI RS 4 can be subjected to CDM. In this case, the CQI RS for all of the 8 antennas can be transmitted in one subframe. A duty cycle may be one subframe.

Alternatively, each of the CQI RS 1 to the CQI RS 4 can be transmitted as a CQI RS for one antenna in two resource elements in one subframe, and can be transmitted by identifying the 8 antennas by the use of two subframes configured in this manner. For example, in a subframe n, the CQI RS 1 to the CQI RS 4 can be identified for antennas 0 to 3, respectively. In a subframe n+1, the CQI RS 1 to the CQI RS 4 can be identified for antennas 4 to 7, respectively. That is, the CQI RS can be transmitted by performing TDM. In this case, a duty cycle may be two subframes.

In FIG. 45, resource elements to which each CQI RS is deployed are deployed by being spaced apart from each other by the same distance in a frequency domain. On the other hand, in FIG. 46, each CQI RS is deployed to 4 consecutive resource elements in a frequency domain. In FIG. 47, two CQI RSs are deployed to two consecutive resource elements in a frequency domain, and the remaining two CQI RSs are deployed to two consecutive resource elements located by being spaced apart from the two consecutive resource elements.

As shown in FIG. 46(*c*) and FIG. 47(*c*), two CQI RSs (i.e., CQI RS 1 and CQI RS 3) can be deployed to one OFDM symbol, and the remaining two CQI RSs (i.e., CQI RS 2 and a CQI RS 4) can be deployed to the remaining one OFDM symbol. Alternatively, as shown in FIG. 45 to FIG. 47 and other figures, four CQI RSs can be deployed to one OFDM symbol.

As shown in FIG. 45(*a*), FIG. 46(*a*), and FIG. 47(*a*), each CQI RS can be deployed to the same resource element in a frequency domain in each OFDM symbol, and as shown in other figure in FIG. 45 to FIG. 47, each CQI RS can be deployed to different resource elements in a frequency domain.

Figure 48:
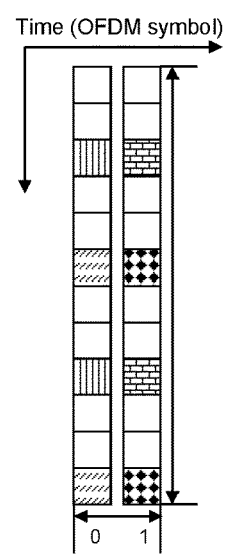
FIG. 48 shows an example in which a CQI RS is transmitted in two OFDM symbols in a subframe and in which four CQI RSs are deployed to 8 resource elements.

FIG. 48 shows an example in which a CQI RS is transmitted in two OFDM symbols in a subframe and in which four CQI RSs are deployed to 8 resource elements.

Referring to FIG. 48, each of two CQI RSs is deployed to two resource elements in a resource region including one OFDM symbol in a time domain and 12 subcarriers in a frequency domain and two OFDM symbols configured in this manner are included. A CQI RS 1 to a CQI RS 4 may use different basic sequences. The CQI RS 1 to the CQI RS 4 can be deployed by identifying 8 antennas by the use of {CDM and TDM}.

For example, if each of the CQI RS 1 to the CQI RS 4 in one subframe is used for one antenna, 8 antennas can be identified by using two subframes (duty cycle 2). Alternatively, if each of the CQI RS 1 to the CQI RS 4 in one subframe is subjected to CDM and is then used by identifying two antennas, the 8 antennas can be identified by using only one subframe (duty cycle 1). Two resource elements to which the CQI RS 1 is deployed can be subjected to CDM to be able to identify two antennas (e.g., antennas 0 and 1), and two resource elements to which the CQI RS 2 is deployed can be subjected to CDM to be able to identify two antennas (e.g., antennas 3 and 4). Likewise, each of the CQI RS 3 and the CQI RS 4 can also be subjected to CDM to be able to identify two antennas. That is, the CQI RS 1 to the CQI RS 4 can be subjected to FDM, and each of the CQI RS 1 to the CQI RS 4 can be subjected to CDM. In this case, the CQI RS for all of the 8 antennas can be transmitted in one subframe.

Figure 49:
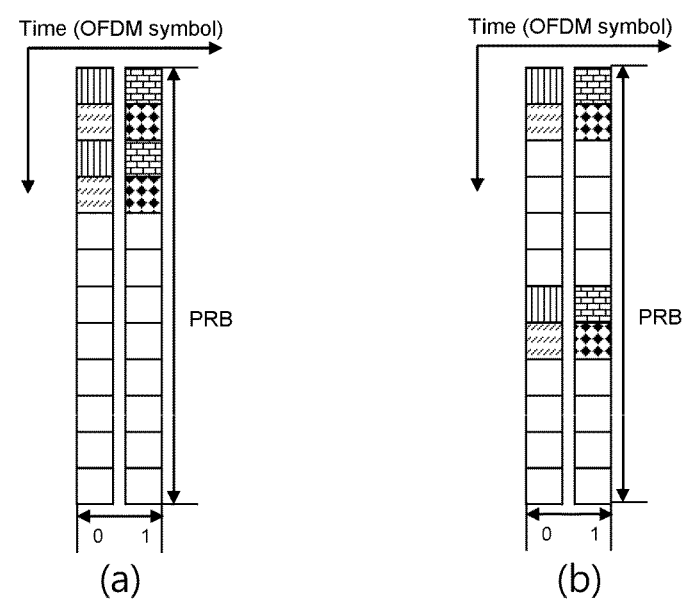
FIG. 49 shows another example in which a CQI RS is transmitted in two OFDM symbols in a subframe and in which four CQI RSs are deployed to 8 resource elements.

FIG. 49 shows another example in which a CQI RS is transmitted in two OFDM symbols in a subframe and in which four CQI RSs are deployed to 8 resource elements. In FIG. 49(*a*), two CQI RSs are deployed to four consecutive resource elements. In FIG. 49(*b*), two CQI RSs are deployed to two consecutive resource elements and another two consecutive resource elements spaced apart by a specific resource element distance. A start position of a resource element to which the CQI RS is deployed may be fixed, and may be shifted depending on an offset value. In FIG. 49(*b*), the offset value may be set to any one of values 1 to 4.

Figure 51:
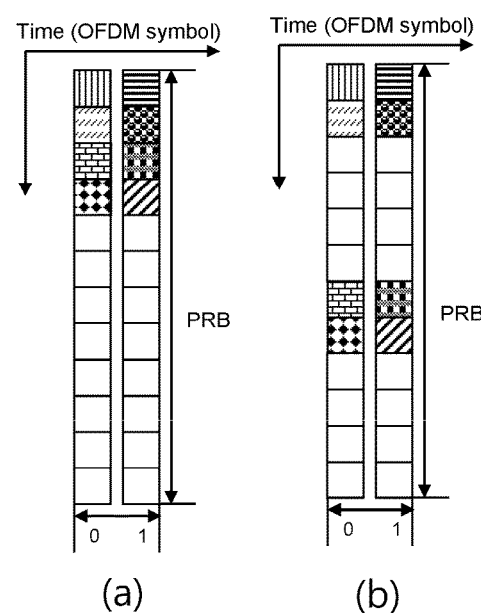
Figure 52:
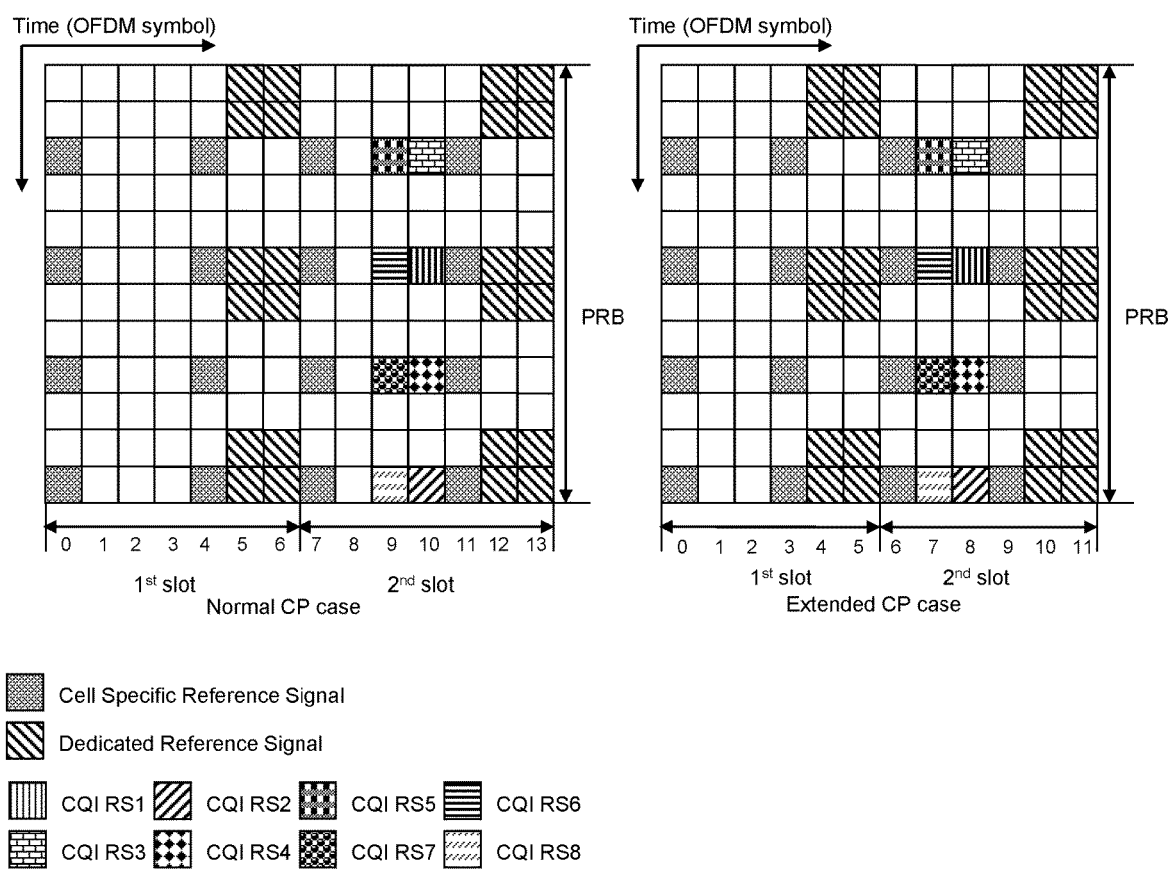
FIG. 52 to FIG. 64 show examples in which a CQI RS is transmitted in two OFDM symbols for a resource region including one subframe in a time domain and 12 subcarriers in a frequency domain and in which 8 CQI RSs are deployed to 8 resource elements.
Figure 53:
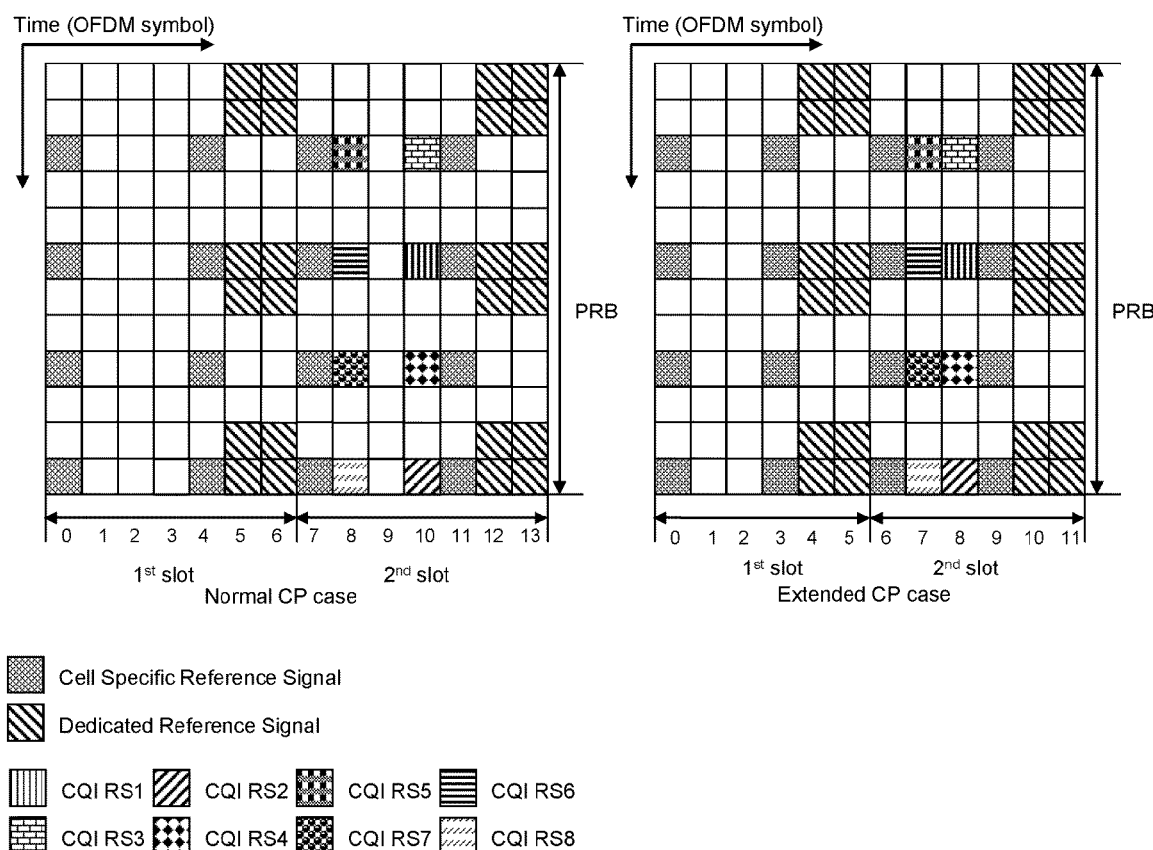
Figure 54:
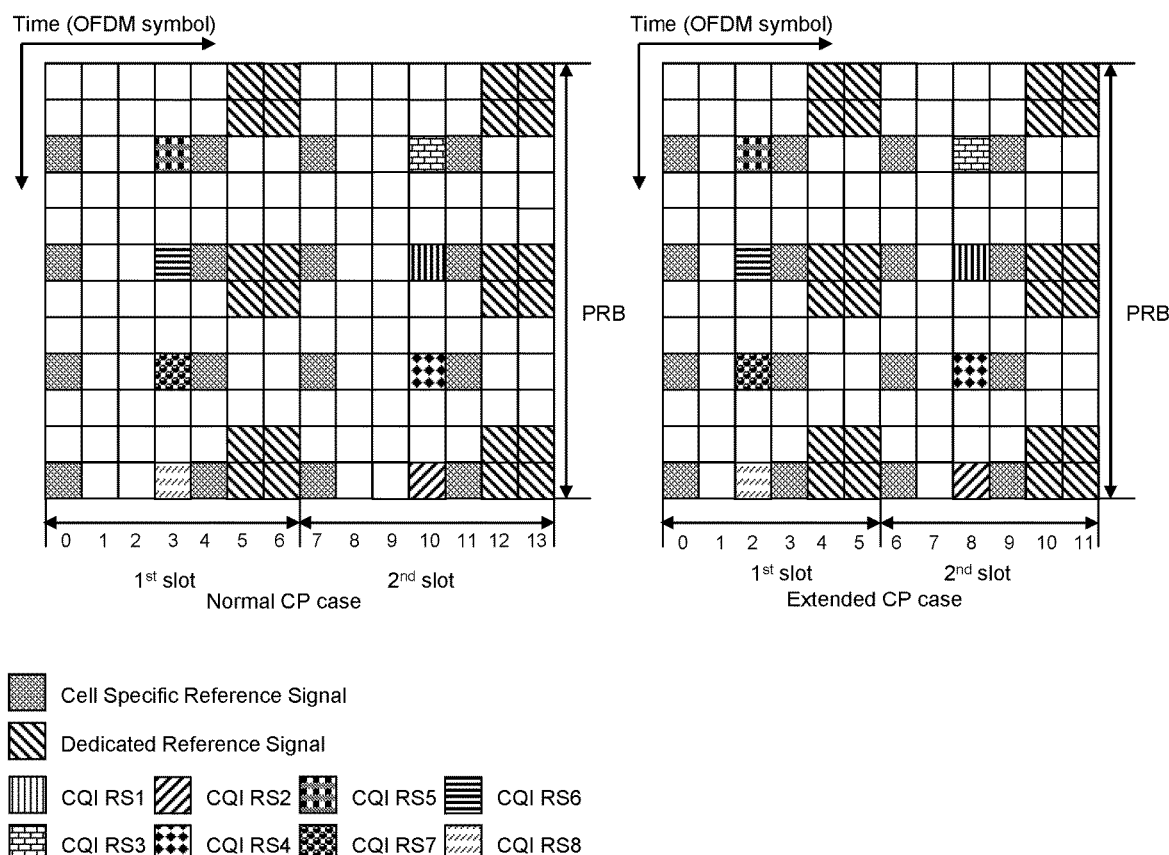
Figure 55:
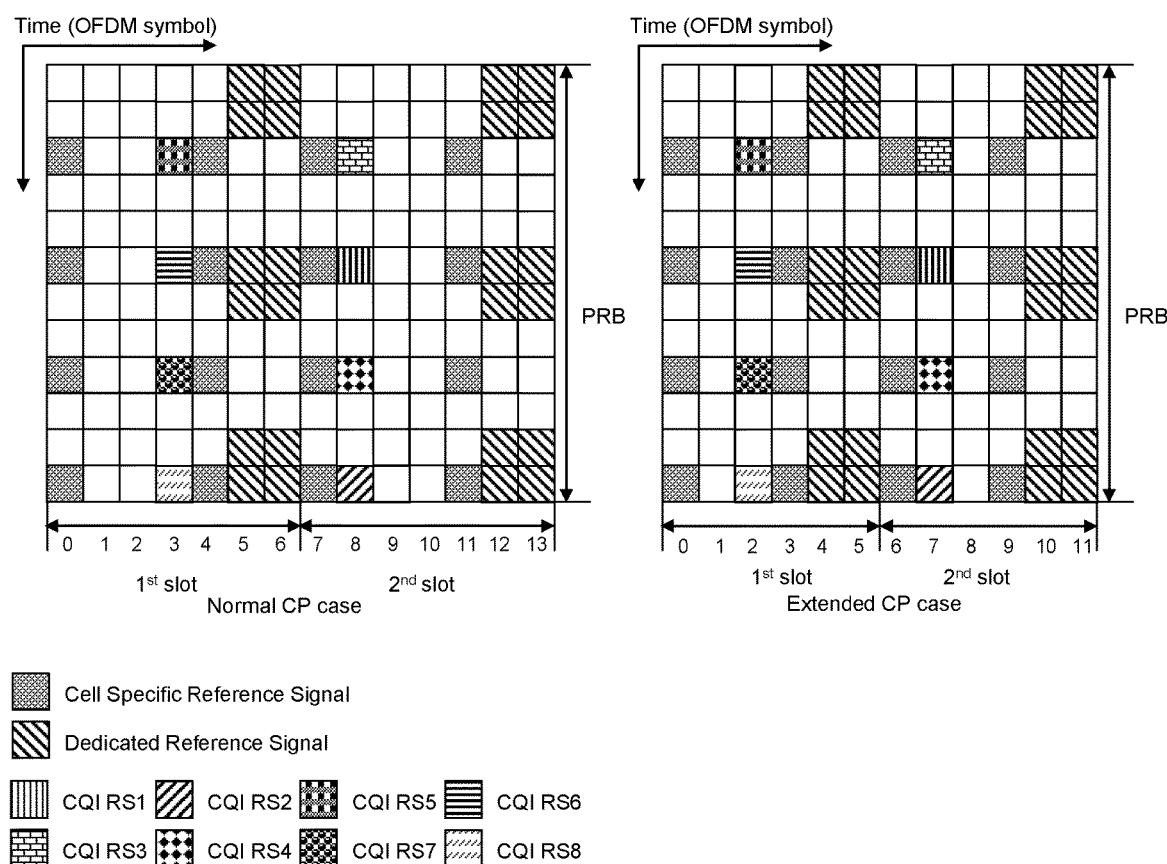
Figure 56:
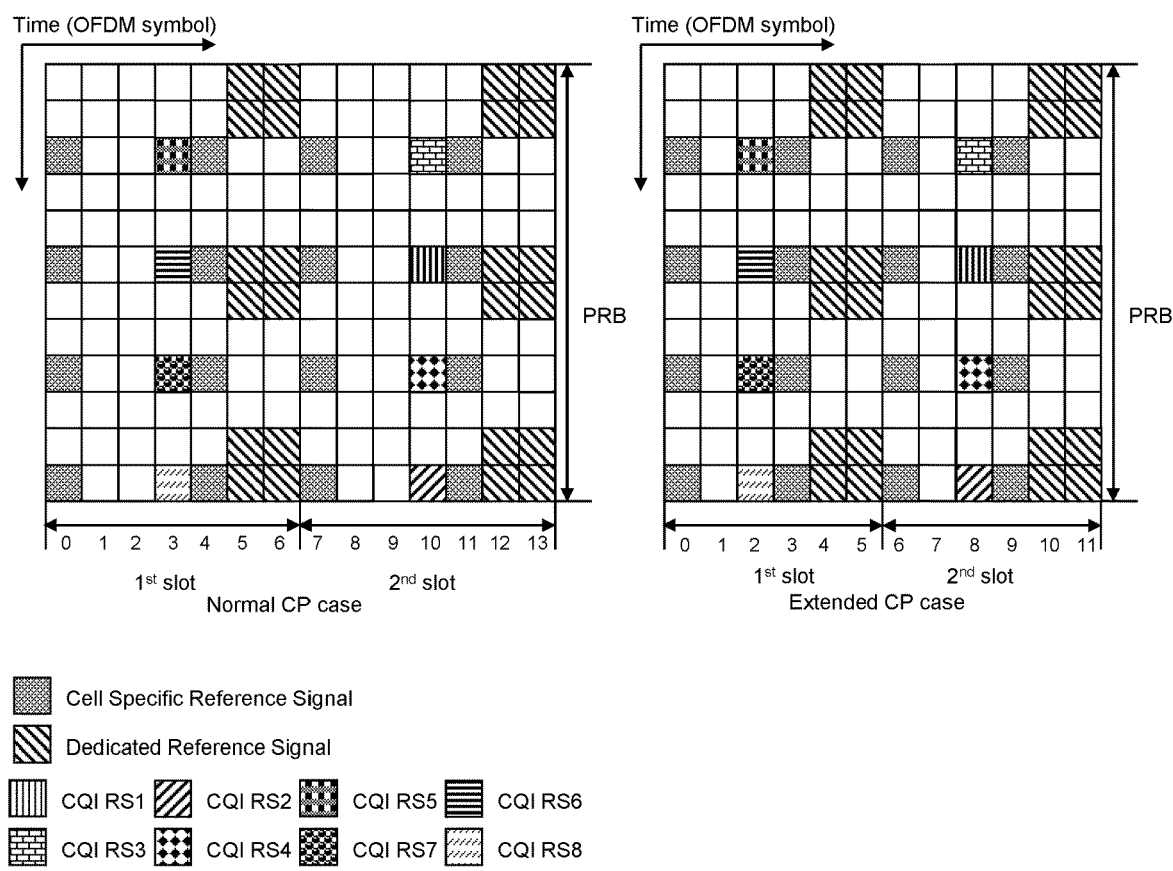
Figure 57:
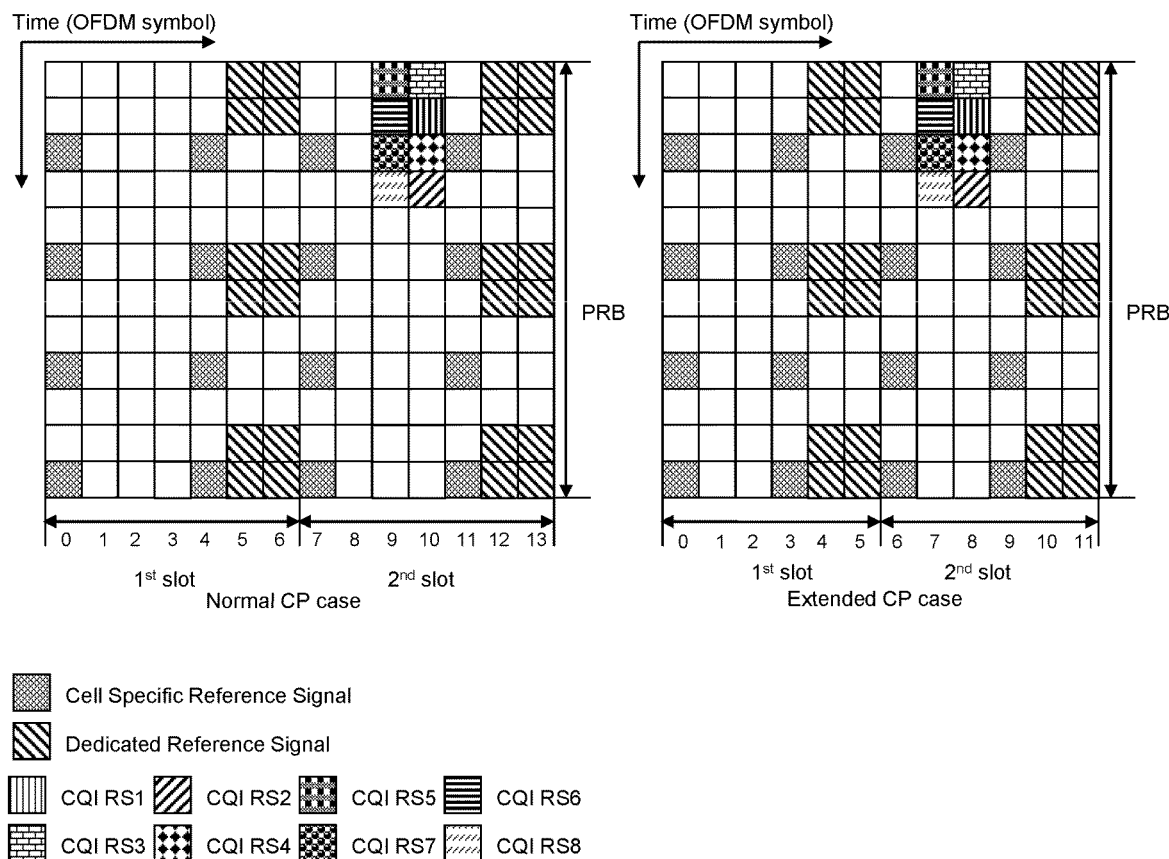
Figure 58:
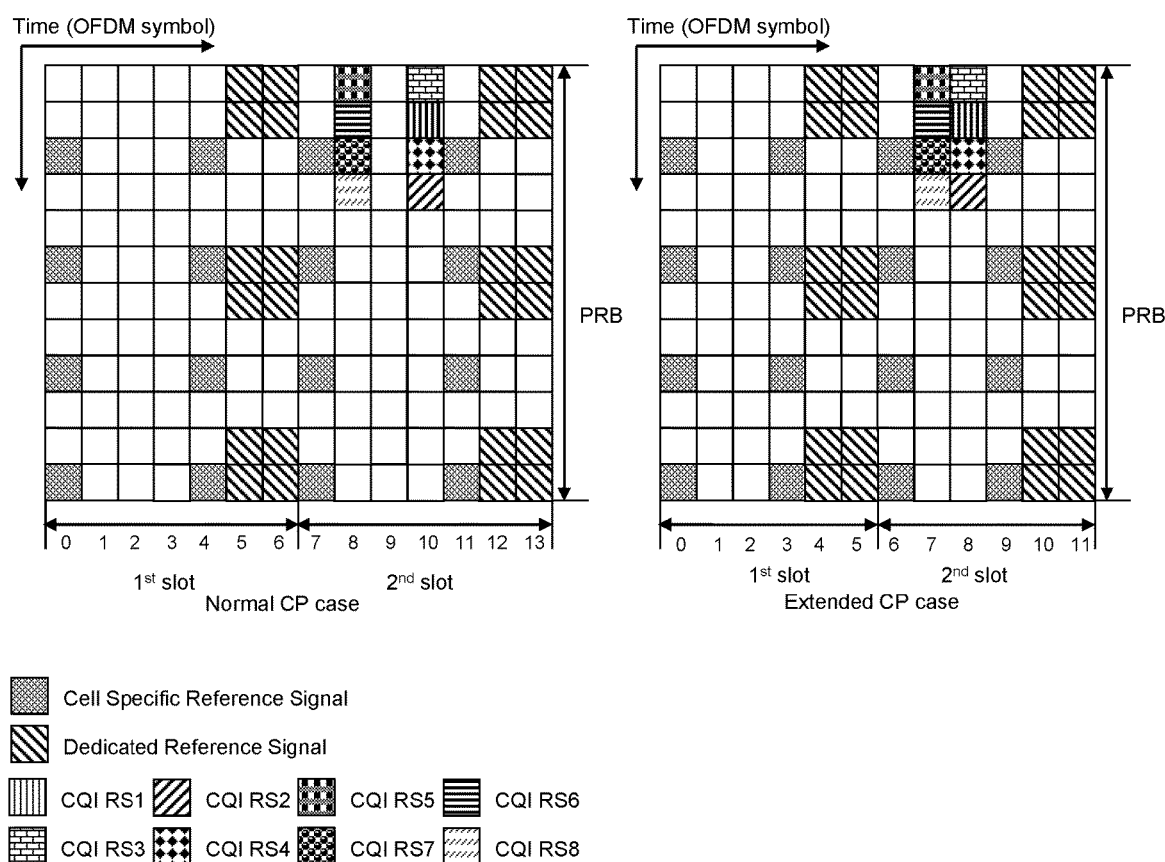
Figure 59:
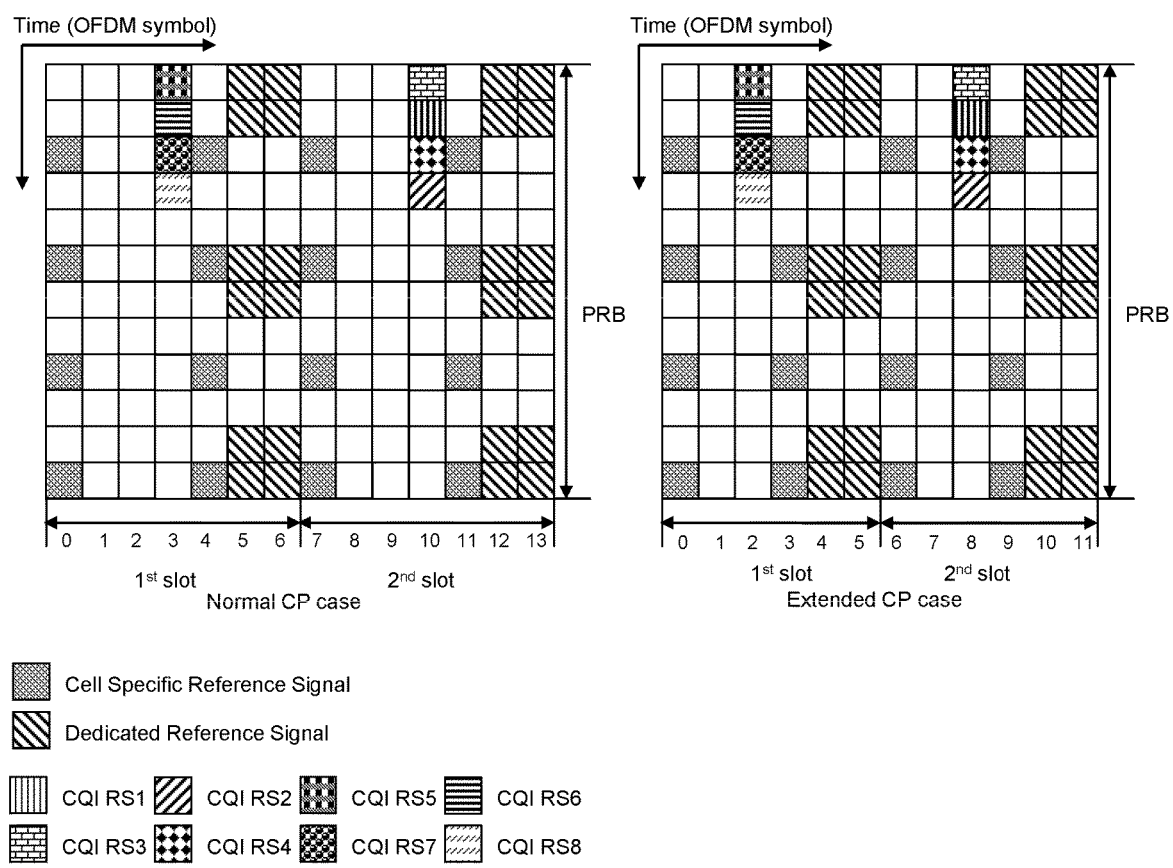
Figure 60:
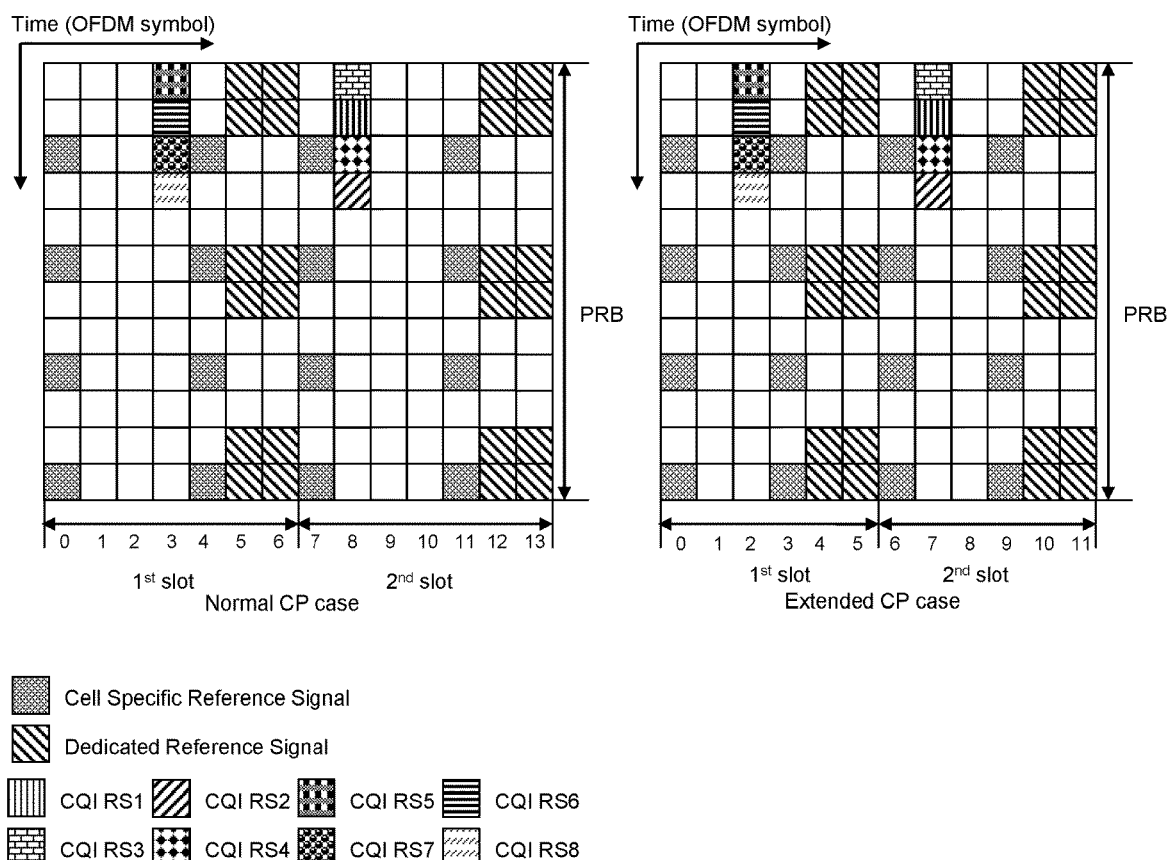
Figure 61:
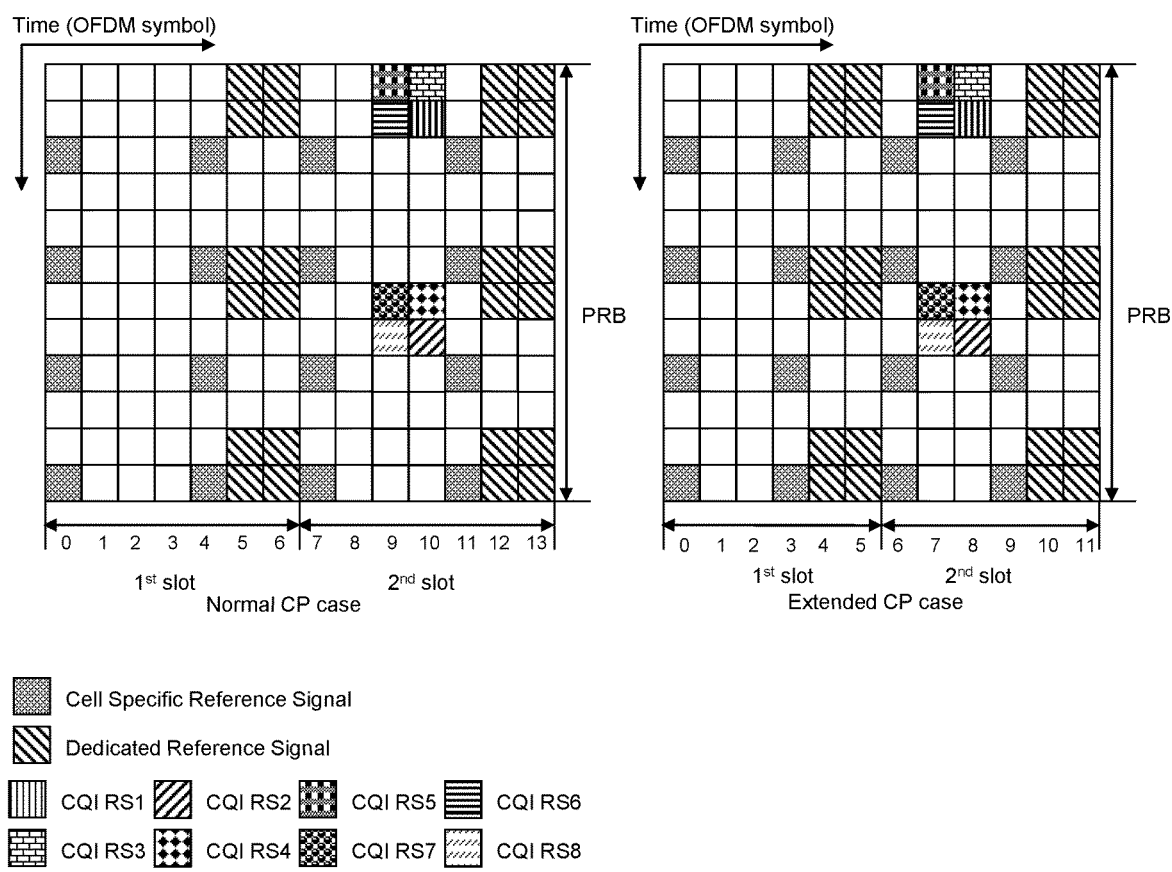
Figure 62:
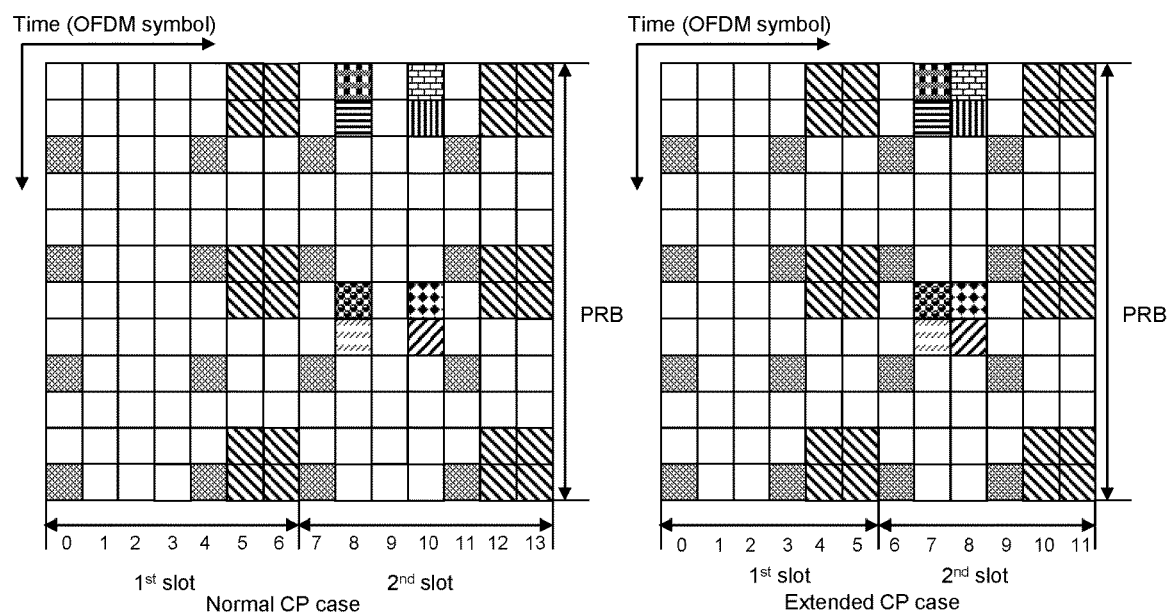
Figure 63:
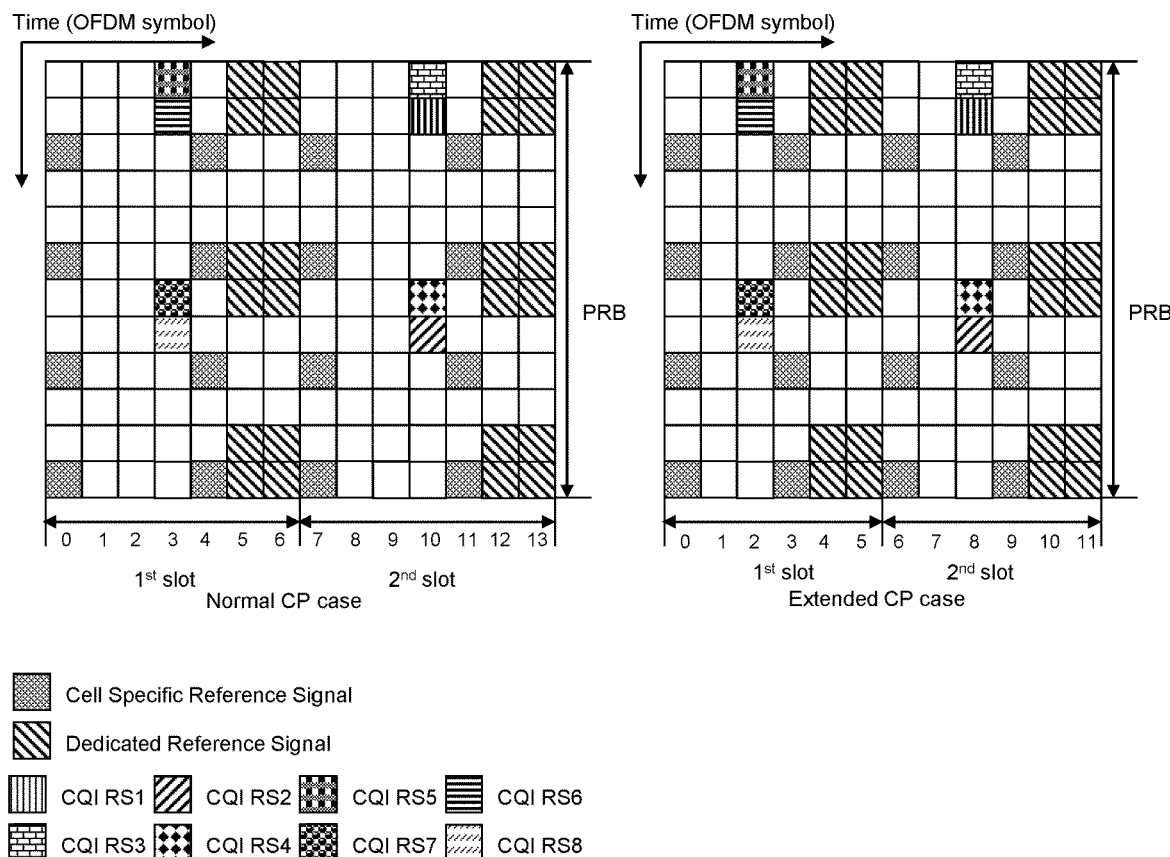
Figure 64:
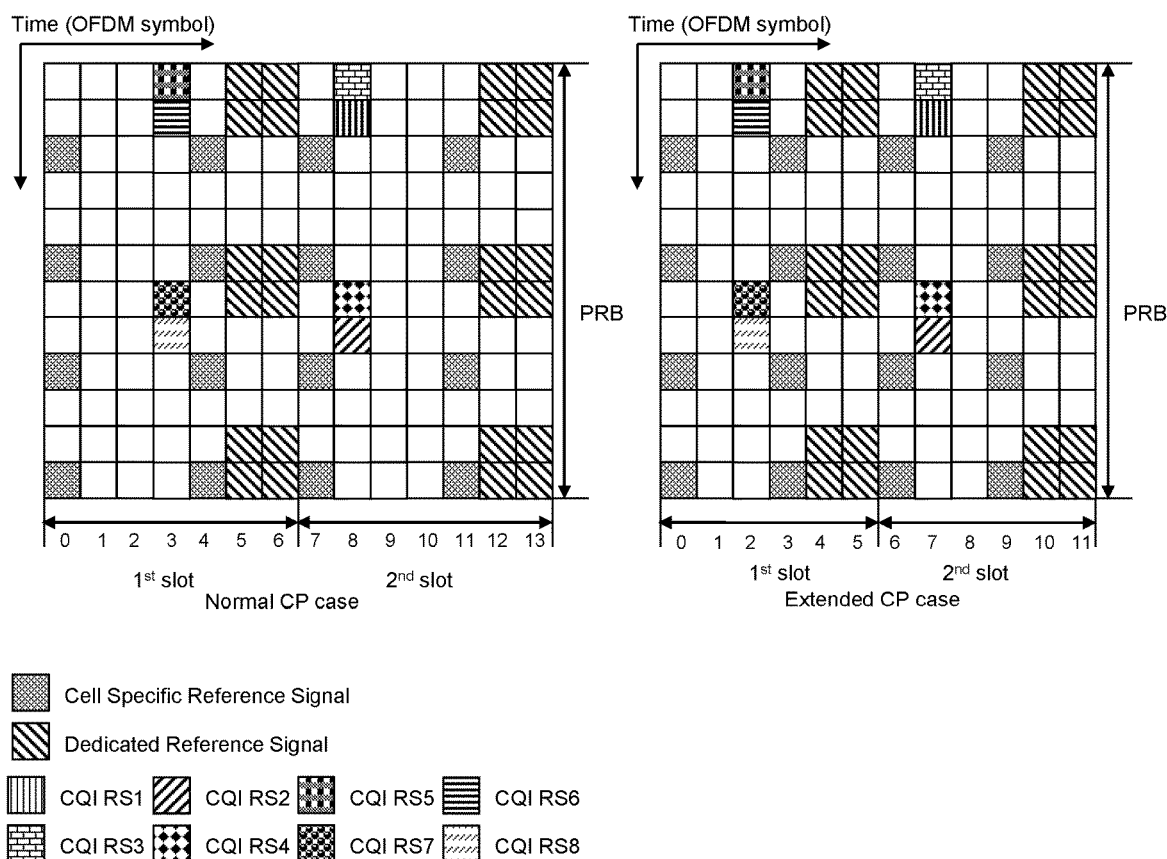

FIG. 50 and FIG. 51 show examples in which a CQI RS is transmitted in two OFDM symbols in a subframe and in which 8 CQI RSs are deployed to 8 resource elements.

Referring to FIG. 50, each of 8 CQI RSs is deployed to one resource element in a resource region including two OFDM symbols in a time domain and 12 subcarriers in a frequency domain. A CQI RS 1 to a CQI RS 8 can use different basic sequences. Each of the CQI RS 1 to the CQI RS 8 can be used for one antenna, thereby being able to identify 8 antennas. Resource elements to which a CQI RS is deployed can be located by being spaced apart by the same resource element distance (i.e., a distance of 3 resource elements). In FIG. 51(*a*), a resource element to which the CQI RS 1 to the CQI RS 8 are deployed is located consecutively in a frequency domain. In this case, the CQI RS can be deployed by shifting it by a distance of 4 resource elements in each cell so that a resource element to which the CQI RS is deployed in three contiguous cells does not overlap. In FIG. 51(*b*), four CQI RSs are deployed to two consecutive resource elements and another two consecutive resource elements spaced apart by a specific resource element distance, and there are two OFDM symbols configured in this manner. In this case, the CQI RS can be deployed by shifting it by a distance of two resource elements in each cell. Then, a resource element to which the CQI RS is deployed in three contiguous cells can be prevented from overlapping.

FIG. 52 to FIG. 64 show examples in which a CQI RS is transmitted in two OFDM symbols for a resource region including one subframe in a time domain and 12 subcarriers in a frequency domain and in which 8 CQI RSs are deployed to 8 resource elements. As shown in the examples of FIGS. 45(*a*) to (*d*), FIGS. 46(*a*) to (*d*), FIGS. 47(*a*) to (*d*), FIG. 48, FIG. 49, FIG. 50, FIG. 51, and FIG. 52 to FIG. 64, the CQI RSs can be located in specific two OFDM symbols in a subframe. FIG. 52 to FIG. 64 are for exemplary purposes only, and thus a start position on a frequency domain in which the CQI RS is deployed to specific two OFDM symbols can change variously.

In frequency domain, resource elements to which a CQI RS is deployed may be identical to resource elements to which a common RS is deployed (see FIG. 52 to FIG. 56), or may be different (see FIG. 57 to FIG. 64).

As shown in the examples of FIG. 52 to FIG. 56, in case of a pattern in which CQI RSs are deployed by being spaced apart by the same resource element distance (i.e., a distance of 3 resource elements), a resource element to which the CQI RS is deployed in three contiguous cells can be deployed by being shifted in a unit of one resource element to avoid overlapping between resource elements. As shown in the examples of FIG. 57 to FIG. 60, in case of a pattern in which CQI RSs are deployed to four consecutive resource elements, a resource element to which the CQI RS is deployed in three contiguous cells can be deployed by being shifted in a unit of four resource elements to avoid overlapping between resource elements. As shown in the examples of FIG. 61 to FIG. 64, in case of a pattern in which CQI RSs are deployed to two consecutive resource elements and are deployed to two consecutive resource elements located by being spaced apart from the previous two consecutive resource elements by a distance of 4 resource elements, a resource element to which the CQI RS is deployed in three contiguous cells can be deployed by being shifted in a unit of two resource elements to avoid overlapping between resource elements.

Figure 65:
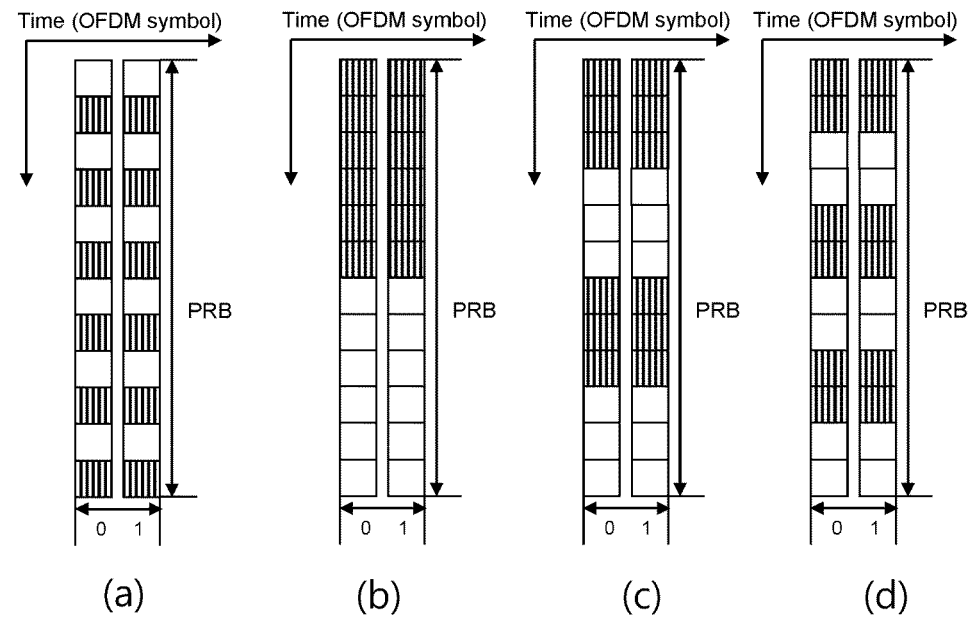
FIG. 65 shows examples of deploying a CQI RS to 12 resource elements in two OFDM symbols in a subframe.

FIG. 65 shows examples of deploying a CQI RS to 12 resource elements in two OFDM symbols in a subframe. In one OFDM symbol, the CQI RS can be deployed to resource elements spaced apart by the same resource element distance (i.e., a distance of two resource elements) as shown in FIG. 65(*a*), and can be deployed to 6 consecutive resource elements as shown in FIG. 65(*b*). Alternatively, as shown in FIG. 65(*c*) or FIG. 65(*d*), the CQI RS can be deployed to a specific number of consecutive resource elements and a specific number of consecutive resource elements spaced apart from the previous resource elements by a specific resource element distance. A resource element to which a CQI RS is deployed can be shifted in a frequency domain for each cell or cell group to reduce interference between resource elements. For example, in case of FIG. 65(*d*), resource elements to which a CQI RS is deployed can be shifted in a frequency domain by setting an offset value to any one of values 1 to 8.

In case of FIG. 65(*a*), 8 antennas can be identified by using CDM in one subframe (duty cycle 1). Alternatively, four antennas can be identified by using CDM in one subframe, and 8 antennas can be identified by using two subframes configured in this manner (duty cycle 2). Alternatively, two antennas can be identified by using CDM in one subframe, and 8 antennas can be identified by using four subframes configured in this manner (duty cycle 4).

Figure 66:
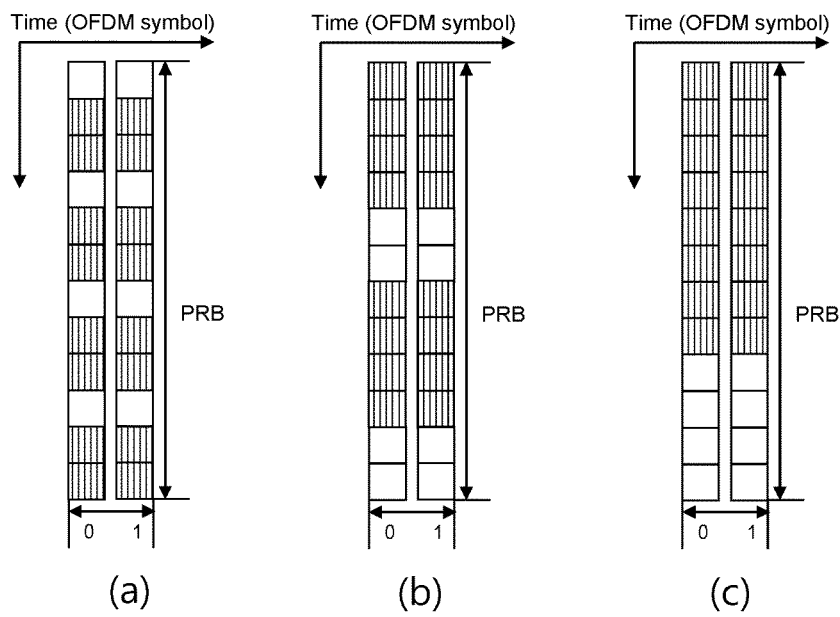
FIG. 66 shows examples of deploying a CQI RS to 16 resource elements in two OFDM symbols in a subframe.

FIG. 66 shows examples of deploying a CQI RS to 16 resource elements in two OFDM symbols in a subframe.

In one OFDM symbol, a CQI RS can be deployed in a pattern in which two consecutive resource elements are spaced apart from each other by a distance of one resource element as shown in FIG. 66(*a*), and a CQI RS can be deployed in a pattern in which four consecutive resource elements are spaced apart by a distance of two resource elements as shown in FIG. 66(*b*). Alternatively, a CQI RS can be deployed to 8 consecutive resource elements as shown in FIG. 66(*c*).

For example, if a CQI RS is deployed as shown in FIG. 66(*a*), 8 antennas can be identified by using CDM in one subframe (duty cycle 1). Four antennas can be identified by using CDM in one subframe, and 8 antennas can be identified by using two subframes configured in this manner (duty cycle 2). 2 antennas can be identified by using CDM in one subframe, and 8 antennas can be identified by using four subframes configured in this manner (duty cycle 4).

Figure 67:
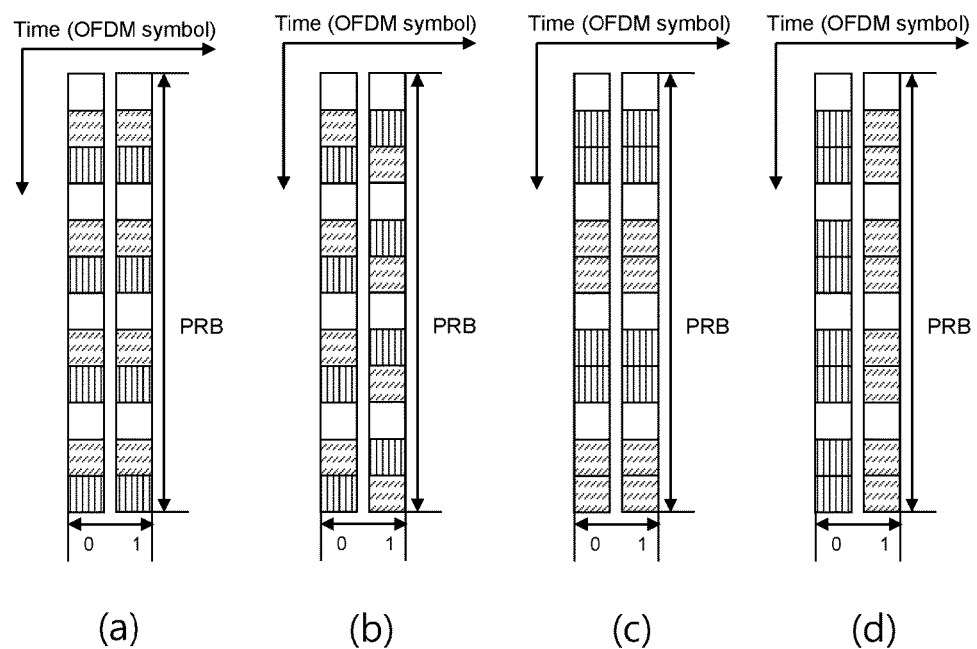
FIG. 67 shows examples of deploying two CQI RSs to 16 resource elements in two OFDM symbols in a subframe.

FIG. 67 shows examples of deploying two CQI RSs to 16 resource elements in two OFDM symbols in a subframe. Each CQI RS is deployed to 8 resource elements.

A CQI RS 1 and a CQI RS 2 can be deployed to a resource element of the same frequency domain in two OFDM symbols as shown in FIGS. 67(*a*) and (*c*). Alternatively, as shown in FIG. 67(*b*), CQI RSs can be deployed to resource elements of different frequency domains. FIG. 67(*d*) shows an example of deploying only one CQI RS to one OFDM symbol.

If each of two CQI RSs is used for one antenna in one subframe, four subframes configured in this manner can be used to identify 8 antennas (duty cycle 4). If each CQI RS is used for two antennas in one subframe by using CDM, it can be used for four antennas. Therefore, two subframes configured in this manner can be used to identify 8 antennas (duty cycle 2). If each CQI RS is used for four antennas in one subframe, only one subframe can be used to identify 8 antennas (duty cycle 1).

Figure 68:
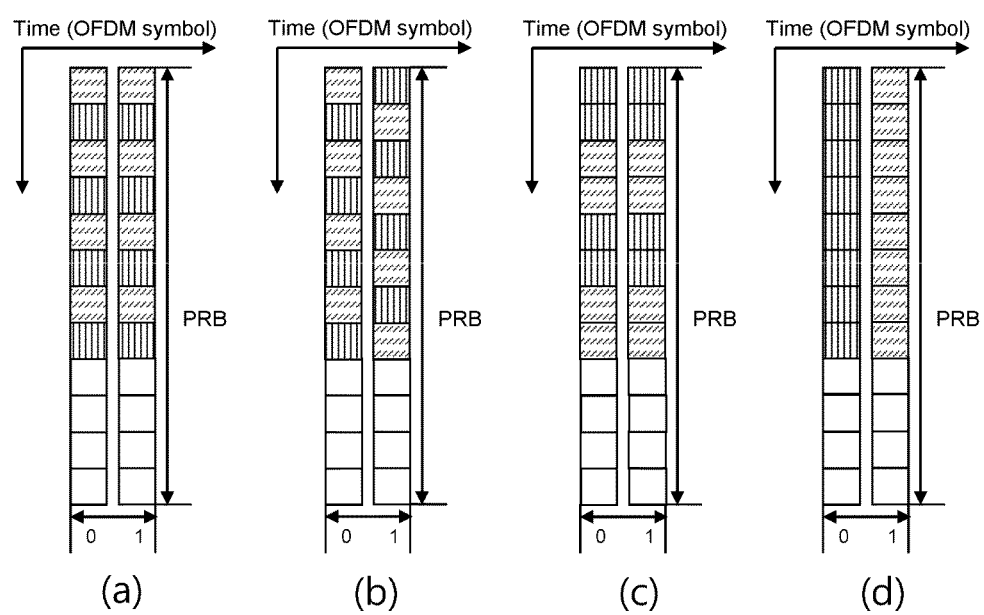
FIG. 68 and FIG. 69 show other examples for deploying two CQI RSs to 16 resource elements in two OFDM symbols in a subframe.
Figure 69:
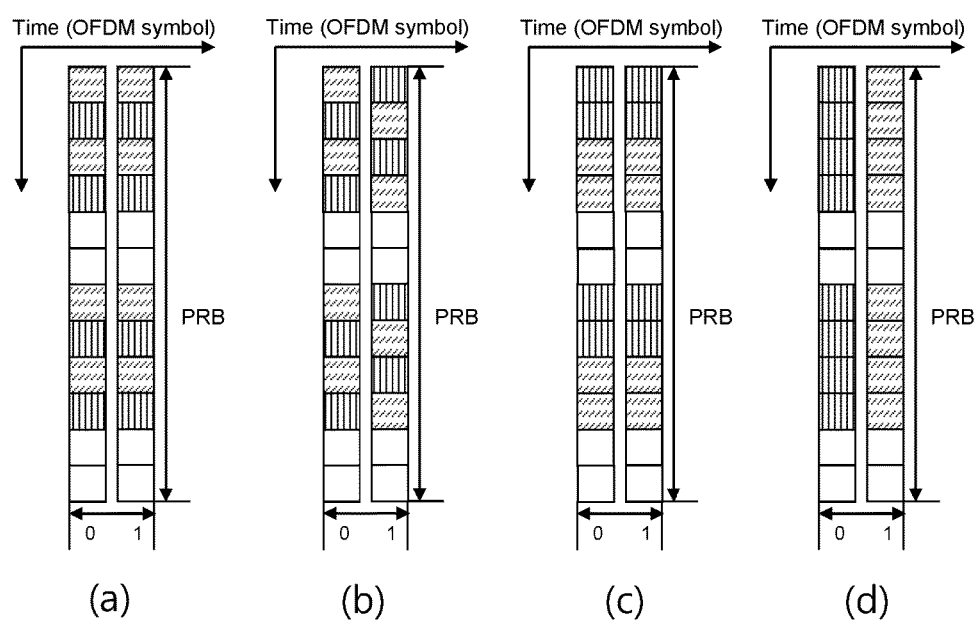

FIG. 68 and FIG. 69 show other examples for deploying two CQI RSs to 16 resource elements in two OFDM symbols in a subframe.

In the examples of FIG. 68 and FIG. 69, resource elements to which a CQI RS is deployed by an offset value can be used by being shifted in a frequency domain in a unit of cell or cell group. The offset value can be set to any one of values 1 to 4.

Figure 70:
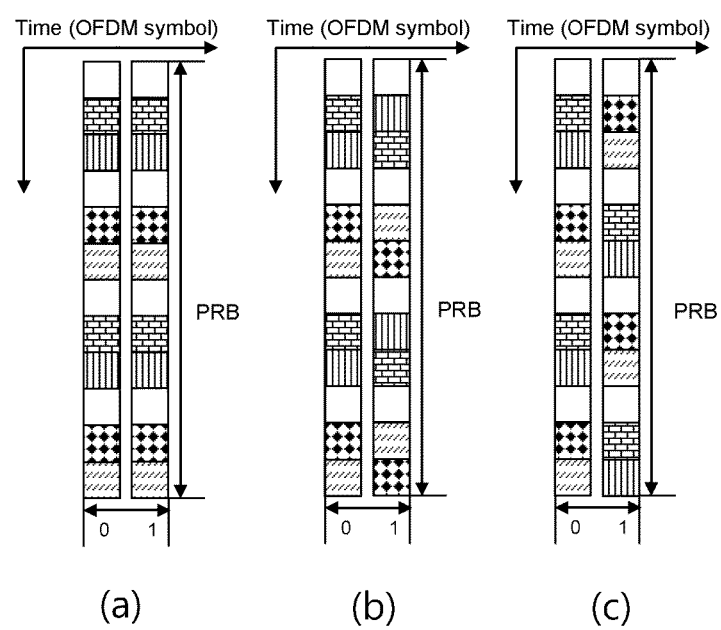

FIG. 70 and FIG. 71 show examples for deploying four CQI RSs to 16 resource elements in two OFDM symbols in a subframe.

If each CQI RS is used for one antenna in one subframe, four antennas can be identified, and thus two subframes configured in this manner can be used to identify 8 antennas (duty cycle 2). Alternatively, a CQI RS 1 to a CQI RS 4 deployed to one OFDM symbol in a subframe can be used to identify four antennas, and a CQI RS 1 and a CQI RS 4 deployed to the remaining one OFDM symbol can be used to identify another four antennas (duty cycle 1). Alternatively, if each CQI RS in a subframe is used for two antennas by using CDM, four CQI RSs in the subframe can be used to identify 8 antennas (duty cycle 1). In the examples of FIG. 71, resource elements to which a CQI RS is deployed by an offset value can be used in a unit of cell or cell group by being shifted in a frequency domain. The offset value may be set to any one of values 1 to 6.

Figure 72:
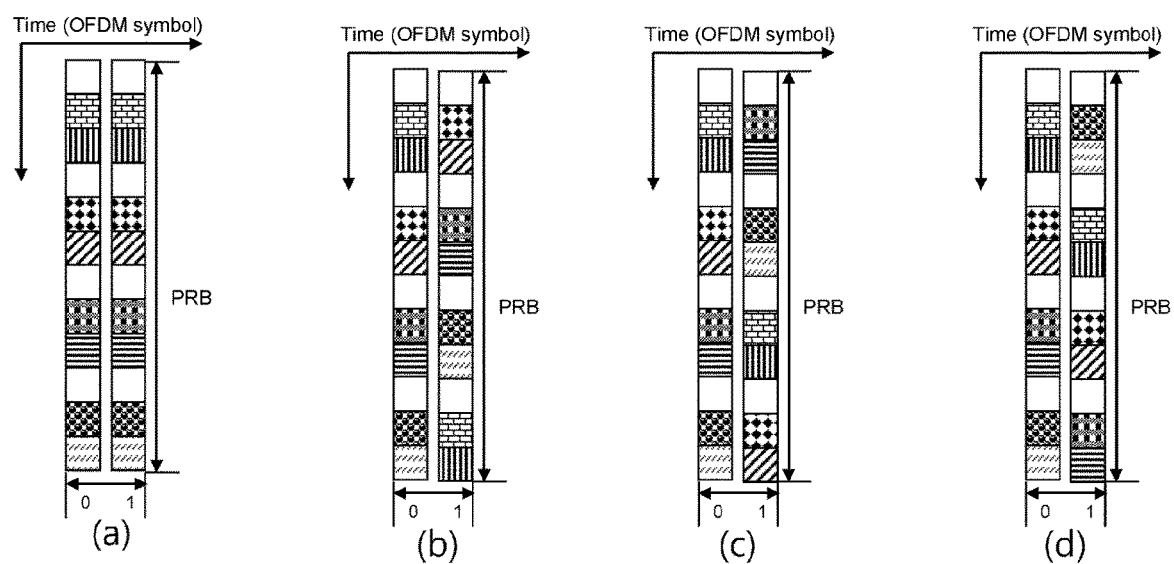
FIG. 72 and FIG. 73 show examples for deploying 8 CQI RSs to 16 resource elements in two OFDM symbols in a subframe.
Figure 73:
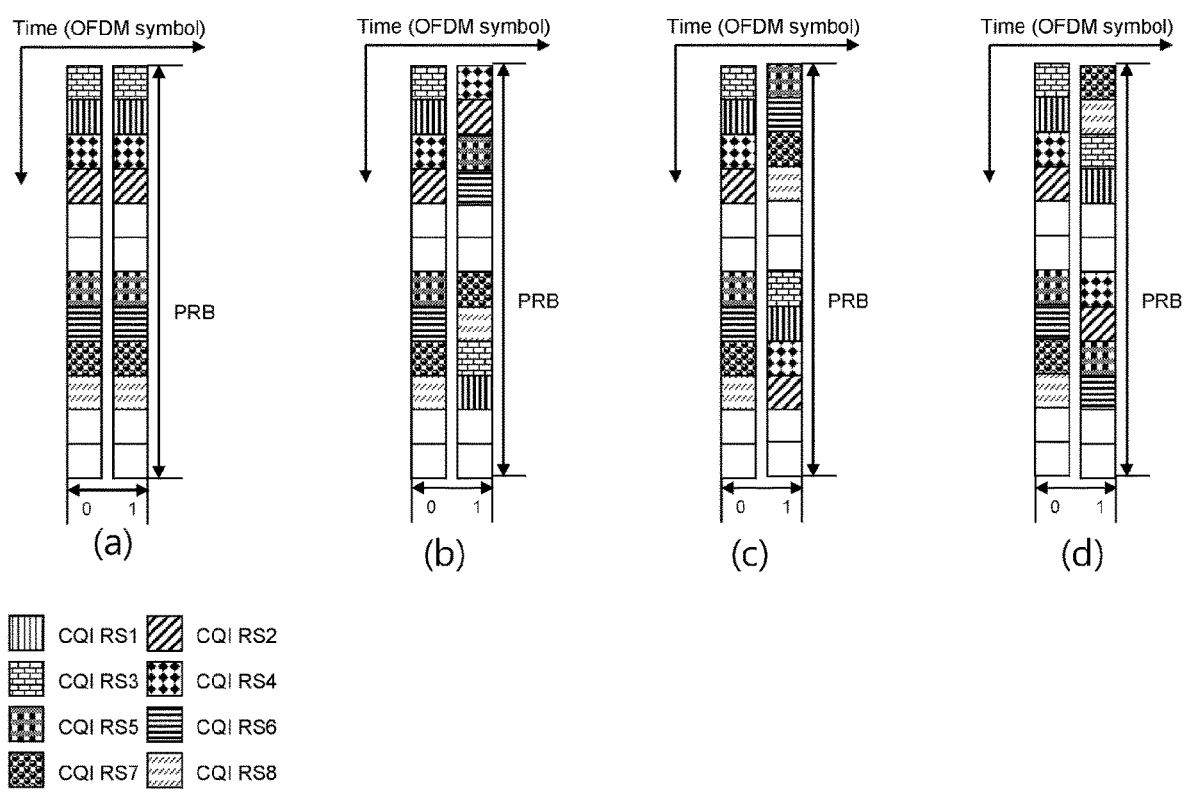

FIG. 72 and FIG. 73 show examples for deploying 8 CQI RSs to 16 resource elements in two OFDM symbols in a subframe.

Since 8 CQI RSs are deployed in one subframe, 8 antennas can be identified and used. Each CQI RS can be identified since a different resource element is allocated thereto. In the examples of FIG. 73, a resource element to which a CQI RS is deployed can be shifted by 1 to 8 resource elements in a frequency domain by an offset value. The offset value may differ depending on a cell or cell group.

Figure 74:
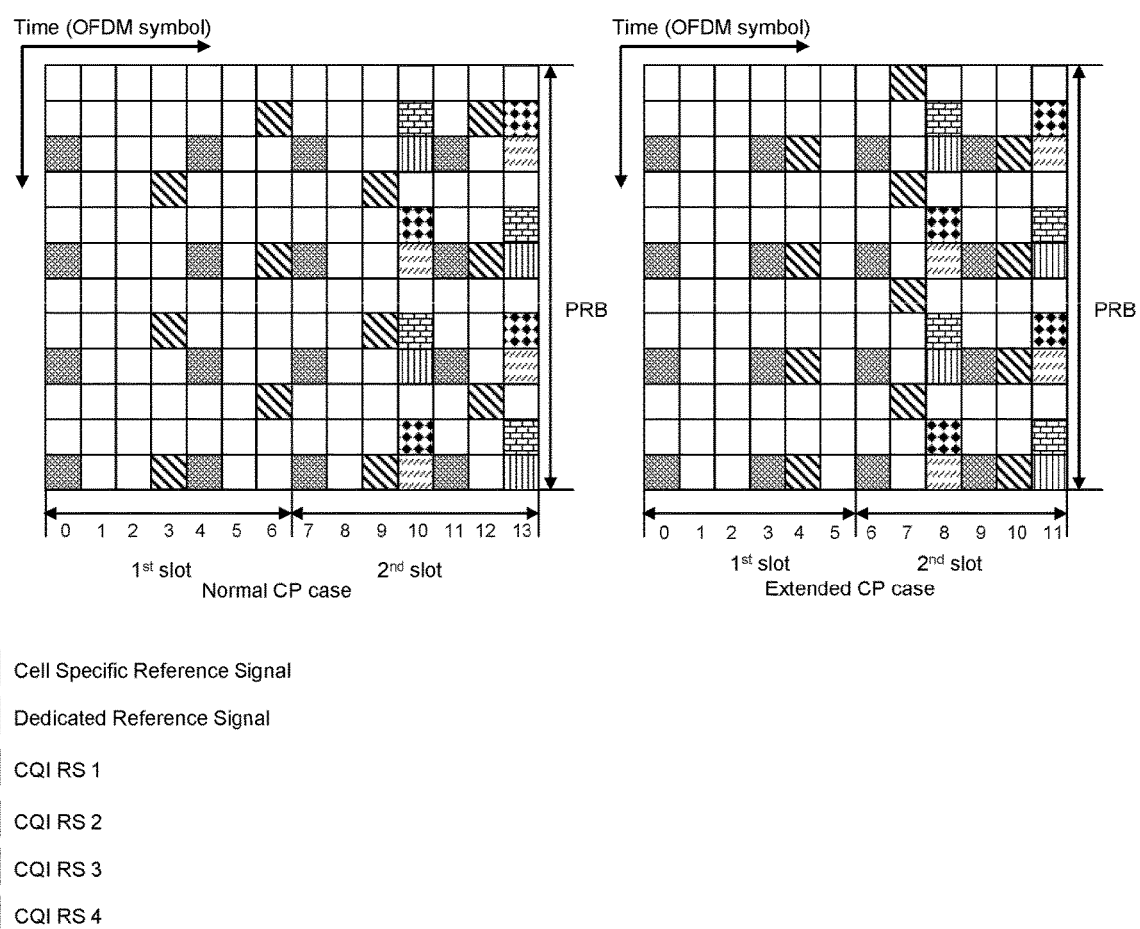
FIG. 74 shows an example in which a CQI RS is transmitted in two OFDM symbols for a resource region including one subframe in a time domain and 12 subcarriers in a frequency domain and in which four CQI RSs are deployed for 16 resource elements.

FIG. 74 shows an example in which a CQI RS is transmitted in two OFDM symbols for a resource region including one subframe in a time domain and 12 subcarriers in a frequency domain and in which four CQI RSs are deployed for 16 resource elements.

Figure 75:
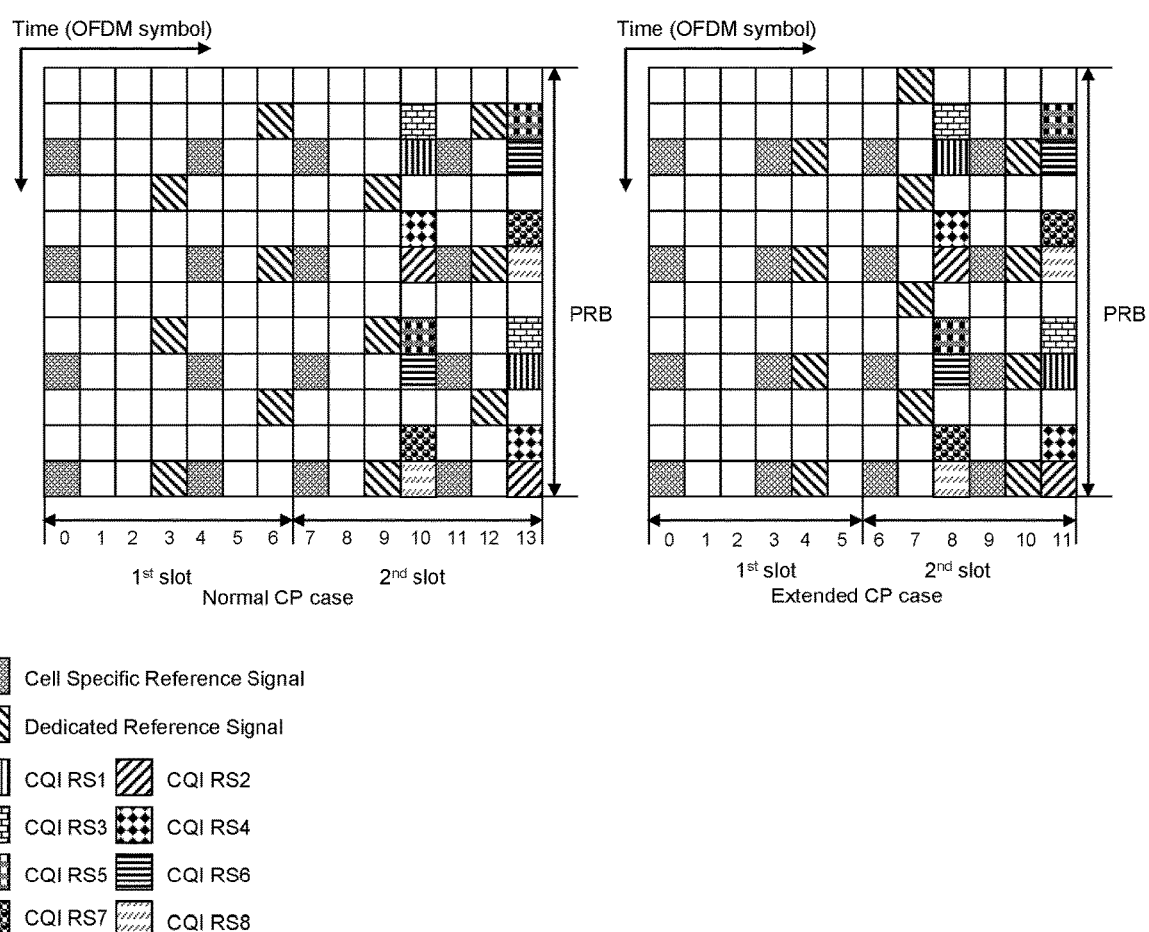
FIG. 75 shows an example in which a CQI RS is transmitted in two OFDM symbols for a resource region including one subframe in a time domain and 12 subcarriers in a frequency domain and in which 8 CQI RSs are deployed for 16 resource elements.

FIG. 75 shows an example in which a CQI RS is transmitted in two OFDM symbols for a resource region including one subframe in a time domain and 12 subcarriers in a frequency domain and in which 8 CQI RSs are deployed for 16 resource elements.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. An apparatus, the apparatus comprising:
a processor; and
a memory coupled to the processor,
wherein the processor is configured to receive eight reference signals in a physical resource block (PRB) pair of a subframe comprising a plurality of orthogonal frequency division multiplexing (OFDM) symbols,
wherein, in the PRB pair of the subframe, each of the eight reference signals is received through two resource elements in two OFDM symbols, and
wherein, among the eight reference signals, a first reference signal and a second reference signal are received through two resource elements having a first frequency in the two OFDM symbols, a third reference signal and a fourth reference signal are received through two resource elements having a second frequency in the two OFDM symbols, a fifth reference signal and a sixth reference signal are received through two resource elements having a third frequency in the two OFDM symbols, and a seventh reference signal and a eighth reference signal are received through two resource elements having a fourth frequency in the two OFDM symbols.

2. The apparatus of claim 1, wherein the two resource elements having a first frequency and the two resource elements having a third frequency are consecutive in a frequency domain.

3. The apparatus of claim 1, wherein the two resource elements having a second frequency and the two resource elements having a fourth frequency are consecutive in a frequency domain.

4. The apparatus of claim 1, wherein the two resource elements having a second frequency and the two resource elements having a third frequency are separated in a frequency domain.

5. The apparatus of claim 1, wherein two reference signals among the eight reference signals are received through two resource elements and the two reference signals received through the two resource elements are identified by codes which are different from each other.

6. The apparatus of claim 1, wherein the two OFDM symbols are consecutive in a time domain.

7. The apparatus of claim 1, wherein a reference signal among the eight reference signals is received through two resource elements having a same frequency in the two OFDM symbols of the PRB pair.

8. A method of receiving a reference signal in a wireless communication system, the method comprising:
receiving eight reference signals in a physical resource block (PRB) pair of a subframe comprising a plurality of orthogonal frequency division multiplexing (OFDM) symbols,
wherein, in the PRB pair of the subframe, each of the eight reference signals is received through two resource elements in two OFDM symbols, and
wherein, among the eight reference signals, a first reference signal and a second reference signal are received through two resource elements having a first frequency in the two OFDM symbols, a third reference signal and a fourth reference signal are received through two resource elements having a second frequency in the two OFDM symbols, a fifth reference signal and a sixth reference signal are received through two resource elements having a third frequency in the two OFDM symbols, and a seventh reference signal and a eighth reference signal are received through two resource elements having a fourth frequency in the two OFDM symbols.

9. The method of claim 8, wherein the two resource elements having a first frequency and the two resource elements having a third frequency are consecutive in a frequency domain.

10. The method of claim 8, wherein the two resource elements having a second frequency and the two resource elements having a fourth frequency are consecutive in a frequency domain.

11. The method of claim 8, wherein the two resource elements having a second frequency and the two resource elements having a third frequency are separated in a frequency domain.

12. The method of claim 8, wherein two reference signals among the eight reference signals are received through two resource elements and the two reference signals received through the two resource elements are identified by codes which are different from each other.

13. The method of claim 8, wherein the two OFDM symbols are consecutive in a time domain.

14. The method of claim 8, wherein a reference signal among the eight reference signals is received through two resource elements having a same frequency in the two OFDM symbols of the PRB pair.

15. An apparatus, the apparatus comprising:
a processor; and
a memory coupled to the processor,
wherein the processor is configured to:
generate eight reference signals, and
allocate the eight reference signals in a physical resource block (PRB) pair of a subframe containing a plurality of orthogonal frequency division multiplexing (OFDM) symbols,
wherein, in the PRB pair of the subframe, each of the eight reference signals is allocated to two resource elements in two OFDM symbols, and
wherein, among the eight reference signals, a first reference signal and a second reference signal are allocated to two resource elements having a first frequency in the two OFDM symbols, a third reference signal and a fourth reference signal are allocated to two resource elements having a second frequency in the two OFDM symbols, a fifth reference signal and a sixth reference signal are allocated to two resource elements having a third frequency in the two OFDM symbols, and a seventh reference signal and a eighth reference signal are allocated to two resource elements having a fourth frequency in the two OFDM symbols.

16. The apparatus of claim 15, wherein the two resource elements having a first frequency and the two resource elements having a third frequency are consecutive in a frequency domain.

17. The apparatus of claim 15, wherein the two resource elements having a second frequency and the two resource elements having a fourth frequency are consecutive in a frequency domain.

18. The apparatus of claim 15, wherein the two resource elements having a second frequency and the two resource elements having a third frequency are separated in a frequency domain.

19. The apparatus of claim 15, wherein two reference signals among the eight reference signals are received through two resource elements and the two reference signals received through the two resource elements are identified by codes which are different from each other.

20. The apparatus of claim 15, wherein the two OFDM symbols are consecutive in a time domain.

\* \* \* \* \*